United States Patent
Kawakami et al.

(10) Patent No.: US 9,293,236 B2
(45) Date of Patent: Mar. 22, 2016

(54) LITHIUM—MANGANESE COMPOSITE OXIDE, SECONDARY BATTERY, AND ELECTRIC DEVICE

(71) Applicant: SEMICONDUCTOR ENERGY LABORATORY CO., LTD., Atsugi-shi, Kanagawa-ken (JP)

(72) Inventors: Takahiro Kawakami, Kanagawa (JP); Shuhei Yoshitomi, Kanagawa (JP); Teruaki Ochiai, Kanagawa (JP); Yumiko Saito, Kanagawa (JP); Yohei Momma, Kanagawa (JP); Satoshi Seo, Kanagawa (JP); Mayumi Mikami, Kanagawa (JP); Shunsuke Adachi, Kanagawa (JP)

(73) Assignee: SEMIDONCONDUCTOR ENERGY LABORATORY CO., LTD., Kanagawa-ken (JP)

( * ) Notice: Subject to any disclaimer, the term of this patent is extended or adjusted under 35 U.S.C. 154(b) by 0 days.

(21) Appl. No.: 14/318,727

(22) Filed: Jun. 30, 2014

(65) Prior Publication Data
US 2015/0014605 A1 Jan. 15, 2015

(30) Foreign Application Priority Data

Jul. 15, 2013 (JP) ................................. 2013-147170
Sep. 25, 2013 (JP) ................................. 2013-198871

(51) Int. Cl.
*H01B 1/08* (2006.01)
*H01M 4/36* (2006.01)
(Continued)

(52) U.S. Cl.
CPC ................. *H01B 1/08* (2013.01); *H01M 4/362* (2013.01); *H01M 4/505* (2013.01); *H01M 4/525* (2013.01); *H01M 10/052* (2013.01); *H01M 2004/028* (2013.01); *H01M 2220/30* (2013.01)

(58) Field of Classification Search
CPC .. H01M 4/505; H01M 4/525; C01G 45/1221; C01G 45/1257; C01G 45/1242; C01G 53/54; C01G 53/56
See application file for complete search history.

(56) References Cited

U.S. PATENT DOCUMENTS

| 4,302,518 A | 11/1981 | Goodenough et al. |
| 4,668,595 A | 5/1987 | Yoshino et al. |

(Continued)

FOREIGN PATENT DOCUMENTS

| CN | 001826291 A | 8/2006 |
| CN | 102791633 A | 11/2012 |

(Continued)

OTHER PUBLICATIONS

Machine Translation of JP 2009-179501 A, Tatsumi et al.*

(Continued)

*Primary Examiner* — Mark Kopec
*Assistant Examiner* — Matthew R Diaz
(74) *Attorney, Agent, or Firm* — Nixon Peabody LLP; Jeffrey L. Costellia

(57) ABSTRACT

The amount of lithium ions that can be received and released in and from a positive electrode active material is increased, and high capacity and high energy density of a secondary battery are achieved. Provided is a lithium-manganese composite oxide represented by $Li_xMn_yM_zO_w$, where M is a metal element other than Li and Mn, or Si or P, and y, z, and w satisfy $0 \leq x/(y+z) < 2$, $y>0$, $z>0$, $0.26 \leq (y+z)/w < 0.5$, and $0.2 < z/y < 1.2$. The lithium manganese composite oxide has high structural stability and high capacity.

10 Claims, 49 Drawing Sheets

(51) Int. Cl.
*H01M 4/505* (2010.01)
*H01M 4/525* (2010.01)
H01M 10/052 (2010.01)
H01M 4/02 (2006.01)

(56) References Cited

U.S. PATENT DOCUMENTS

| | | | |
|---|---|---|---|
| 5,240,794 A | 8/1993 | Thackeray et al. | |
| 5,443,929 A | 8/1995 | Yamamoto et al. | |
| 5,783,333 A | 7/1998 | Mayer | |
| 5,834,139 A | 11/1998 | Shodai et al. | |
| 5,871,866 A | 2/1999 | Barker et al. | |
| 5,910,382 A | 6/1999 | Goodenough et al. | |
| 6,085,015 A | 7/2000 | Armand et al. | |
| 6,514,640 B1 | 2/2003 | Armand et al. | |
| 7,303,840 B2 | 12/2007 | Thackeray et al. | |
| 7,393,476 B2 | 7/2008 | Shiozaki et al. | |
| 7,635,536 B2 | 12/2009 | Johnson et al. | |
| 7,790,308 B2 | 9/2010 | Johnson et al. | |
| 7,892,679 B2 | 2/2011 | Shimizu et al. | |
| 7,927,506 B2 * | 4/2011 | Park | H01M 4/131 252/182.1 |
| 7,935,270 B2 * | 5/2011 | Park | H01M 4/131 252/182.1 |
| 8,080,340 B2 | 12/2011 | Thackeray et al. | |
| 8,557,440 B2 | 10/2013 | Yu et al. | |
| 2001/0010807 A1 | 8/2001 | Matsubara | |
| 2002/0195591 A1 | 12/2002 | Ravet et al. | |
| 2004/0234857 A1 | 11/2004 | Shiozaki et al. | |
| 2006/0051671 A1 | 3/2006 | Thackeray et al. | |
| 2006/0051673 A1 | 3/2006 | Johnson et al. | |
| 2006/0121352 A1 | 6/2006 | Kejha et al. | |
| 2006/0188780 A1 | 8/2006 | Fujii et al. | |
| 2006/0275664 A1 * | 12/2006 | Ohzuku | C01G 23/005 429/220 |
| 2007/0026315 A1 | 2/2007 | Lampe-Onnerud et al. | |
| 2007/0148546 A1 | 6/2007 | Shimizu et al. | |
| 2007/0160906 A1 | 7/2007 | Tooyama et al. | |
| 2007/0212609 A1 | 9/2007 | Iwami | |
| 2009/0087731 A1 | 4/2009 | Fukui et al. | |
| 2009/0123813 A1 | 5/2009 | Chiang et al. | |
| 2009/0123842 A1 | 5/2009 | Thackeray et al. | |
| 2009/0220862 A1 | 9/2009 | Toyama et al. | |
| 2010/0143784 A1 | 6/2010 | Johnson et al. | |
| 2010/0233542 A1 | 9/2010 | Endo et al. | |
| 2011/0229757 A1 | 9/2011 | Kawakami et al. | |
| 2012/0315544 A1 | 12/2012 | Yasuda et al. | |
| 2014/0131633 A1 | 5/2014 | Ito et al. | |
| 2014/0332715 A1 | 11/2014 | Kawakami et al. | |
| 2015/0014581 A1 | 1/2015 | Kawakami et al. | |

FOREIGN PATENT DOCUMENTS

| | | |
|---|---|---|
| CN | 103636037 A | 3/2014 |
| EP | 1652819 A | 5/2006 |
| EP | 2731180 A | 5/2014 |
| JP | 08-037007 A | 2/1996 |
| JP | 11-025983 | 1/1999 |
| JP | 2005-097087 A | 4/2005 |
| JP | 2007-200865 A | 8/2007 |
| JP | 2008-166156 A | 7/2008 |
| JP | 2009-179501 A | 8/2009 |
| JP | 2013-100197 A | 5/2013 |
| JP | 2013-214489 A | 10/2013 |
| JP | 5418664 | 2/2014 |
| KR | 2006-0041241 A | 5/2006 |
| KR | 2012-0112765 A | 10/2012 |
| TW | 201308734 | 2/2013 |
| WO | WO-2005/007577 | 1/2005 |
| WO | WO-2006/028476 | 3/2006 |
| WO | WO-2011/111364 | 9/2011 |
| WO | WO-2013/005737 | 1/2013 |

OTHER PUBLICATIONS

International Search Report (Application No. PCT/JP2014/068519) Dated Oct. 21, 2014.
Written Opinion (Application No. PCT/JP2014/068519) Dated Oct. 21, 2014.
Berbenni.V et al., "Thermogravimetry and X-Ray Diffraction Study of the Thermal Decomposition Processes in LI2CO3 Mixtures", Journal of Analytical and Applied Pyrolysis, 2002, vol. 62, pp. 45-62.
M. Thackeray et al., "$Li_2MnO_3$-stabilized $LiMO_2$ (M = Mn, Ni, Co) electrodes for lithium-ion batteries", *J. Mater. Chem.*, 2007, vol. 17, Issue 30, pp. 3112-3125.
Lee.S et al., "Antiferromagnetic ordering in Li2MnO3 single crystals with a two-dimensional honeycomb lattice", Journal of Physics: Condensed Matter, Nov. 14, 2012, vol. 24, No. 45, pp. 456004-1-456004-9.
Mukai.K et al., "Magnetic properties of the chemically delithiated $Li_xMn_2O_4$ with $0.07 \leq x \leq 1$", Journal of Solid State Chemistry, May 1, 2011, vol. 184, No. 5, pp. 1096-1104.

* cited by examiner

FIG. 2
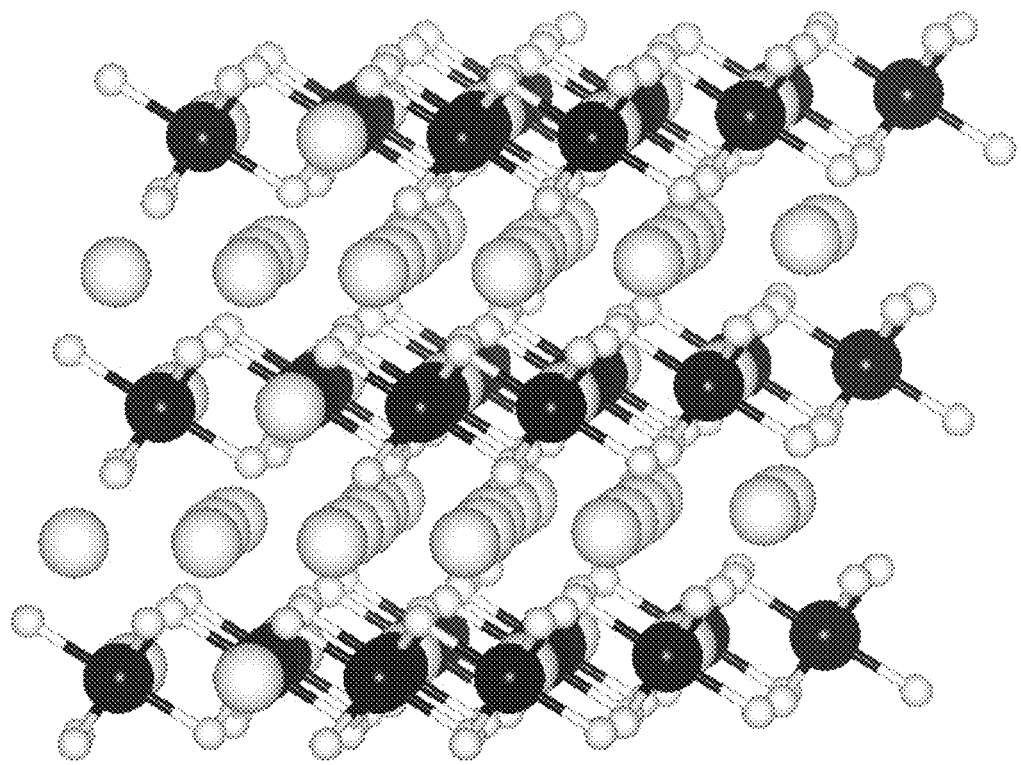
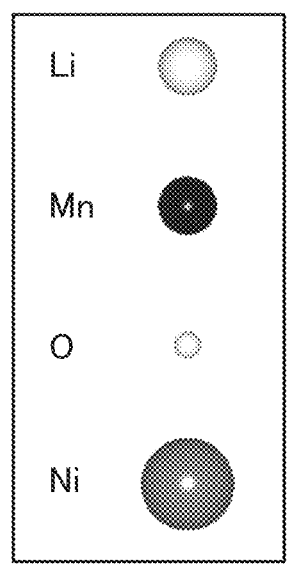

FIG. 3
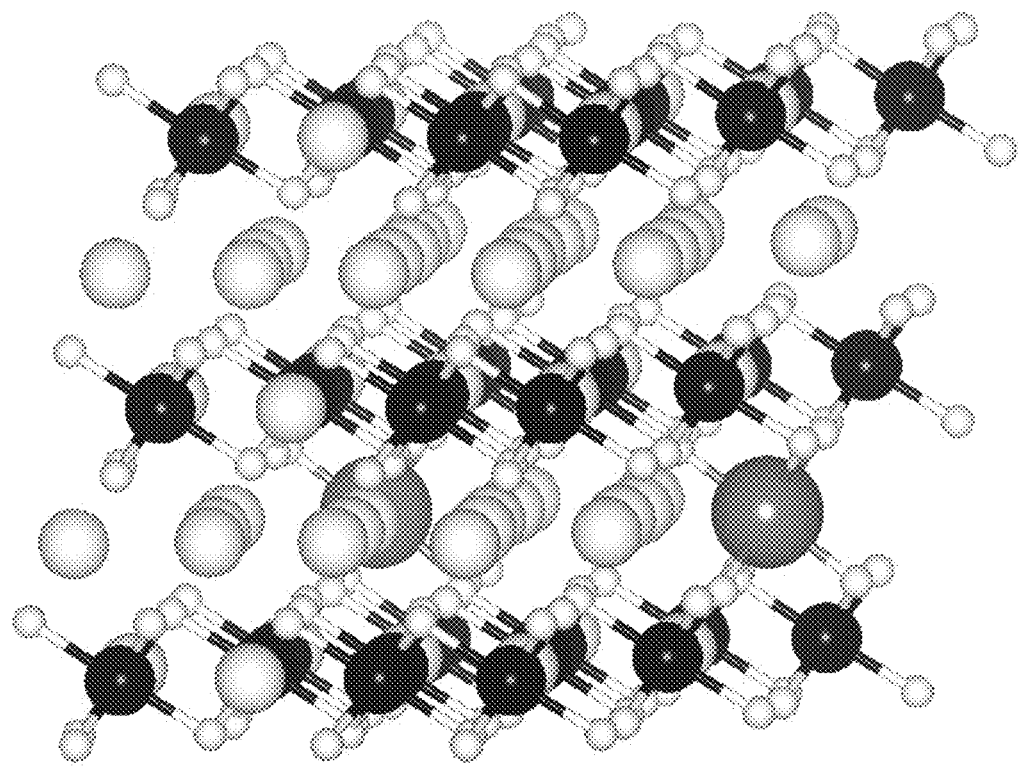
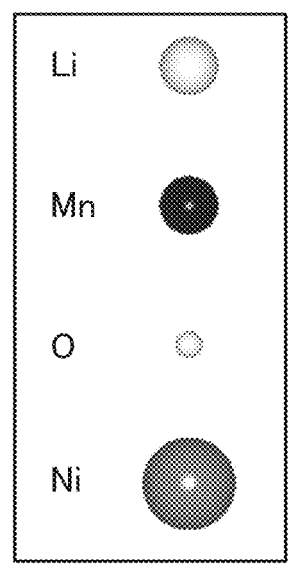

FIG. 4
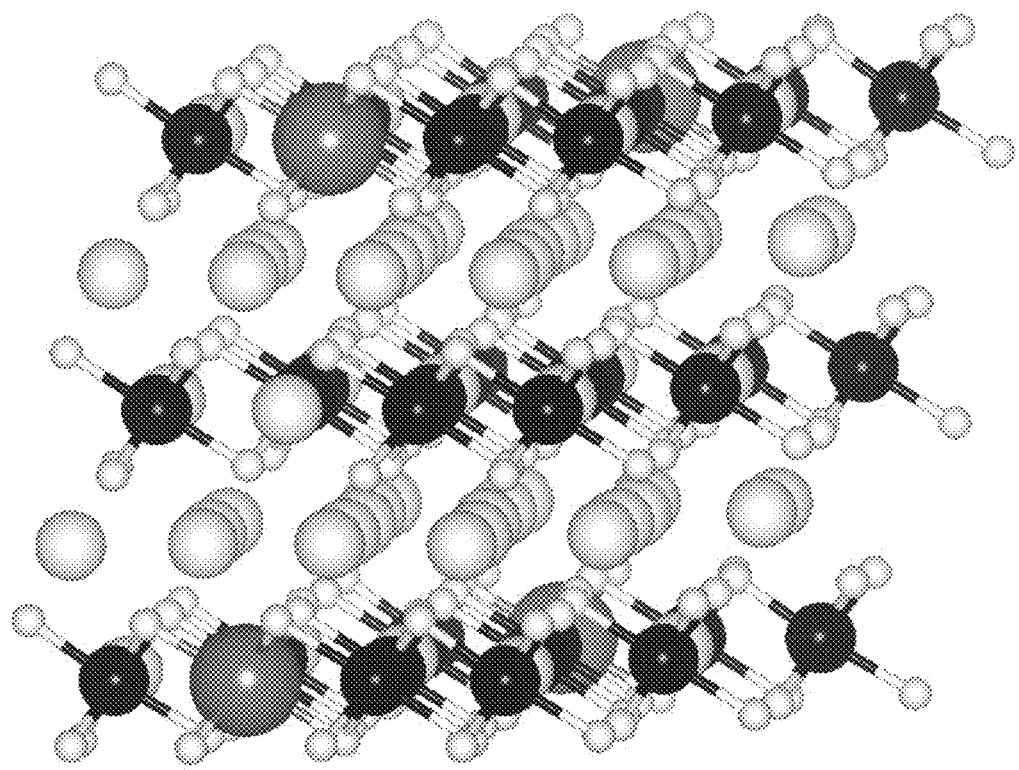
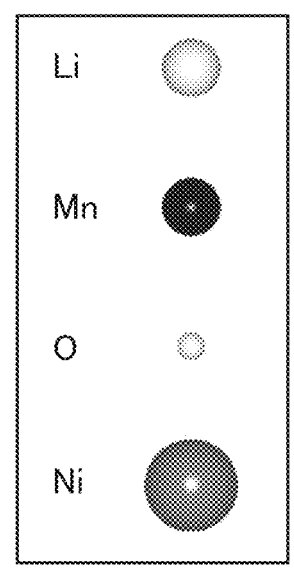

FIG. 5
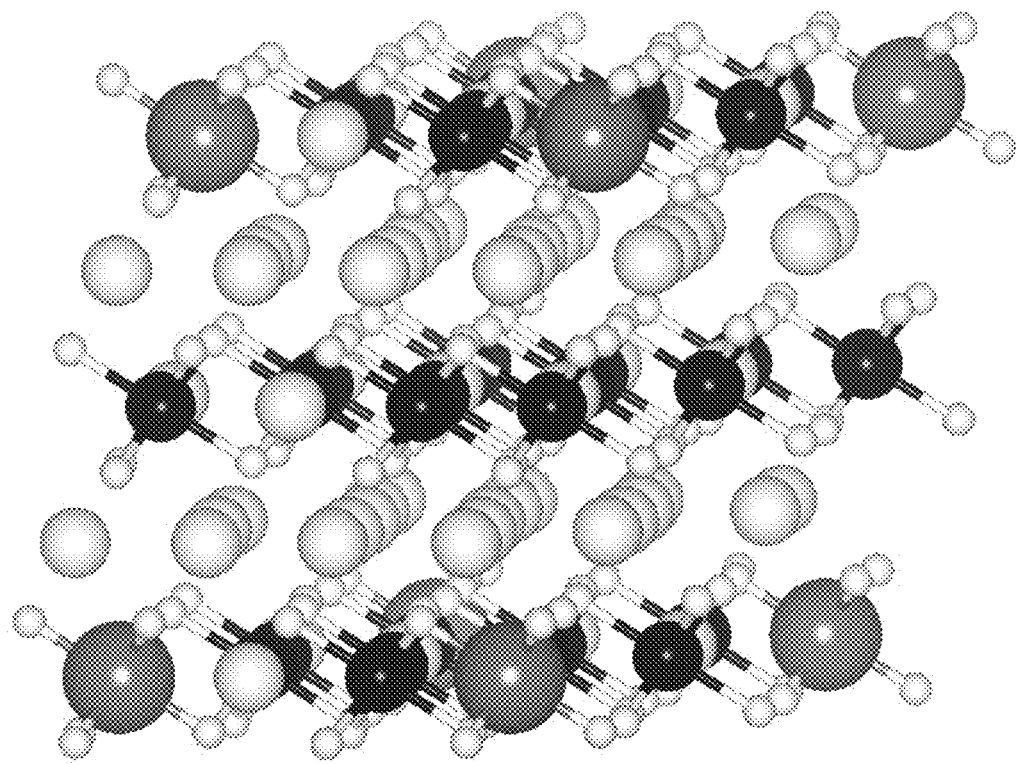
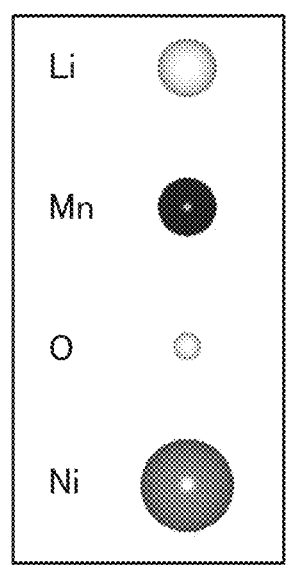

FIG. 7
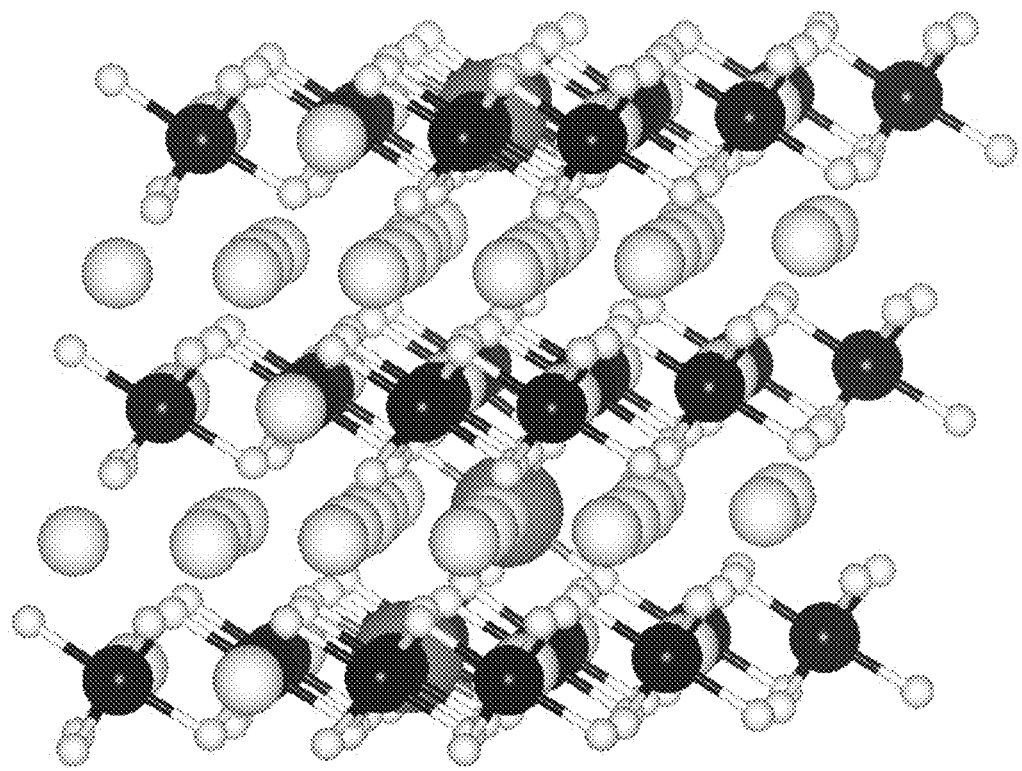
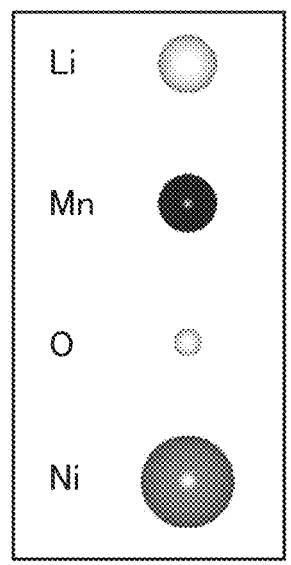

FIG. 8
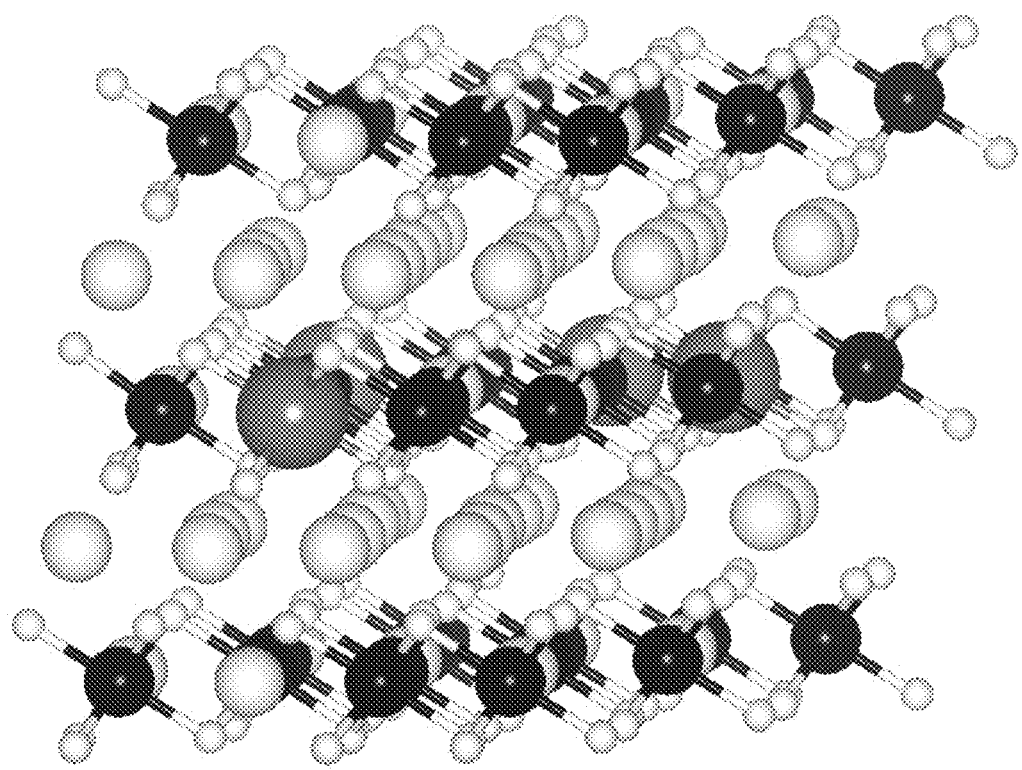
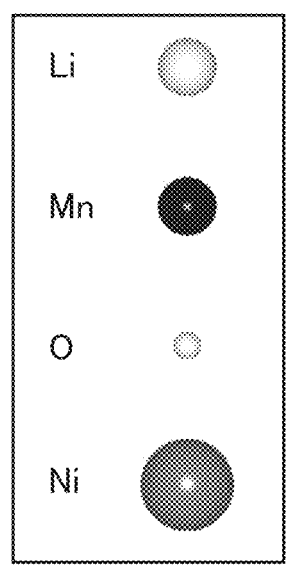

FIG. 9
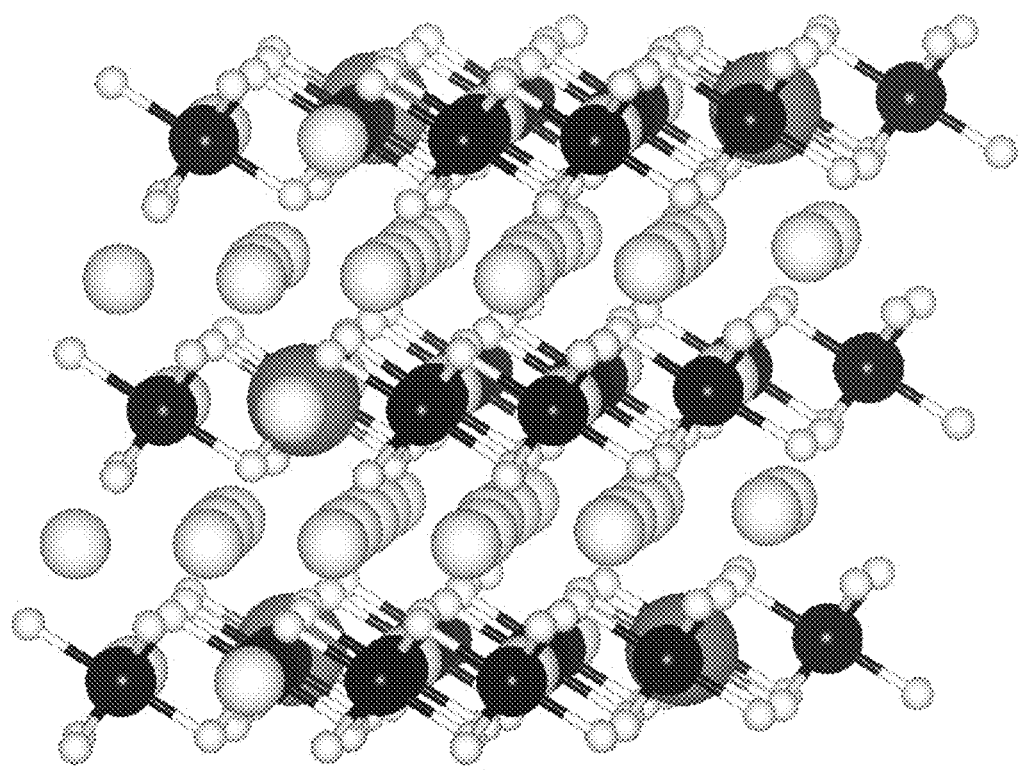
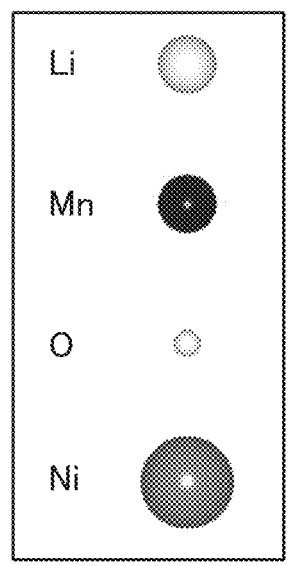

FIG. 10
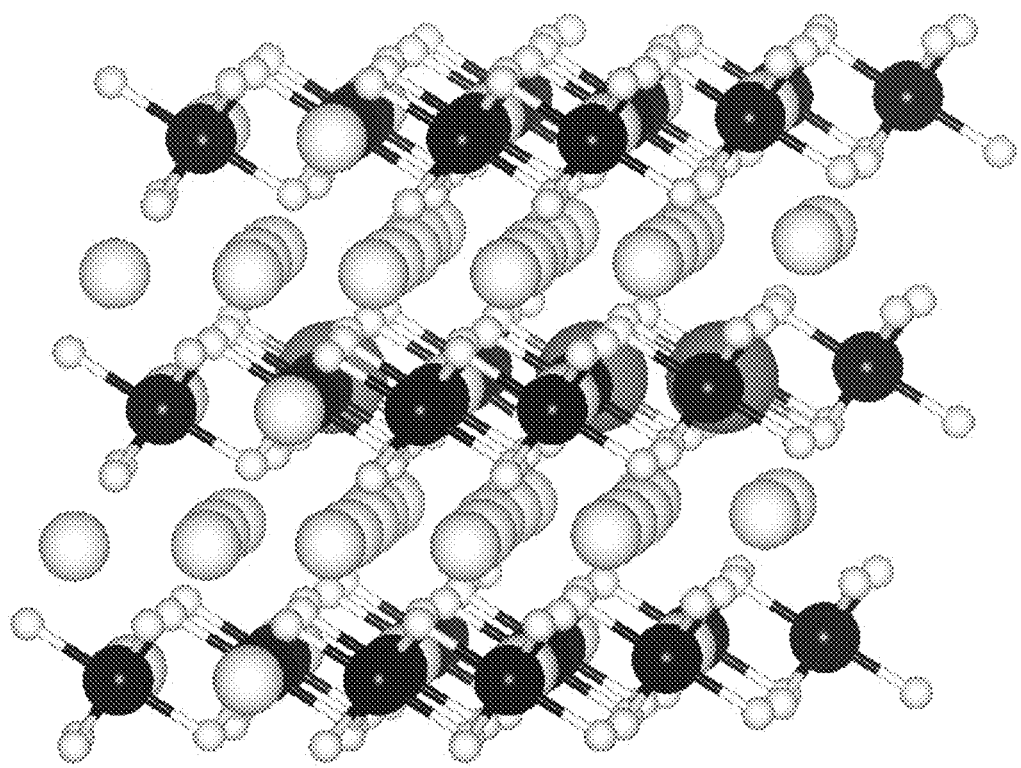
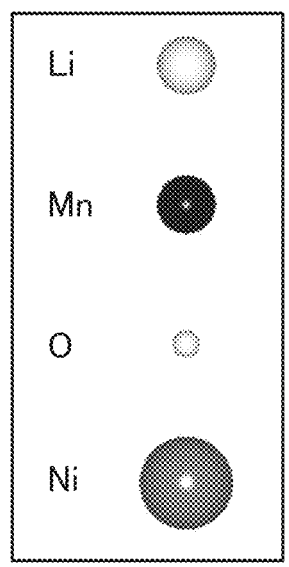

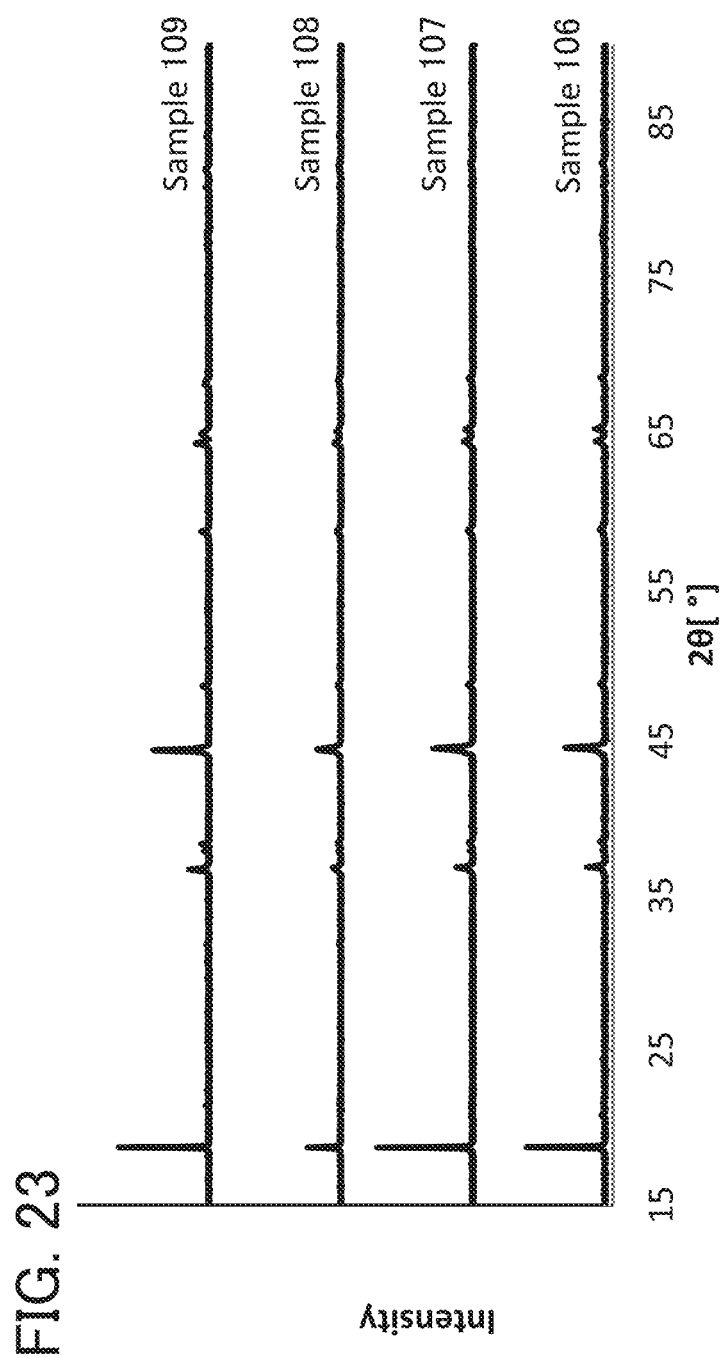

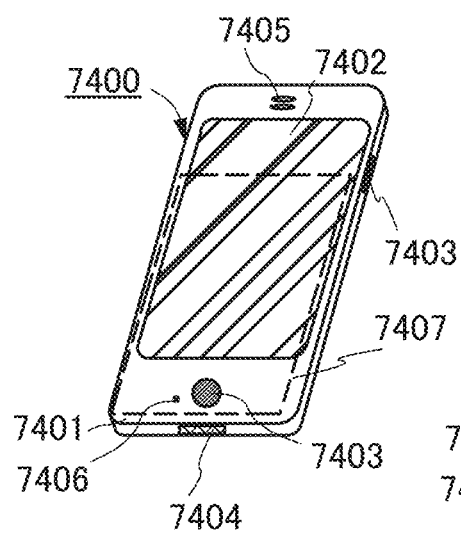
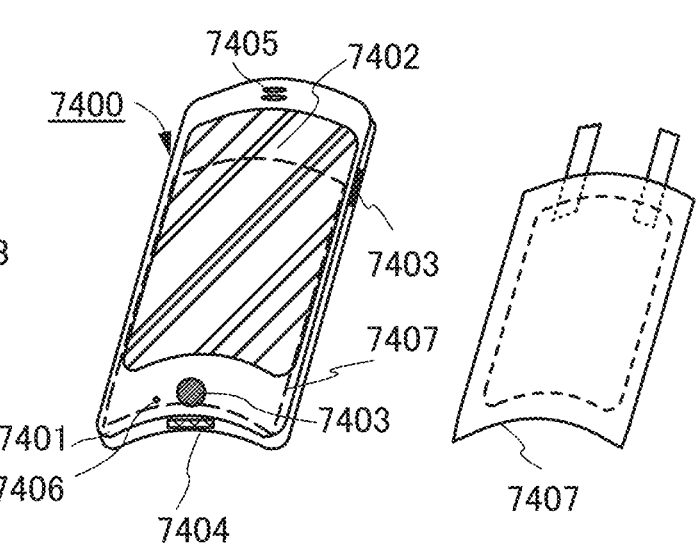
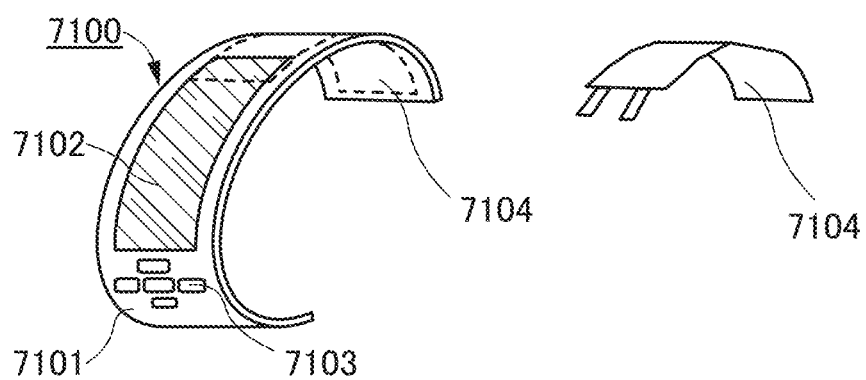

FIG. 41A1
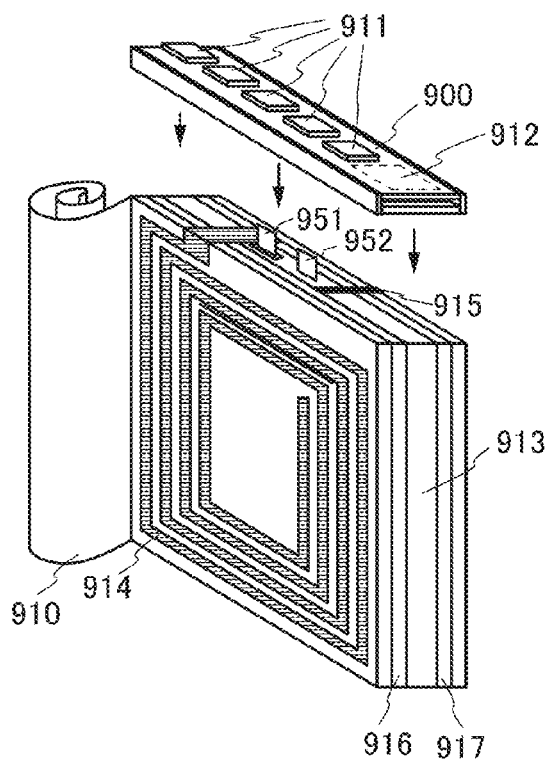
FIG. 41A2
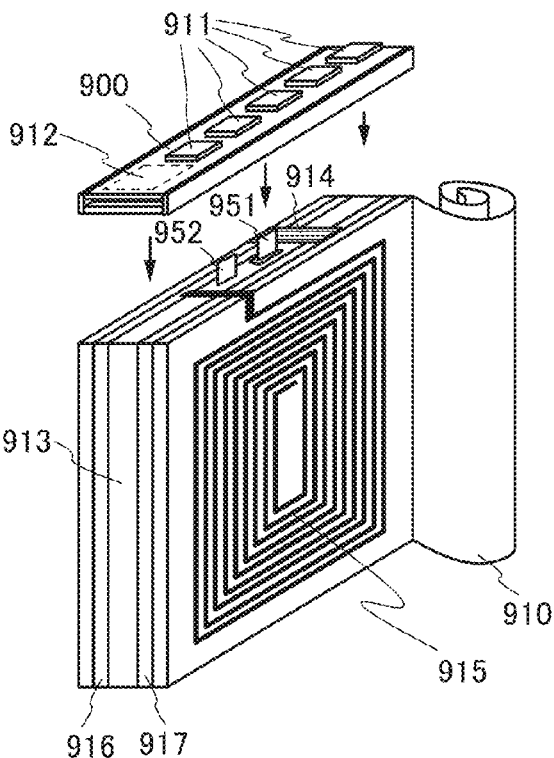
FIG. 41B1
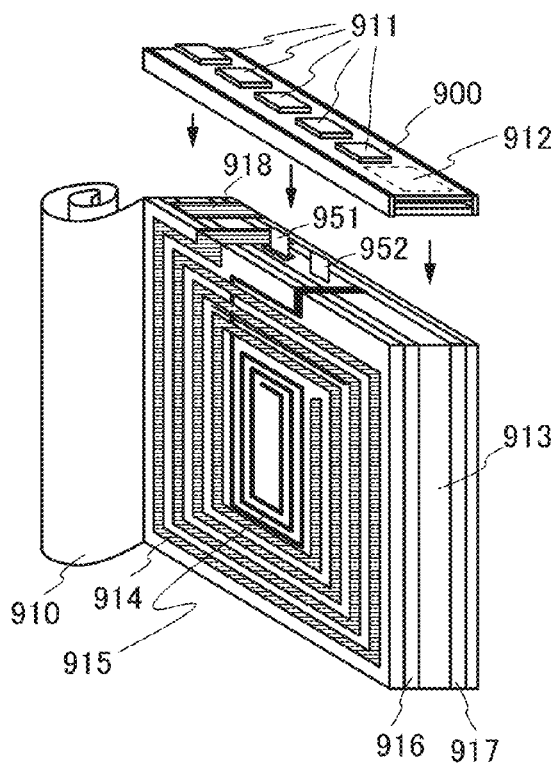
FIG. 41B2
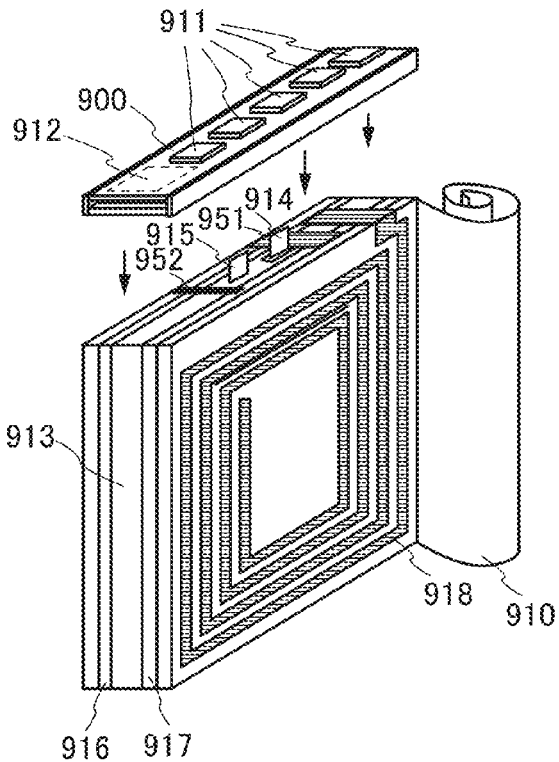

LITHIUM—MANGANESE COMPOSITE OXIDE, SECONDARY BATTERY, AND ELECTRIC DEVICE

TECHNICAL FIELD

The present invention relates to an object, a method, or a manufacturing method. In addition, the present invention relates to a process, a machine, manufacture, or a composition of matter. In particular, one embodiment of the present invention relates to a semiconductor device, a display device, a light-emitting device, a power storage device, a storage device, a driving method thereof, or a manufacturing method thereof. In particular, one embodiment of the present invention relates to a structure of a secondary battery and a method for manufacturing the secondary battery. In particular, one embodiment of the present invention relates to a positive electrode active material of a lithium-ion secondary battery.

BACKGROUND ART

Examples of the secondary battery include a nickel-metal hydride battery, a lead-acid battery, and a lithium-ion secondary battery.

Such secondary batteries are used as power sources in portable information terminals typified by mobile phones. In particular, lithium-ion secondary batteries have been actively developed because capacity thereof can be increased and size thereof can be reduced.

In a lithium-ion secondary battery, as a positive electrode active material, a phosphate compound having an olivine structure and containing lithium and iron, manganese, cobalt, or nickel, such as lithium iron phosphate ($LiFePO_4$), lithium manganese phosphate ($LiMnPO_4$), lithium cobalt phosphate ($LiCoPO_4$), and lithium nickel phosphate ($LiNiPO_4$), which are disclosed in Patent Document 1, has been known.

Layered rock-salt compounds such as $LiCoO_2$ and $Li_2MnO_3$ and spinel compounds such as $LiMn_2O_4$ are known as positive electrode active materials. Not only the behavior of a battery when those compounds are used as positive electrode active materials but also physical properties such as magnetic properties, have been widely researched as disclosed in Non-Patent Documents 1 and 2, for example.

REFERENCE

Patent Document

[Patent Document 1] Japanese Published Patent Application No. H11-025983

[Non-Patent Document 1] Sanghyun Lee et al., "Antiferromagnetic ordering in $Li_2MnO_3$ single crystals with a two-dimensional honeycomb lattice", *Journal of Physics: Condensed Matter*, 2012, Vol. 24, 456004, pp. 1-9

[Non-Patent Document 2] Kazuhiko Mukai et al., "Magnetic Properties of the chemically delithiated $Li_xMn_2O_4$ with $0.07 \leq x \leq 1$", *Journal of Solid State Chemistry*, 2011, Vol. 184, issue 5, pp. 1096-1104

DISCLOSURE OF INVENTION $LiCoO_2$ is used as a positive electrode active material of a lithium-ion secondary battery. However, cobalt, a raw material of $LiCoO_2$, is expensive. In view of this problem, an object is to provide a positive electrode active material that can be formed at low cost.

Another object is to increase the amount of lithium ions that can be received and released in and from a positive electrode active material to achieve high capacity and high energy density of a secondary battery.

Furthermore, high ion conductivity and high electron conductivity are required as properties of a positive electrode active material of a lithium-ion secondary battery. Thus, another object is to provide a positive electrode active material having high ion conductivity and high electron conductivity. Another object is to provide a novel material. Another object is to provide a novel positive electrode active material.

Another object is to achieve high capacity and high energy density of a positive electrode of a lithium-ion secondary battery. Another object is to provide a novel battery. Another object is to provide a novel lithium-ion secondary battery.

Another object is to achieve high capacity and high energy density of a lithium-ion secondary battery.

Another object is to provide a highly reliable lithium-ion secondary battery.

Note that the description of these objects does not impede the existence of other objects. In one embodiment of the present invention, there is no need to achieve all the above objects. Other objects will be apparent from and can be derived from the description of the specification, the drawings, the claims, and the like.

A lithium-manganese composite oxide (also referred to as a lithium-manganese oxide) is an oxide containing at least lithium and manganese. The lithium-manganese composite oxide may contain another metal, or an element such as silicon or phosphorus. In the case where the lithium-manganese composite oxide is used as a positive electrode material of a lithium-ion secondary battery, lithium may be released from the lithium-manganese composite oxide by charging.

One embodiment of the present invention is a lithium-manganese composite oxide represented by $Li_xMn_yM_zO_w$, where M is a metal element other than lithium and manganese, or silicon or phosphorus, and y, z, and w are each greater than zero and satisfy $0.26 \leq (y+z)/w < 0.5$. The lithium-manganese composite oxide has a layered rock-salt crystal structure.

Another embodiment of the present invention is a lithium-manganese composite oxide represented by $Li_xMn_yM_zO_w$, where M is a metal element other than lithium and manganese, or silicon or phosphorus, and y, z, and w are each greater than zero and satisfy $0.26 \leq (y+z)/w < 0.5$. In the lithium-manganese composite oxide, one particle includes a spinel crystal structure and a layered rock-salt crystal structure in contact with the spinel crystal structure.

Another embodiment of the present invention is a lithium-manganese composite oxide represented by $Li_xMn_yM_zO_w$, where M is a metal element other than Li and Mn, or Si or P, y and z are each greater than zero, and x, y, z, and w satisfy $0 \leq x/(y+z) < 2$, $0.26 \leq (y+z)/w < 0.5$, and $0.2 < z/y < 1.2$.

Another embodiment of the present invention is a lithium-manganese composite oxide represented by $Li_xMn_yM_zO_w$, where M is a metal element other than Li and Mn, or Si or P, y and z are each greater than zero, and x, y, z, and w satisfy $0 \leq x/(y+z) < 2$ and $0.26 \leq (y+z)/w < 0.5$. The lithium-manganese composite oxide includes at least a layered rock-salt crystal that belongs to a space group C12/m1. In the layered rock-salt crystal, the sum of an occupancy of Mn and an occupancy of the element represented by M at a 2b site is greater than or equal to 40%.

In any of the above embodiments, the element represented by M is preferably a metal element selected from Ni, Ga, Fe, Mo, In, Nb, Nd, Co, Sm, Mg, Al, Ti, Cu, and Zn, or Si or P. Note that Ni is particularly preferable.

Another embodiment of the present invention is a lithium-manganese composite oxide represented by $Li_xMn_yNi_zO_w$, where y and z are each greater than zero, x, y, z, and w satisfy $0 \le x/(y+z)<2$ and $0.26 \le (y+z)/w<0.5$. The lithium-manganese composite oxide includes at least a layered rock-salt crystal that belongs to a space group C12/m1. An a-axis lattice constant of the layered rock-salt crystal is larger than or equal to 0.494 nm and a b-axis lattice constant of the layered rock-salt crystal is larger than or equal to 0.856 nm.

Another embodiment of the present invention is a lithium-manganese composite oxide represented by $Li_DMn_yM_zO_w$, where M is a metal element other than Li and Mn, or Si or P, y and z are each greater than zero, and x, y, z, and w satisfy $1.35 \le D/(y+z)<2$ and $0.2<z/y<1.2$. Furthermore, the element represented by M is preferably a metal element selected from Ni, Ga, Fe, Mo, In, Nb, Nd, Co, Sm, Mg, Al, Ti, Cu, and Zn, or Si or P.

Another embodiment of the present invention is a positive electrode in which a positive electrode active material layer containing any of the lithium-manganese composite oxides is over a positive electrode current collector.

Another embodiment of the present invention is an electric device including the positive electrode.

A positive electrode active material that can be formed at low cost can be provided.

The amount of lithium ions that can be received and released in and from a positive electrode active material can be increased to achieve high capacity and high energy density of a secondary battery.

High ion conductivity and high electron conductivity are required as properties of a positive electrode active material of a lithium-ion secondary battery. Thus, one embodiment of the present invention can provide a positive electrode active material having high ion conductivity and high electron conductivity.

High capacity and high energy density of a lithium-ion secondary battery can be achieved.

High capacity and high energy density of a lithium-ion secondary battery can be achieved.

A novel material can be provided. A novel positive electrode active material can be provided. A novel battery can be provided. A novel lithium-ion secondary battery can be provided.

The lithium-manganese composite oxide disclosed in this specification has high structural stability and high capacity. Furthermore, the lithium-manganese composite oxide disclosed in this specification can be formed through a simple forming process where a plurality of materials are weighed, pulverized in a ball mill or the like, and mixed, and then the mixture is fired; thus, an effect of reducing cost can be obtained and excellent mass productivity is achieved.

Firing at a high temperature of 800° C. or higher in a synthesis process of the lithium-manganese composite oxide disclosed in this specification allows the oxide to have high crystallinity and excellent cycle characteristics.

Note that the description of these effects does not impede the existence of other effects. In one embodiment of the present invention, there is no need to obtain all the above effects. Other effects will be apparent from and can be derived from the description of the specification, the drawings, the claims, and the like.

BRIEF DESCRIPTION OF DRAWINGS

FIG. 2 illustrates a crystal structure of a comparative example of the present invention.

FIG. 3 illustrates a crystal structure of one embodiment of the present invention.

FIG. 4 illustrates a crystal structure of one embodiment of the present invention.

FIG. 5 illustrates a crystal structure of one embodiment of the present invention.

FIG. 7 illustrates a crystal structure of one embodiment of the present invention.

FIG. 8 illustrates a crystal structure of one embodiment of the present invention.

FIG. 9 illustrates a crystal structure of one embodiment of the present invention.

FIG. 10 illustrates a crystal structure of one embodiment of the present invention.

FIG. 23 is a graph showing measurement results of X-ray diffraction in one embodiment of the present invention.

FIGS. 39A to 39E each illustrate a flexible laminated storage battery.

FIGS. 41A1, 41A2, 41B1, and 41B2 each illustrate an example of a power storage device.

BEST MODE FOR CARRYING OUT THE INVENTION

Figure 1:
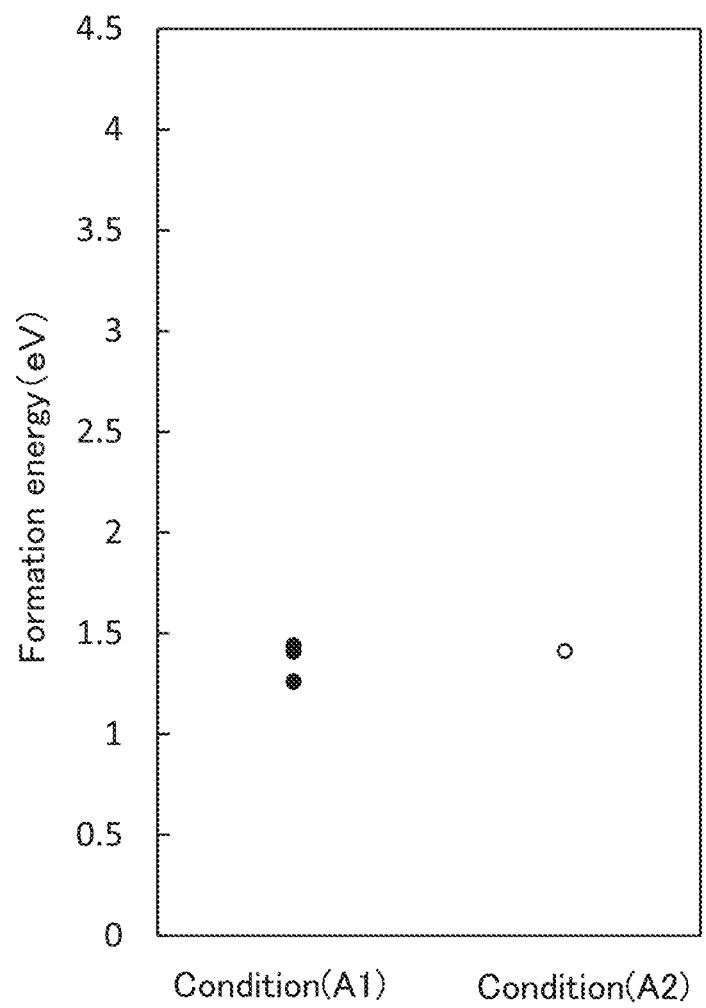
FIG. 1 is a graph showing calculation results of the formation energy of one embodiment of the present invention.

Hereinafter, embodiments of the present invention will be described in detail with reference to the accompanying drawings. However, the present invention is not limited to the description below, and it is easily understood by those skilled in the art that modes and details disclosed herein can be modified in various ways. The present invention is not construed as being limited to descriptions of the embodiments and examples.

Embodiment 1

In this embodiment, an example of a lithium-manganese composite oxide of one embodiment of the present invention will be described.

[1-1. Lithium-Manganese Composite Oxide]

In this embodiment, a lithium-manganese composite oxide formed by combining $LiMn_{2-A}M_AO_4$, which is a lithium manganese oxide, having a spinel crystal structure and $Li_2Mn_{1-B}M_BO_3$ having a layered rock-salt ($\alpha$-NaFeO$_2$) crystal structure is described. Note that M is a metal element other than lithium (Li) and manganese (Mn), or Si or P.

The lithium manganese composite oxide has a spinel crystal structure in part of the surface of each particle with a layered rock-salt crystal structure. In the case of using the lithium manganese composite oxide as a positive electrode active material of a lithium-ion secondary battery, lithium inside the particle is released or diffused through the region with a spinel crystal structure of the surface of the particle, resulting in high capacity. Furthermore, the lithium manganese composite oxide preferably includes a plurality of portions each with a spinel crystal structure such that the each particle is dotted with them. Note that in each particle of the lithium manganese composite oxide, a region with a layered rock-salt crystal structure is preferably larger than the regions each with a spinel crystal structure.

Each particle contains a plurality of crystallites and the size of each crystallite is smaller than that of the particle, specifically, less than or equal to 1 µm. Note that whether the particle contains a plurality of crystallites can be determined with a high resolution transmission electron microscope (TEM). Furthermore, a crystal structure can be determined with the use of a fast Fourier transformation pattern (FFT pattern) using a high resolution TEM image (multiple wave interference image). By comparison with data on $Li_2MnO_3$ with a layered rock-salt crystal structure or data on $LiMn_2O_4$ with a spinel structure, which is contained in a JCPDS card (database on index minerals for powder X-ray diffraction patterns), a crystal structure can be determined. Thus, when some portions in the same particle of the novel material are determined, at least a spot corresponding to a spinel crystal structure and a spot corresponding to a layered rock-salt crystal structure are observed. Note that a crystallite means the largest aggregation that can be regarded as a single crystal and refers to a fine single crystal. The size of one crystallite can be calculated (by Scherrer formula) from peak broadening of a diffraction pattern obtained using a powder X-ray diffraction method.

Figure 27:
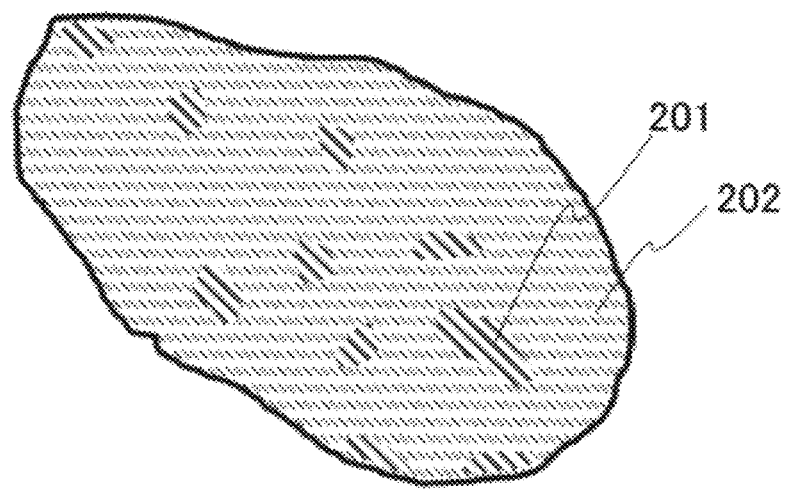
FIG. 27 is a model diagram illustrating one embodiment of the present invention.

The lithium manganese composite oxide can also be referred to as a composite material of crystallites of $LiMn_{2-A}M_AO_4$ (spinel crystallites) and crystallites of $Li_2Mn_{1-B}M_BO_3$ (layered rock-salt crystallites). FIG. 27 is a model diagram illustrating one particle of the lithium manganese composite oxide.

FIG. 27 illustrates that one particle includes at least two kinds of crystallites: a spinel crystallite 201 and a layered rock-salt crystallite 202. As in FIG. 27, in the lithium manganese composite oxide, one particle has a spinel crystal structure and a layered rock-salt crystal structure in contact with the spinel crystal structure. When a lithium battery using the lithium manganese composite oxide as a positive electrode active material is charged or discharged, lithium of $Li_2Mn_{1-B}M_BO_3$ in each particle is released or received through the spinel crystallites 201 which are scattered on the surface of the particle.

Figure 28:
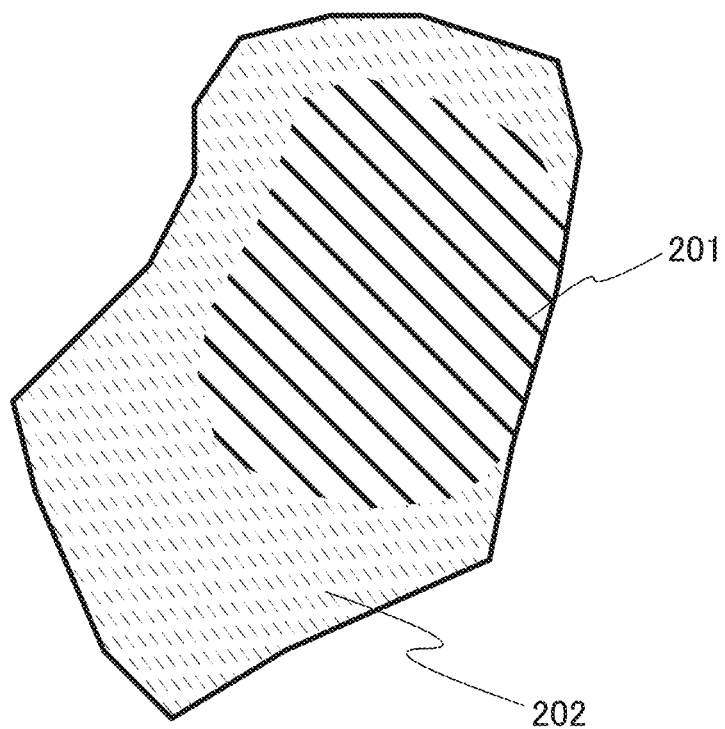
FIG. 28 is a model diagram illustrating one embodiment of the present invention.

Alternatively, as in a lithium-manganese composite oxide illustrated in FIG. 28, for example, the spinel crystallite 201 may be widely distributed on a surface of one particle.

The lithium-manganese composite oxide obtained in this embodiment is represented by $Li_xMn_yM_zO_w$ (M is a metal element other than lithium (Li) and manganese (Mn), or Si or P). In $Li_xMn_yM_zO_w$, the element represented by M is preferably a metal element selected from Ni, Ga, Fe, Mo, In, Nb, Nd, Co, Sm, Mg, Al, Ti, Cu, and Zn, or Si or P, and Ni is the most preferable. Note that the number of kinds of element selected as M is not necessarily one and may be two or more.

[1-2. Synthesis of Lithium-Manganese Composite Oxide]

A synthesis method of the lithium-manganese composite oxide represented by $Li_xMn_yM_zO_w$, is described in detail below. Here, Ni is used as the element M.

As raw materials of the lithium-manganese composite oxide, $Li_2CO_3$, $MnCO_3$, and NiO can be used, for example.

First, each of the raw materials is weighed to have the desired molar ratio.

Next, acetone is added to the powder of these materials, and then, they are mixed in a ball mill to prepare mixed powder.

After that, heating is performed to volatilize acetone, so that a mixed material is obtained.

Then, the mixed material is put into a crucible, and is subjected to first firing at temperatures higher than or equal to 800° C. and lower than or equal to 1100° C. in the air for 5 to 20 hours inclusive to synthesis a novel material.

Subsequently, grinding is performed to separate the sintered particles. For the grinding, acetone is added and then mixing is performed in a ball mill.

After the grinding, heating is performed to volatilize acetone, and then, vacuum drying is performed, so that a powdery novel material is obtained.

To increase the crystallinity or to stabilize the crystal, second firing may be performed after the first firing. The second firing is performed at temperatures higher than or equal to 500° C. and lower than or equal to 800° C., for example.

The second firing may be performed in a nitrogen atmosphere, for example.

Although $Li_2CO_3$, $MnCO_3$, and NiO are used as starting materials in this embodiment, the materials are not limited thereto and can be other materials.

When the ratio for weighing (also referred to as the feed ratio of raw materials) is changed, for example, a composite oxide with a layered rock-salt crystal structure and a spinel crystal structure can be obtained.

The ratio for weighing is the molar ratio between the raw materials used. For example, in the case where raw materials in which $Li_2CO_3$:$MnCO_3$:NiO=1:1.5:0.5 are used, the ratio of $MnCO_3$ to NiO is 3 ($MnCO_3$/NiO=1.5÷0.5). Note that the term "Ni/Mn (feed ratio of raw materials)" or "raw material feed ratio of Ni to Mn", for example, explains the molar ratio of Ni to Mn among raw materials used. In the case where raw materials in which $Li_2CO_3$:$MnCO_3$:NiO=1:1.5:0.5 are used, for example, Li/Ni is 4 (Li/Mn=(1×2)÷0.5), whereas Mn/Ni is 3 (Mn/Ni=1.5÷0.5).

Here, the idea of changing the ratio for weighing is described.

In $LiMn_2O_4$ with a spinel structure, the atomic ratio of Li to Mn is 1:2, whereas in $Li_2MnO_3$ with a layered rock-salt structure, the atomic ratio of Li to Mn is 2:1. Thus, when the ratio of Mn to Li is made larger than ½, the proportion of the spinel structure can be increased, for example.

Here, described is the case where $Li_2CO_3$ and $MnCO_3$ are used as starting materials so that the spinel crystallites 201 are included at approximately 2%.

$Li_2CO_3$ and $MnCO_3$ are weighed to have the ratio of 0.98:1.01, pulverized in a ball mill or the like, and fired at temperatures higher than or equal to 800° C. and lower than or equal to 1100° C.

Note that "the spinel crystallites 201 are included at approximately 2%" means that the layered rock-salt crystallites 202 are included at approximately 98%.

In the case where each particle includes the spinel crystallites 201 at approximately 5%, $Li_2CO_3$ and $MnCO_3$ are weighed so that the ratio of $Li_2CO_3$ to $MnCO_3$ is 0.955:1.03, and they are pulverized in a ball mill or the like and fired.

In the case where each particle includes the spinel crystallites 201 at approximately 50%, $Li_2CO_3$ and $MnCO_3$ are weighed so that the ratio of $Li_2CO_3$ to $MnCO_3$ is 0.64:1.28, and they are pulverized in a ball mill or the like and fired.

The novel material is formed by intentionally changing the feed ratio of raw materials so that the spinel crystallites 201 are included at greater than or equal to approximately 2% and less than or equal to 50%.

The above is the idea of changing the ratio for weighing.

Note that even in the case where raw materials are weighed so that the spinel crystallites are included at a predetermined proportion, the proportion of the spinel crystallites in an actually synthesized lithium-manganese composite oxide might be different from the predetermined proportion in some cases. As will be described in detail in Example, it is suggested that the lithium-manganese composite oxide of one embodiment of the present invention has a structure in which Mn is substituted at some of Li sites in $LiMnO_3$. Accordingly, in the case where the feed ratio is changed, that is, in the case where the ratio of Mn to Li is increased, the increased Mn might be used for both of the formation of spinel crystallites and the substitution of Mn at some Li sites in $LiMnO_3$ with a layered rock-salt structure.

Note that although the case where Ni is not contained is described here for easy understanding, the same applies to the case where Ni is contained.

The feed ratio is changed to form a lithium manganese composite oxide having a spinel crystal structure in part of the surface of each particle with a layered rock-salt crystal structure.

Figure 29:
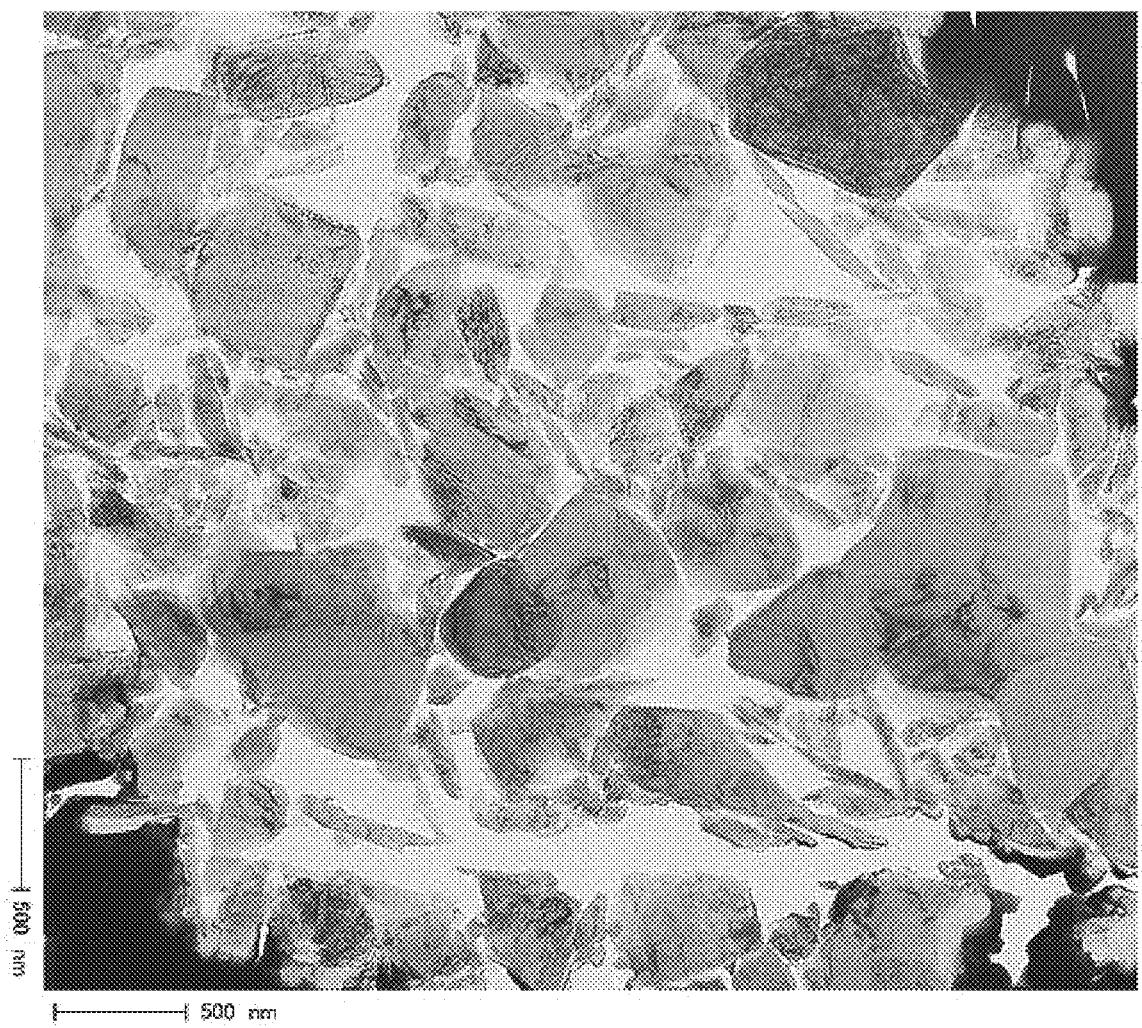
FIG. 29 is a cross-sectional TEM image of one embodiment of the present invention.

FIG. 29 is a cross-sectional TEM image of the novel material obtained in this embodiment.

Figure 30:
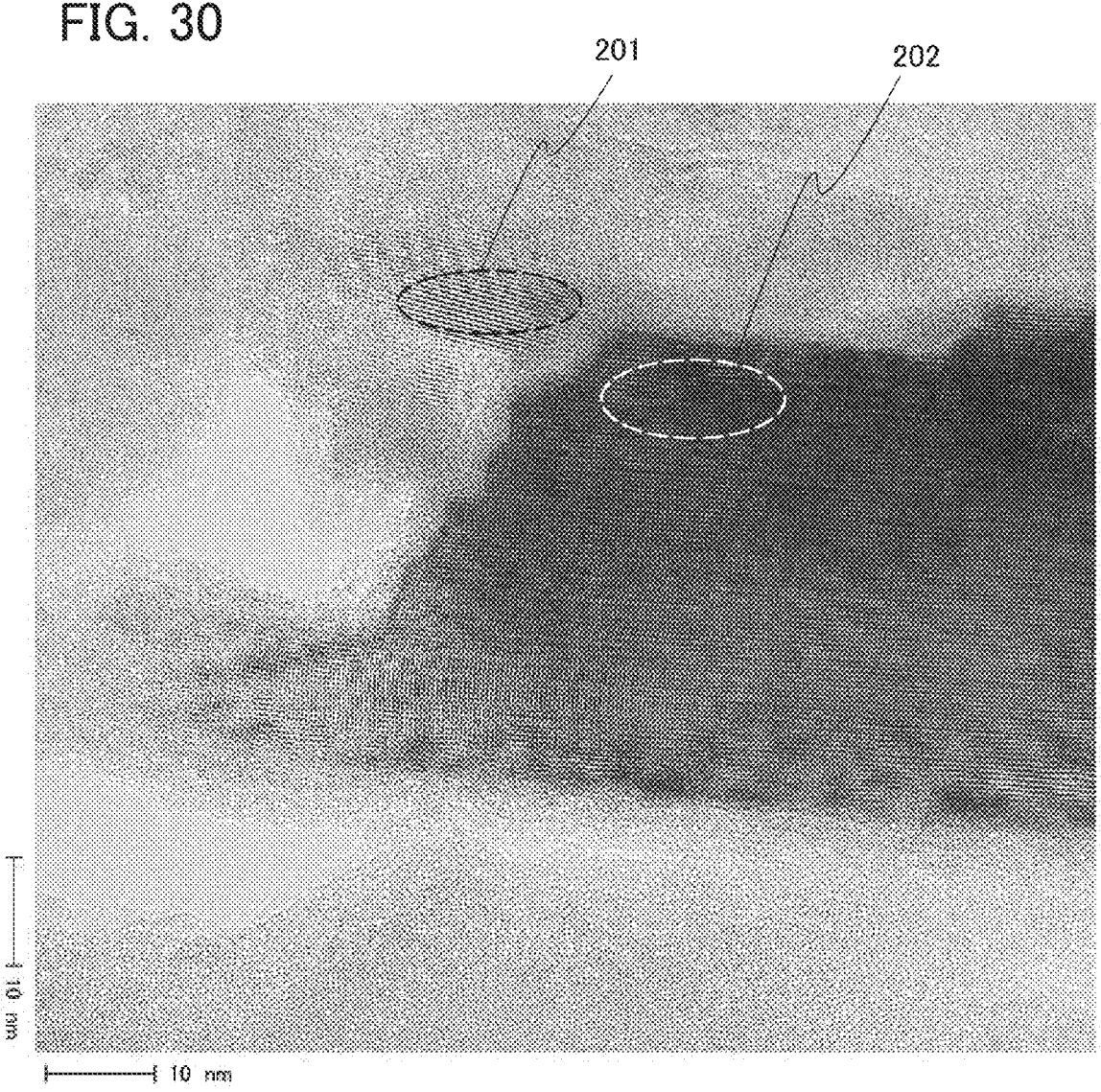
FIG. 30 is an enlarged partial image of FIG. 29.

FIG. 30 is an enlarged image of one of a plurality of particles in FIG. 29. As shown in FIG. 30, a region surrounded by a black dotted line corresponds to the spinel crystallite 201, and a region surrounded by a white dotted line corresponds to the layered rock-salt crystallite 202.

When an FFT pattern is obtained by the FFT analysis from a part of the region surrounded by the black dotted line in FIG. 30, the values determined by the positional relationship (e.g., a distance and an angle) of the obtained spots correspond to the data of JCPDS card (e.g., an incident angle and a diffraction intensity) on $LiMn_2O_4$ with a spinel crystal structure. Thus, the region can be identified to have a spinel crystal structure.

Furthermore, the positional relationship (e.g., a distance and an angle) of spots in an FFT pattern obtained by the FFT analysis from a part of the region surrounded by the white dotted line in FIG. 30 and that in the data contained in a JCPDS card (e.g., an incident angle and a diffraction intensity) on $Li_2MnO_3$ with a layered rock-salt crystal structure are compared. As a result, the region can be identified to have a layered rock-salt crystal structure.

Figure 31:
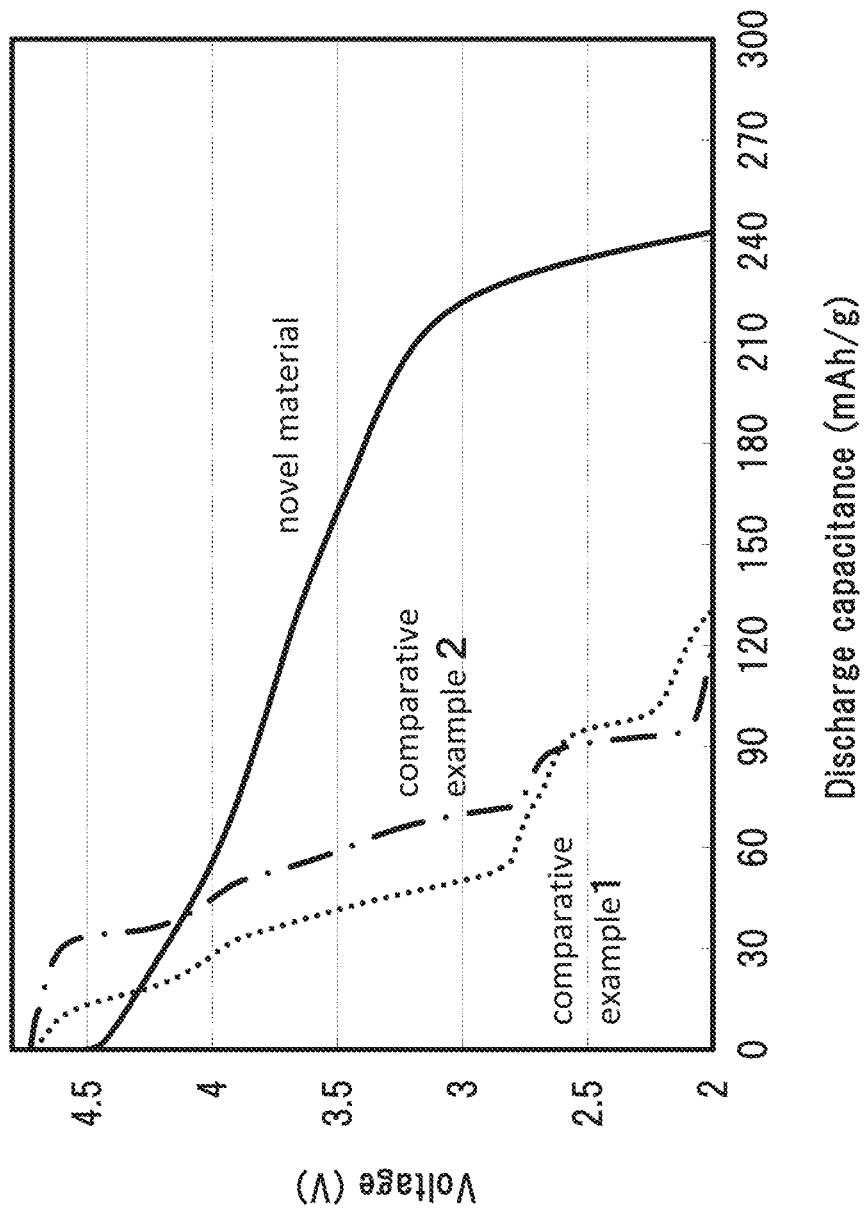
FIG. 31 is a graph showing the relationship between discharge capacity and voltage of one embodiment of the present invention.

FIG. 31 shows the discharge capacity of the obtained lithium-manganese composite oxide. The vertical axis represents voltage (V), and the horizontal axis represents discharge capacity (mAh/g). The plot denoted by "Novel material" shows the discharge capacity of the lithium-manganese composite oxide obtained in this embodiment.

Figure 32A:
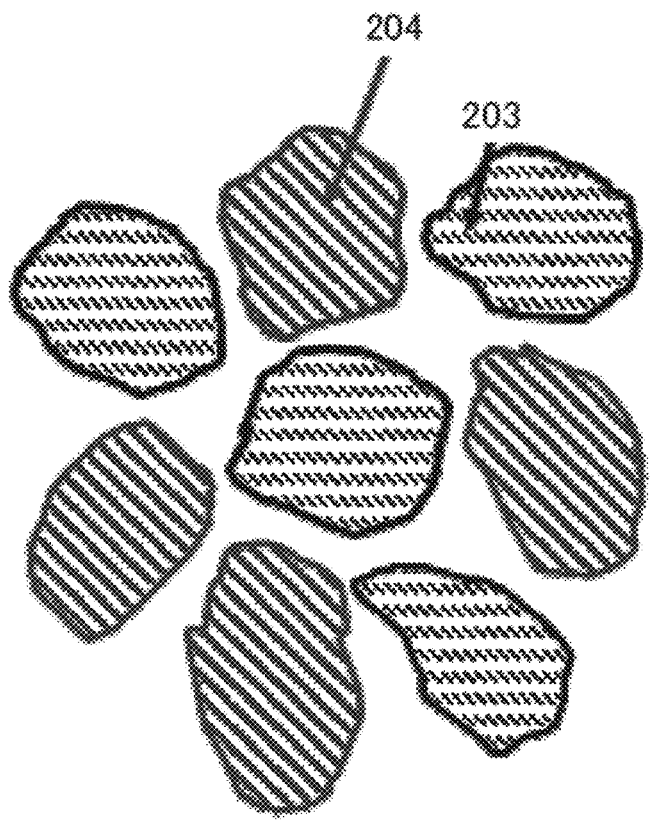
FIGS. 32A and 32B are model diagrams each illustrating a comparative example.
Figure 32B:
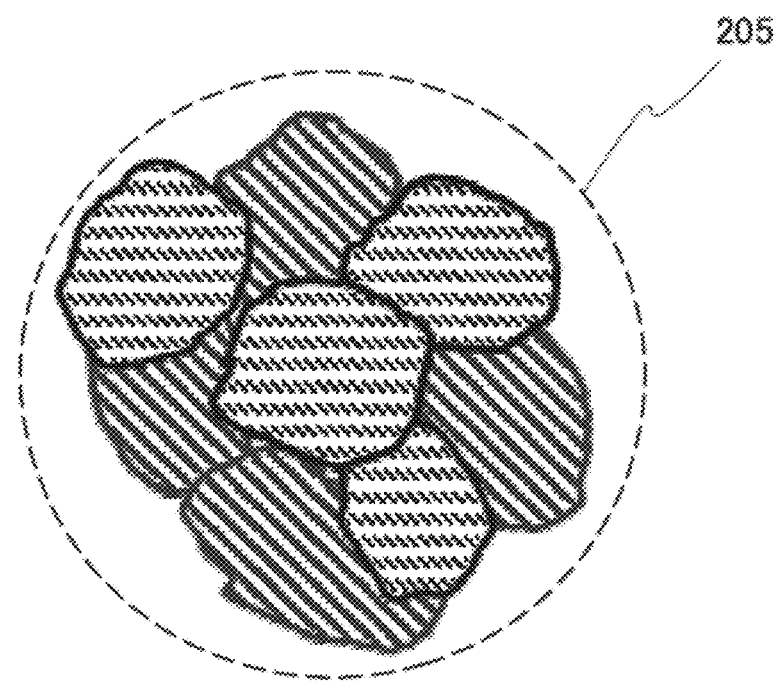

FIG. 32A illustrates a comparative example 1, and FIG. 32B illustrates a comparative example 2. The novel material is greatly different from the comparative examples 1 and 2 in structure and property. FIG. 32A illustrates a mixture of a plurality of particles, that is, a mixture of particles each having a spinel crystal structure and a size of several micrometers (Spi-$LiMn_2O_4$ particles 204) and $Li_2MnO_3$ particles 203 each having a layered rock-salt crystal structure and a size of several micrometers. FIG. 32B illustrates a material 205 obtained by sintering the mixture in FIG. 32A at high temperatures (e.g., 1000° C.). In obtaining the $Li_2MnO_3$ particles 203 from the comparative example 1 or 2, $Li_2CO_3$ (lithium carbonate) and $MnCO_3$ (manganese carbonate) are weighed so that the ratio of $Li_2CO_3$ to $MnCO_3$ is 1:1, and they are pulverized in a ball mill or the like and fired. In obtaining the Spi-$LiMn_2O_4$ particles 204, $Li_2CO_3$ and $MnCO_3$ are weighed so that the ratio of $Li_2CO_3$ to $MnCO_3$ is 0.5:2, and they are pulverized in a ball mill or the like and fired.

The comparative example 1, which corresponds to FIG. 32A, is a sample formed in such a manner that particles each having a size of several micrometers and a spinel crystal structure (Spi-$LiMn_2O_4$ particles 204) and the $Li_2MnO_3$ particles 203 each having a size of several micrometers and a layered rock-salt crystal structure are separately synthesized and the Spi-$LiMn_2O_4$ particles 204 and the $Li_2MnO_3$ particles 203 are mixed.

The comparative example 2, which corresponds to FIG. 32B, is a sample obtained by firing the comparative sample 1 at 1000° C.

As shown in FIG. 31, the discharge capacity of the obtained lithium-manganese composite oxide is superior to those of the comparative examples 1 and 2. Thus, the obtained lithium-manganese composite oxide having a spinel crystal structure in part of the surface of each layered rock-salt particle has a high capacity.

Note that the layered rock-salt crystal structure represented by the general formula $Li_2MO_3$ (M is a metal element, Si, or P) includes one M atom and two Li atoms; thus, if every Li contributes to charge and discharge, the capacity higher than that of the spinel crystal structure represented by the general formula $LiM_2O_4$ (M is a metal element, Si, or P) can be obtained. However, as shown in FIG. 31, the discharge capacity of the composite oxide of one embodiment of the present invention is much higher than that of a mixture of $LiM_2O_4$ and $Li_2MO_3$, such as the comparative example 1 or the comparative example 2. However, when too many spinel crystal structures with low capacity are mixed, the capacity of the obtained lithium-manganese composite oxide becomes low. Thus, it is important to synthesize a lithium-manganese composite oxide using spinel crystal structures as few as possible to obtain high capacity.

In the case where 100% of the lithium-manganese composite oxide $Li_xMn_yM_zO_w$ (M is a metal element other than lithium (Li) and manganese (Mn), or Si or P) is $LiMn_yM_zO_4$ (M is a metal element other than lithium (Li) and manganese (Mn), or Si or P) having a spinel crystal structure, $x=1$ and $(y+z)/w=0.5$ are satisfied, whereas in the case where 100% of $Li_xMn_yM_zO_w$ is $Li_2MnO_3$ having a layered rock-salt crystal structure, $x=2$ and $(y+z)/w=0.333$ are satisfied. Here, x changes because of charge and discharge; x is increased when lithium is released from a positive electrode and is decreased when lithium is inserted. Note that because the above relationships of x, y, z, and w are satisfied in the ideal case, the proportions of the elements might fluctuate by approximately 20% when either transition metals or oxygen is reduced during synthesis, for example. For this reason, $x \leq 2.2$, $y > 0$, $z > 0$, $w > 0$, and $0.26 \leq (y+z)/w < 0.5$ are satisfied. Since the proportion of the spinel crystal structures is preferably small, it is preferable that $0.3 \leq (y+z)/w \leq 0.45$ be also satisfied.

This embodiment can be implemented in combination with any of the other embodiments as appropriate.

Embodiment 2

In this embodiment, a lithium-manganese composite oxide of one embodiment of the present invention will be described.

[2-1. Lithium-Manganese Composite Oxide $Li_xMn_yM_zO_w$]

The inventors have found that high capacity can be obtained when a lithium-manganese composite oxide represented by $Li_xMn_yM_zO_w$ is used as a positive electrode material of a lithium-ion secondary battery. In addition, it has been suggested that the capacity depends on the ratio of Mn to the element M, and that high capacity can be obtained when the ratio is within a particular range.

The following describes the element M, and x, y, z, and w in the lithium-manganese composite oxide represented by $Li_xMn_yM_zO_w$ of one embodiment of the present invention. The element M is preferably a metal element other than lithium and manganese, or silicon or phosphorus. Furthermore, $0 \leq x/(y+z) < 2$, $y > 0$, $z > 0$, and $0.26 \leq (y+z)/w < 0.5$ are preferably satisfied. In addition, the ratio of the element M to Mn (z/y) is preferably greater than 0.2 and less than 1.2, further preferably greater than 0.2 and less than or equal to 0.9, still further preferably greater than or equal to 0.25 and less than or equal to 0.6.

In the case where Ni is used as the element M in the lithium-manganese composite oxide $Li_xMn_yM_zO_w$ described in this embodiment, the ratio of Ni to Mn (Ni/Mn) is set to greater than or equal to 0.276, so that the capacity of a battery in which the lithium-manganese composite oxide is used for a positive electrode active material layer included in a positive electrode can be increased. Note that the ratio of Ni to Mn (Ni/Mn) is the feed ratio of raw materials.

In the lithium-manganese composite oxide $Li_xMn_yM_zO_w$, Mn and M are substituted at some of the Li sites. In the case where Ni is used as the element M and the ratio of Ni to Mn (Ni/Mn, which is the feed ratio of raw materials) is greater than 0.2, preferably greater than or equal to 0.276, the 2b site, the 2c site, and the 4h site are occupied by Ni and Mn. Furthermore, the sum of the occupancy of Ni and the occupancy of Mn at the 2b site is greater than or equal to 40%, preferably greater than or equal to 40% and less than or equal to 85%, further preferably greater than or equal to 40% and less than or equal to 75%. In addition, the sum of the occupancy of Ni at the 2c site and the 4h site and the occupancy of Mn at the 2c site and the 4h site is greater than or equal to 0.2%, preferably greater than or equal to 0.5%.

When at least one of the 2b site, the 2c site, and the 4h site is occupied by Ni or Mn, crystal distortion, a change in electron state, or the like occurs; thus, Li is easily diffused. As a result, the capacity of the battery in which the lithium-manganese composite oxide is used for the positive electrode active material layer included in the positive electrode can be increased.

Although Ni is described as a typical example of M in the lithium-manganese composite oxide $Li_xMn_yM_zO_w$ here, another metal element other than lithium and manganese, or silicon or phosphorus can be used as appropriate to obtain the same effect.

[2-2. X-Ray Diffraction]

Next, a crystal structure is described which is identified by X-ray diffraction (XRD) measurement performed on an example of a lithium-manganese composite oxide $Li_xMn_yM_zO_w$ where Ni is used as M and the ratio of Ni to Mn (Ni/Mn, which is the feed ratio of raw materials) is greater than or equal to 0.276.

[2-3. Rietveld Analysis 1]

The crystal structure data of the lithium-manganese composite oxide can be acquired by the Rietveld analysis. As analysis software, TOPAS (DIFFRAC$^{plus}$ TOPAS Version 3) manufactured by Bruker AXS is used. On the assumption that the obtained lithium-manganese composite oxide has the first phase and the second phase, the Rietveld analysis is performed on the basis of the X-ray diffraction measurement. Fitting is performed under the conditions where the initial first phase is $Li_2MnO_3$ with a layered rock-salt structure that belongs to the space group C12/m1 and the initial second phase is $LiMn_2O_4$ with a spinel structure that belongs to the space group Fd-3m. Table 1 shows the crystal data of $Li_2MnO_3$ with a layered rock-salt structure (C12/m1). Table 2 shows the crystal data of $LiMn_2O_4$ with a spinel structure (Fd-3m). Data in Table 1 is cited from Non-Patent Document 1. Data in Table 2 is cited from TOPAS (DIFFRAC$^{plus}$ TOPAS Version 3) database and thus is the same as crystal data described in Non-Patent Document 2 although the expression is slightly different. Note that the coordinates might be changed from the initial coordinates by the fitting; however, the change does not greatly affect the symmetry. Note that here, for the calculation, "preferred orientation" was set and the algorithm of spherical harmonics was used.

TABLE 1

Layered rock-salt structure: $Li_2MnO_3$
Space group: C2/m (No. 12)
a(Å) = 4.9167, b(Å) = 8.5069, c(Å) = 5.0099
β(degree) = 109.373

| atom | site | x | y | z | B[Å$^2$] |
|---|---|---|---|---|---|
| Mn | 4g | 0 | 0.1663 | 0 | 0.73 |
| Li1 | 2b | 0 | 0.5 | 0 | 0.97 |
| Li2 | 2c | 0 | 0 | 0.5 | 0.97 |
| Li3 | 4h | 0 | 0.6560 | 0 | 0.97 |
| O1 | 4i | 0.2178 | 0 | 0.2253 | 0.64 |
| O2 | 8j | 0.2537 | 0.3220 | 0.2237 | 0.64 |

TABLE 2

Spinel structure: $LiMn_2O_4$
Space group: Fd-3m (No. 227)
a(Å) = 8.2404

| atom | site | x | y | z | B |
|---|---|---|---|---|---|
| Mn | 16c | 0 | 0 | 0 | 0.73 |
| Li | 8b | 0.3750 | 0.3750 | 0.3750 | 0.97 |
| O | 32e | 0.2380 | 0.2380 | 0.2380 | 0.64 |

In Tables 1 and 2, B denotes a temperature factor called the Debye-Waller factor. The weight proportion of the layered rock-salt structure that belongs to the space group C12/m1 to the spinel structure that belongs to the space group Fd-3m was calculated by the Rietveld analysis; accordingly, the weight proportion of the spinel structure is less than or equal to approximately 1.1% when the feed ratio of raw materials Ni/Mn is greater than or equal to 0.276.

[2-4. Rietveld Analysis 2]

Next, for more detailed examination of the occupancies of atoms at each site in a layered rock-salt crystal structure, calculation is performed for the occupancies of Li, Mn, and Ni at three sites: the 2b site, the 2c site, and the 4h site. Note that as shown in Table 1, in $Li_2MnO_3$ with a layered rock-salt structure that belongs to the space group C12/m1, the 2b site, the 2c site, and the 4h site are occupied by Li. Here, to calculate the occupancies of the atoms, the Rietveld analysis is performed on the assumption that the obtained lithium-manganese composite oxide $Li_xMn_yM_zO_w$ is a single layer of a layered rock-salt structure. Note that the occupancy is the probability of existence of an atom at a given site.

Because of the small difference of the X-ray scattering power between Ni and Mn, Ni and Mn are hard to distinguish. For this reason, the sum of the occupancy of Ni and the occupancy of Mn is discussed here.

The occupancies of an element X at the 2b site, the 2c site, and the 4h site are represented by $A(X)_{2b}$, $A(X)_{2c}$, and $A(X)_{4h}$. Note that the 2c site and the 4h site of $Li_2MnO_3$ are roughly distributed in a layered manner. Thus, the sum of the occupancies at the 4h site and the 2c site is calculated here. Because the number of the 4h sites are twice the number of the 2c sites, the occupancy $A(X)_{2c+4h}$, which is the sum of the occupancies at the 4h site and the 2c site, is defined by Formula (1).

$$A(X)_{2c+4h}=[A(X)_{2c}\times 1+A(X)_{4h}\times 2]\div(1+2) \quad (1)$$

The occupancy of the element M at the 2b site can be represented by $A(M)_{2b}$, for example. Furthermore, the occupancy of Mn at the 2b site can be represented by $A(Mn)_{2b}$.

Here, when the feed ratio of raw materials (Ni/Mn) is greater than or equal to 0.276, the sum of $A(Ni)_{2b}$ and $A(Mn)_{2b}$, $[A(Ni)_{2b}+A(Mn)_{2b}]$, is greater than or equal to 57.8%, and the sum of $A(Ni)_{2c+4h}$ and $A(Mn)_{2c+4h}$, $[A(Ni)_{2c+4h}+A(Mn)_{2c+4h}]$, is greater than or equal to approximately 1%.

[2-5. Calculation of Formation Energy]

In $Li_2MnO_3$ with a layered rock-salt structure that belongs to the space group C12/m1, Ni is substituted at each atomic site, and the electron state and the formation energy of the Ni substitution are calculated. The formation energy of the Ni substitution is calculated by using the following Formula (2).

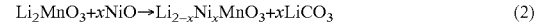

$$Li_2MnO_3+xNiO\rightarrow Li_{2-x}Ni_xMnO_3+xLiCO_3 \quad (2)$$

The cohesive energies of $Li_2MnO_3$, NiO, $Li_{2-x}Ni_xMnO_3$, and $LiCO_3$ are represented by $E_a$, $E_b$, $E_c$, and $E_d$, respectively, the formation energy $E_{form}$ is represented by the following Formula (3).

$$E_{form}=E_a+E_b-(E_c+E_d) \quad (3)$$

The electron state and the formation energy were numerically measured under the conditions shown in Table 3. The Vienna Ab initio Simulation Package (VASP) was used for the measurement of the electron state.

TABLE 3

| Pseudopotential/Functional | | PAW/HSE06 |
|---|---|---|
| Cut-off energy | | 800 eV |
| Sampling width of k-points | ka | 0.10 [/Å] |
| | kb | 0.12 [/Å] |
| | kc | 0.10 [/Å] |
| Spin polarization | | setup |

The supercell used for the calculation includes 32Li atoms, 16Mn atoms, and 48O atoms. Note that the supercell is a crystal lattice which is obtained by repeating the unit lattice (unit cell) natural number of times in the crystal axis directions and by being defined as a crystal periodic unit. Here, the supercell including 2×1×2 unit lattices (unit cells) is used. The unit lattice (unit cell) of $Li_2MnO_3$ includes 8Li atoms, 4Mn atoms, and 12O atoms. Note that a k-point is a lattice point in a reciprocal lattice space, and the sampling width of the k-points is the distance between the k-points used for sampling in a reciprocal lattice space.

[2-5. A. One-Site Substitution]

In Condition (A1), Ni is substituted at any of the 2b site, the 2c site, and the 4h site. Condition (A1) is represented by the following chemical formula (Formula (4)).

$$Li_{32-1}Mn_{16}NiO_{48} \quad (4)$$

In Condition (A2), Ni is substituted at the 4g site. Condition (A2) is represented by the following chemical formula (Formula (5)).

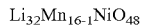
$$Li_{32}Mn_{16-1}NiO_{48} \quad (5)$$

FIG. 2 illustrates a crystal structure of $Li_2MnO_3$ before Ni substitution. FIG. 1 shows the calculation results of the formation energy under each of Conditions (A1) and (A2). FIG. 1 indicates that the minimum formation energy under Condition (A1) is smaller than that under Condition (A2). Thus, it is assumed that Ni is more likely to be substituted at the 2b site, the 2c site, and the 4h site than at the 4g site, where a Mn atom exists in $Li_2MnO_3$.

FIGS. 3 to 5 illustrate crystal structures corresponding to the calculation results in FIG. 1. FIGS. 3 and 4 each illustrate an example of atomic arrangement under Condition (A1). FIG. 3 illustrates an example of the atomic arrangement with the highest formation energy under Condition (A1) shown in FIG. 1, which is the case where Ni is substituted at the 4h site. FIG. 4 illustrates an example of the atomic arrangement with the lowest formation energy under Condition (A1), which is the case where Ni is substituted at the 2b site.

FIG. 5 illustrates an example of atomic arrangement under Condition (A2).

[2-5. B. Two-Site Substitution]

In Condition (B1), two Ni atoms are substituted at any of the 2b site, the 2c site, and the 4h site. Condition (B1) is represented by the following chemical formula (Formula (6)).

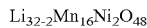
$$Li_{32-2}Mn_{16}Ni_2O_{48} \quad (6)$$

In Condition (B2), one Ni atom is substituted at any of the 2b site, the 2c site, and the 4h site and another Ni atom is substituted at the 4g site. Condition (B2) is represented by the following chemical formula (Formula (7)).

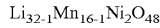
$$Li_{32-1}Mn_{16-1}Ni_2O_{48} \quad (7)$$

In Condition (B3), two Ni atoms are substituted at the 4g sites. Condition (B3) is represented by the following chemical formula (Formula (8)).

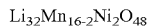
$$Li_{32}Mn_{16-2}Ni_2O_{48} \quad (8)$$

Figure 6:
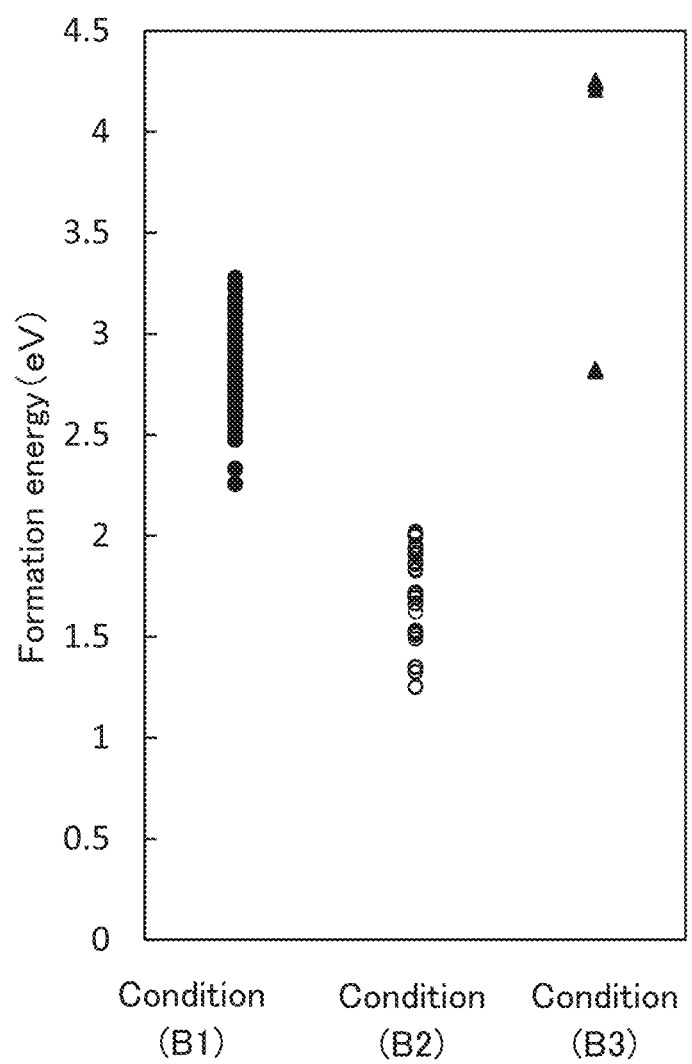
FIG. 6 is a graph showing calculation results of the formation energy of one embodiment of the present invention.

FIG. 6 shows the calculation results of the formation energy under each of Conditions (B1), (B2), and (B3). The formation energy under Condition (B3), that is, the formation energy of Ni substitution at the 4g site, is very high. In contrast, under Condition (B2), which is the case where one Ni atom is substituted at any of the 2b site, the 2c site, and the 4h site and another Ni atom is substituted at the 4g site, the formation energy of Ni substitution is low.

FIGS. 7 to 10 illustrate crystal structures corresponding to the calculation results in FIG. 6. Note that each of the crystal structures illustrated in FIGS. 7 to 10 is little larger than one unit of the supercell used for the calculation; although the supercell includes 32 Li atoms, 16 Mn atoms, and 48 O atoms as one unit, more atoms are illustrated in each of FIGS. 7 to 10.

FIGS. 7 and 8 each illustrate an example of atomic arrangement under Condition (B1). FIG. 7 illustrates an example of the atomic arrangement with the highest formation energy under Condition (B1) shown in FIG. 6, which is the case where one Ni atom is substituted at the 2b site and another Ni atom is substituted at the 2c site. FIG. 8 illustrates an example of the atomic arrangement with the lowest formation energy under Condition (B1), which is the case where two Ni atoms are substituted at the 2b sites. In FIG. 8, the substituted atoms are arranged close to each other.

FIGS. 9 and 10 are each an example of atomic arrangement under Condition (B2). FIG. 9 illustrates an example of the atomic arrangement with the highest formation energy under Condition (B2) shown in FIG. 6, which is the case where one Ni is substituted at the 2b site and another Ni atom is substituted at the 4g site.

FIG. 10 illustrates the atomic arrangement with the lowest formation energy under Condition (B2) shown in FIG. 6. FIG. 10 illustrates the case of Condition (B2) as in FIG. 9, in which one Ni atom is substituted at the 2b site and another Ni atom is substituted at the 4g site; FIG. 10 is different from FIG. 9 in that the Ni atoms are arranged in the same layer.

The above results suggest that the following applies to the case of Ni substitution in $Li_2MnO_3$. In the case of one-site substitution, the formation energy is low when a Ni atom is substituted at the 2b site of Li sites in $Li_2MnO_3$, the 2b site, the 2c site, and the 4h site. In the case of two-site substitution, the formation energy is low when one Ni atom is substituted at any of Li sites in $Li_2MnO_3$, the 2b site, the 2c site, and the 4h site, and another Ni atom is substituted at the 4g site, which is a Mn site in $Li_2MnO_3$.

Thus, also from the calculation of the formation energy, it is suggested that a Ni atom is likely to be substituted at any of the 2b site, the 2c site, and the 4h site, which are Li sites. In addition, the Rietveld analysis based on the X-ray diffraction suggests that a Ni atom or a Mn atom is possibly substituted at any of the 2b site, the 2c site, and the 4h site, which are Li sites. Accordingly, a Ni atom or a Mn atom probably occupies at least one of the 2b site, the 2c site, and the 4h site in the obtained lithium-manganese composite oxide.

When the lithium-manganese composite oxide described in this embodiment is used for a lithium-ion secondary battery, the battery can have high capacity and high energy density.

[2-6. Synthesis of Lithium-Manganese Composite Oxide]

A synthesis method of the lithium-manganese composite oxide represented by $Li_xMn_yM_zO_w$ is described in detail below. Here, Ni is used as the element M.

In this embodiment, the ratio for weighing is varied to obtain the lithium-manganese composite oxide of one embodiment of the present invention.

For easy understanding, the case where z=0, that is, the case of no Ni, is described first. In order to form $Li_2MnO_3$ with a layered rock-salt structure, which is a comparative sample, the molar ratio of lithium to manganese is set to 2:1, whereas in order to form the lithium-manganese composite oxide of one embodiment of the present invention, the ratio of lithium to manganese is decreased, for example.

Here, the case where z>0 is described. In that case, when the molar ratio of lithium to manganese in the case where z=0 is set to 1.68:1.12, some Mn atoms are substituted with Ni atoms. When the molar ratio of Mn to Ni is 0.8062:0.318, for example, the molar ratio of Li to Mn and Ni is set to 1.68: 0.8062:0.318. In the case where $Li_2CO_3$, $MnCO_3$, and NiO are used as starting materials, the starting materials are weighed so that the molar ratio of $Li_2CO_3$ to $MnCO_3$ and NiO is 0.84:0.8062:0.318.

Next, acetone is added to the powder of these materials, and then, they are mixed in a ball mill to prepare mixed powder.

After that, heating is performed to volatilize acetone, so that a mixed material is obtained.

Then, the mixed material is put into a crucible, and is subjected to first firing at temperatures higher than or equal to 800° C. and lower than or equal to 1100° C. in the air for 5 to 20 hours inclusive to synthesis a novel material.

Subsequently, grinding is performed to separate the sintered particles. For the grinding, acetone is added and then mixing is performed in a ball mill.

After the grinding, heating is performed to volatilize acetone, and then, vacuum drying is performed, so that a powdery novel material is obtained.

To further increase the capacity of the obtained $Li_xMn_yM_zO_w$, the ratio of the element M to Mn (M/Mn, which is the feed ratio of raw materials) is preferably greater than 0.2 and less than 1.2, further preferably greater than 0.2 and less than or equal to 0.9, still further preferably greater than or equal to 0.25 and less than or equal to 0.6.

To increase the crystallinity or to stabilize the crystal, second firing may be performed after the first firing. The second firing is performed at temperatures higher than or equal to 500° C. and lower than or equal to 800° C., for example.

The second firing may be performed in a nitrogen atmosphere, for example.

Although $Li_2CO_3$, $MnCO_3$, and NiO are used as starting materials in this embodiment, the materials are not limited thereto and can be other materials.

Accordingly, the obtained lithium-manganese composite oxide can be used as a positive electrode active material to form a favorable positive electrode.

This embodiment can be implemented in combination with any of the other embodiments as appropriate.

Embodiment 3

This embodiment shows an example in which $Li_2Mn_yM_{1-y}O_3$ (M is a metal element other than lithium (Li) and manganese (Mn), or Si or P) with a layered rock-salt ($\alpha$-NaFeO$_2$) crystal structure is used as a positive electrode active material.

A synthesis method of $Li_2Mn_yM_{1-y}O_3$ is described below. In this embodiment, the case where y=0.9 is described as an example. Table 4 shows raw materials for forming a comparative sample 150 and samples 151 to 166. In this embodiment, the comparative sample 150 and the samples 151 to 166 are formed by combination of the raw materials shown in Table 4. Note that "Li raw material", "Mn raw material", and "M raw material" in Table 4 are, for example, raw materials containing Li, Mn, and M, respectively. When M raw materials containing different elements M are used, various kinds of $Li_2Mn_yM_{1-y}O_3$ containing different elements M can be synthesized, for example.

TABLE 4

| | Li Material | Mn Material | M Material |
|---|---|---|---|
| Sample 150 | $Li_2CO_3$ | $MnCO_3$ | — |
| Sample 151 | $Li_2CO_3$ | $MnCO_3$ | NiO |
| Sample 152 | $Li_2CO_3$ | $MnCO_3$ | $Ga_2O_3$ |
| Sample 153 | $Li_2CO_3$ | $MnCO_3$ | $FeC_2O_4$ |
| Sample 154 | $Li_2CO_3$ | $MnCO_3$ | $MoO_3$ |
| Sample 155 | $Li_2CO_3$ | $MnCO_3$ | $In_2O_3$ |
| Sample 156 | $Li_2CO_3$ | $MnCO_3$ | $Nb_2O_5$ |
| Sample 157 | $Li_2CO_3$ | $MnCO_3$ | $Nd_2O_3$ |
| Sample 158 | $Li_2CO_3$ | $MnCO_3$ | $Co_3O_4$ |
| Sample 159 | $Li_2CO_3$ | $MnCO_3$ | $Sm_2O_3$ |
| Sample 160 | $Li_2CO_3$ | $MnCO_3$ | $NH_4H_2PO_4$ |
| Sample 161 | $Li_2CO_3$ | $MnCO_3$ | MgO |
| Sample 162 | $Li_2CO_3$ | $MnCO_3$ | $SiO_2$ |
| Sample 163 | $Li_2CO_3$ | $MnCO_3$ | $Al_2O_3$ |
| Sample 164 | $Li_2CO_3$ | $MnCO_3$ | $Ti_2O_3$ |
| Sample 165 | $Li_2CO_3$ | $MnCO_3$ | CuO |
| Sample 166 | $Li_2CO_3$ | $MnCO_3$ | ZnO |

First, the materials shown as the Li raw materials, the Mn raw materials, and the M raw materials in Table 4 are weighed. In this embodiment, samples in each of which y is 0.9 are formed. This means that each of the samples is formed so that the raw material feed ratio (molar ratio) of Li to Mn and M is adjusted to 2:0.9:0.1. In the case of forming the sample 151, for example, raw materials are weighed so that the molar ratio of lithium carbonate ($Li_2CO_3$) to manganese carbonate ($MnCO_3$) and nickel oxide (NiO) is set to be 1:0.9:0.1. In the case of forming the sample 152, raw materials are weighed so that the molar ratio of $Li_2CO_3$ to $MnCO_3$ and gallium oxide ($Ga_2O_3$) is set to 1:0.9:0.05. The comparative sample 150 and the samples 151 to 166 are formed in the same manner except for the feed ratios of raw materials.

Next, acetone is added to the raw materials, and then, the raw materials are mixed in a ball mill to form a mixed material. In this embodiment, the weighed materials, a zirconia ball with a diameter of 3 mm, and acetone are put into a pot made of zirconia, and wet ball milling using a planetary ball mill is performed at 400 rpm for 2 hours.

After that, heating is performed to volatilize acetone, so that a mixed material is obtained. In this embodiment, acetone in slurry subjected to the ball milling is volatilized at 50° C. in the air to obtain the mixed material.

Then, the mixed material is put into a melting pot, and is fired at temperatures in the range from 500° C. to 1000° C. in the air for 5 to 20 hours inclusive to synthesize a novel material. In this embodiment, an alumina melting pot is filled with the mixed material that has been dried, and heating is performed at 900° C. for 10 hours.

Subsequently, grinding is performed to separate the sintered particles. In this embodiment, the fired material, a zirconia ball with a diameter of 3 mm, and acetone are put into a pot made of zirconia, and wet ball milling using a planetary ball mill is performed at 200 rpm for 2 hours.

After the grinding, heating is performed to volatilize acetone, and then, vacuum drying is performed, so that powdery novel materials are obtained. In this embodiment, heating is performed on the mixture subjected to wet ball milling at 50° C. in the air to volatilize acetone, and then, vacuum drying is performed at 170° C.

Figure 33:
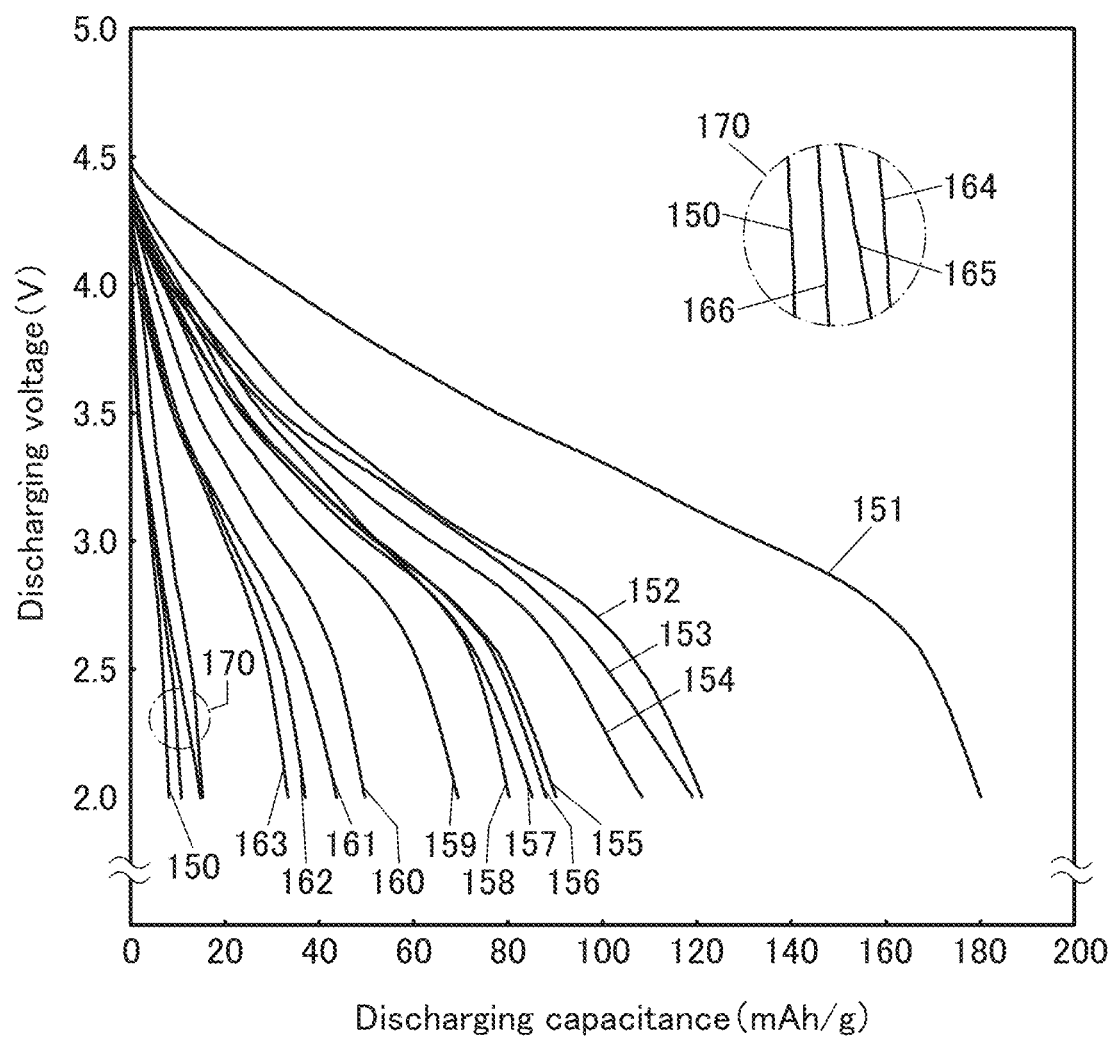
FIG. 33 is a graph showing the relationship between discharge capacity and voltage of one embodiment of the present invention and a comparative example.

FIG. 33 shows the measurement results of the discharge capacity of each of the comparative sample 150 and the samples 151 to 166. An enlarged view of a part 170 in FIG. 33 is illustrated in the upper right portion of the same drawing.

As illustrated in FIG. 33, each of the samples 151 and 166 has discharge capacity higher than that of the comparative sample 150. In particular, the sample 151 in which Ni is used as M has the highest discharge capacity.

Thus, the novel material (any of the samples 151 to 166) can be used as a positive electrode active material to form a favorable positive electrode.

This embodiment can be implemented in combination with any of the other embodiments as appropriate.

Embodiment 4

In this embodiment, the structure of a storage battery including the positive electrode active material formed by the forming method described in Embodiment 1 will be described with reference to FIGS. 36A to 36C, FIGS. 37A and 37B, and FIGS. 38A and 38B.

[Coin-Type Storage Battery]

Figure 36A:
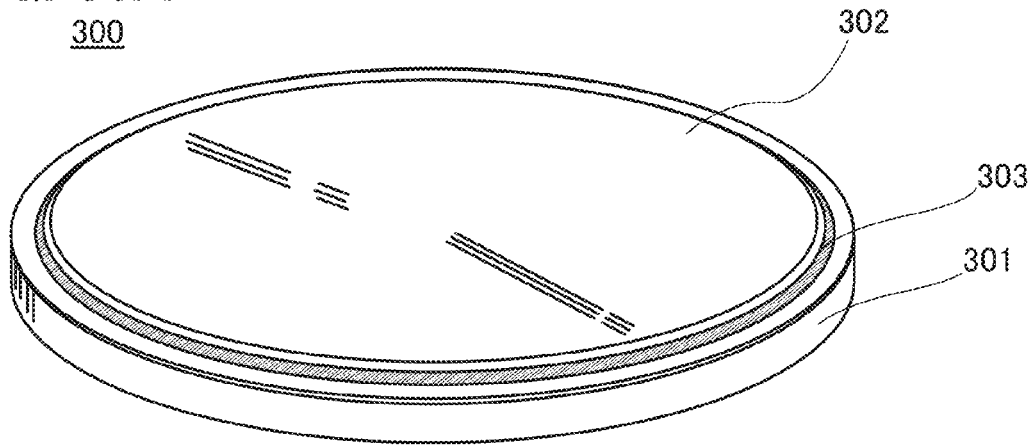
FIGS. 36A to 36C illustrate a coin-type storage battery.
Figure 36B:
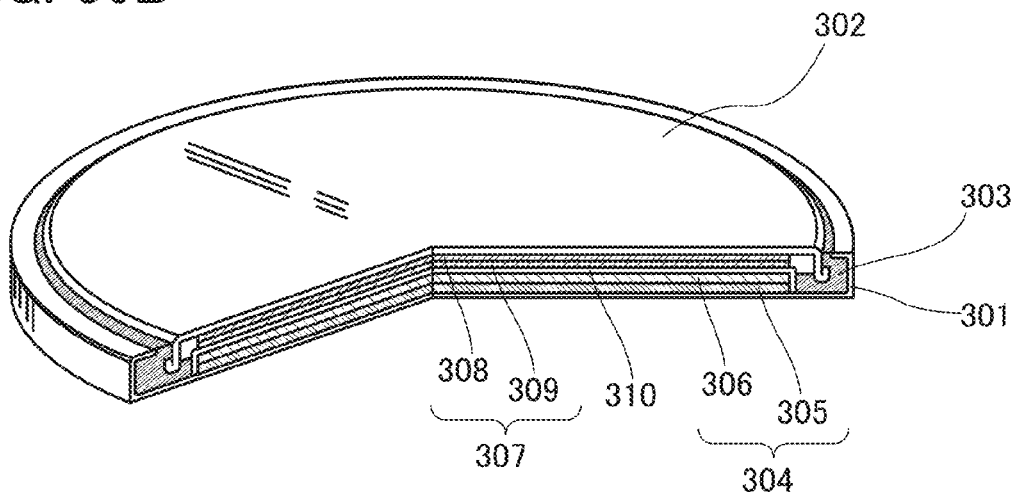

FIG. 36A is an external view of a coin-type (single-layer flat type) storage battery, and FIG. 36B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. The positive electrode active material layer 306 may further include a binder for increasing adhesion of positive electrode active materials, a conductive additive for increasing the conductivity of the positive electrode active material layer, and the like in addition to the active materials. As the conductive additive, a material that has a large specific surface area is preferably used; for example, acetylene black (AB) can be used. Alternatively, a carbon material such as a carbon nanotube, graphene, or fullerene can be used.

A negative electrode 307 includes a negative electrode current collector 308 and a negative electrode active material layer 309 provided in contact with the negative electrode current collector 308. The negative electrode active material layer 309 may further include a binder for increasing adhesion of negative electrode active materials, a conductive additive for increasing the conductivity of the negative electrode active material layer, and the like in addition to the negative electrode active materials. A separator 310 and an electrolyte (not illustrated) are provided between the positive electrode active material layer 306 and the negative electrode active material layer 309.

A material with which lithium can be dissolved and precipitated or a material into and from which lithium ions can be inserted and extracted can be used for the negative electrode active materials used for the negative electrode active material layer 309; for example, a lithium metal, a carbon-based material, and an alloy-based material can be used. The lithium metal is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (higher than or equal to 0.1 V and lower than or equal to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of a lithium metal.

For the negative electrode active materials, an alloy-based material which enables charge-discharge reactions by an alloying reaction and a dealloying reaction with lithium can be used. A material containing at least one of Al, Si, Ge, Sn, Pb, Sb, Bi, Ag, Au, Zn, Cd, In, Ga, and the like can be used, for example. Such elements have higher capacity than carbon. In particular, silicon has a significantly high theoretical capacity of 4200 mAh/g. For this reason, silicon is preferably used for the negative electrode active materials. Examples of the alloy-based material using such elements include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like. Here, SiO is a material that contains silicon at higher proportion than $SiO_2$ does.

Alternatively, for the negative electrode active materials, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), and molybdenum oxide ($MoO_2$) can be used.

Still alternatively, for the negative electrode active materials, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active materials and thus the negative electrode active materials can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active materials; for example, a transition metal oxide which does not cause an alloy reaction with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

The current collectors 305 and 308 can each be formed using a highly conductive material which is not alloyed with a carrier ion of lithium among other elements, such as a metal typified by stainless steel, gold, platinum, zinc, iron, nickel, copper, aluminum, titanium, and tantalum or an alloy thereof. Alternatively, an aluminum alloy to which an element which improves heat resistance, such as silicon, titanium, neodymium, scandium, and molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The current collectors can each have a foil-like shape, a plate-like shape (sheet-like shape), a net-like shape, a cylindrical shape, a coil shape, a punching-metal shape, an expanded-metal shape, or the like as appropriate. The current collectors each preferably have a thickness of 10 μm to 30 μm inclusive.

Any of the positive electrode active materials described in Embodiment 1 can be used for the positive electrode active material layer 306.

As the separator 310, an insulator such as cellulose (paper), polyethylene with pores, and polypropylene with pores can be used.

As an electrolyte in the electrolytic solution, a material which contains carrier ions is used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone, or two or more of them may be used in an appropriate combination and in an appropriate ratio.

Note that when carrier ions are alkali metal ions other than lithium ions, alkaline-earth metal ions, beryllium ions, or magnesium ions, instead of lithium in the above lithium salts, an alkali metal (e.g., sodium and potassium), an alkaline-earth metal (e.g., calcium, strontium, barium, beryllium, and magnesium) may be used for the electrolyte.

As a solvent of the electrolytic solution, a material in which carrier ions can transfer is used. As the solvent of the electrolytic solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent of the electrolytic solution, safety against liquid leakage is improved. Furthermore, the storage battery can be thinner and more lightweight. Typical examples of gelled high-molecular materials include a silicone gel, an acrylic gel, an acrylonitrile gel, polyethylene oxide, polypropylene oxide, a fluorine-based polymer, and the like. Alternatively, the use of one or more of ionic liquids (room temperature molten salts) which have features of non-flammability and non-volatility as a solvent of the electrolytic solution can prevent the storage battery from exploding or catching fire even when the storage battery internally shorts out or the internal temperature increases owing to overcharging and others.

Instead of the electrolytic solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. When the solid electrolyte is used, a separator and a spacer are not necessary. Furthermore, the battery can be entirely solidified; therefore, there is no possibility of liquid leakage and thus the safety of the battery is dramatically increased.

For the positive electrode can 301 and the negative electrode can 302, a metal having a corrosion-resistant property to an electrolytic solution in charging and discharging a secondary battery, such as nickel, aluminum, and titanium, an alloy of any of the metals, an alloy containing any of the metals and another metal (e.g., stainless steel), a stack of any of the metals, a stack including any of the metals and any of the alloys (e.g., a stack of stainless steel and aluminum), or a stack including any of the metals and another metal (e.g., a stack of nickel, iron, and nickel) can be used. The positive electrode can 301 and the negative electrode can 302 are electrically connected to the positive electrode 304 and the negative electrode 307, respectively.

The negative electrode 307, the positive electrode 304, and the separator 310 are immersed in the electrolytic solution. Then, as illustrated in FIG. 36B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

Here, a current flow in charging a battery will be described with reference to FIG. 36C. When a battery using lithium is regarded as a closed circuit, lithium ions transfer and a current flows in the same direction. Note that in the battery using lithium, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" and the negative electrode is referred to as a "negative electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, it should be mentioned that the anode or the cathode is which of the one at the time of charging or the one at the time of discharging and corresponds to which of a positive electrode or a negative electrode.

Figure 36C:
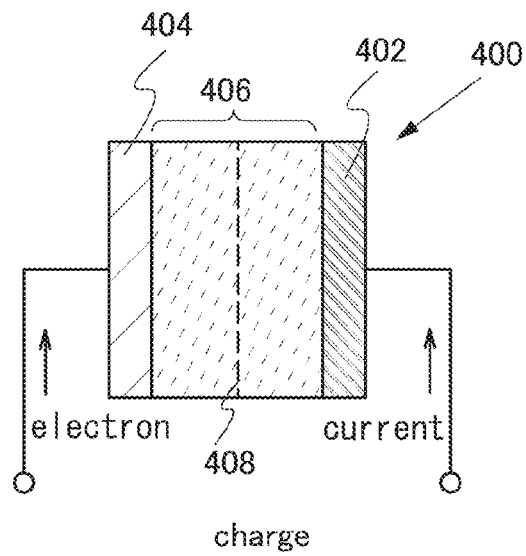

Two terminals in FIG. 36C are connected to a charger, and a storage battery 400 is charged. As the charge of the storage battery 400 proceeds, a potential difference between electrodes increases. The positive direction in FIG. 36C is the direction in which a current flows from one terminal outside the storage battery 400 to a positive electrode 402, flows from the positive electrode 402 to a negative electrode 404 in the storage battery 400, and flows from the negative electrode 404 to the other terminal outside the storage battery 400. In other words, a current flows in the direction of a flow of a charging current.

[Cylindrical Storage Battery]

Figure 37A:
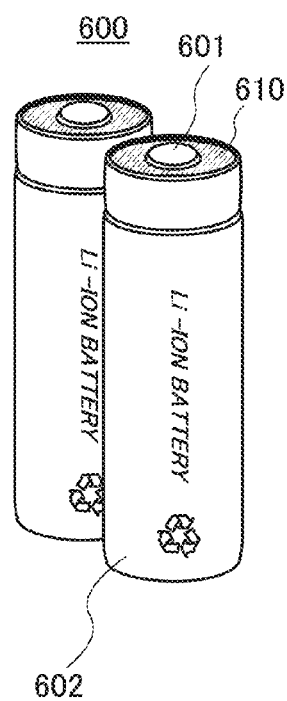
FIGS. 37A and 37B illustrate a cylindrical storage battery.

Next, an example of a cylindrical storage battery will be described with reference to FIGS. 37A and 37B. As illustrated in FIG. 37A, a cylindrical storage battery 600 includes a positive electrode cap (battery cap) 601 on the top surface and a battery can (outer can) 602 on the side surface and bottom surface. The positive electrode cap 601 and the battery can 602 are insulated from each other by a gasket (insulating gasket) 610.

Figure 37B:
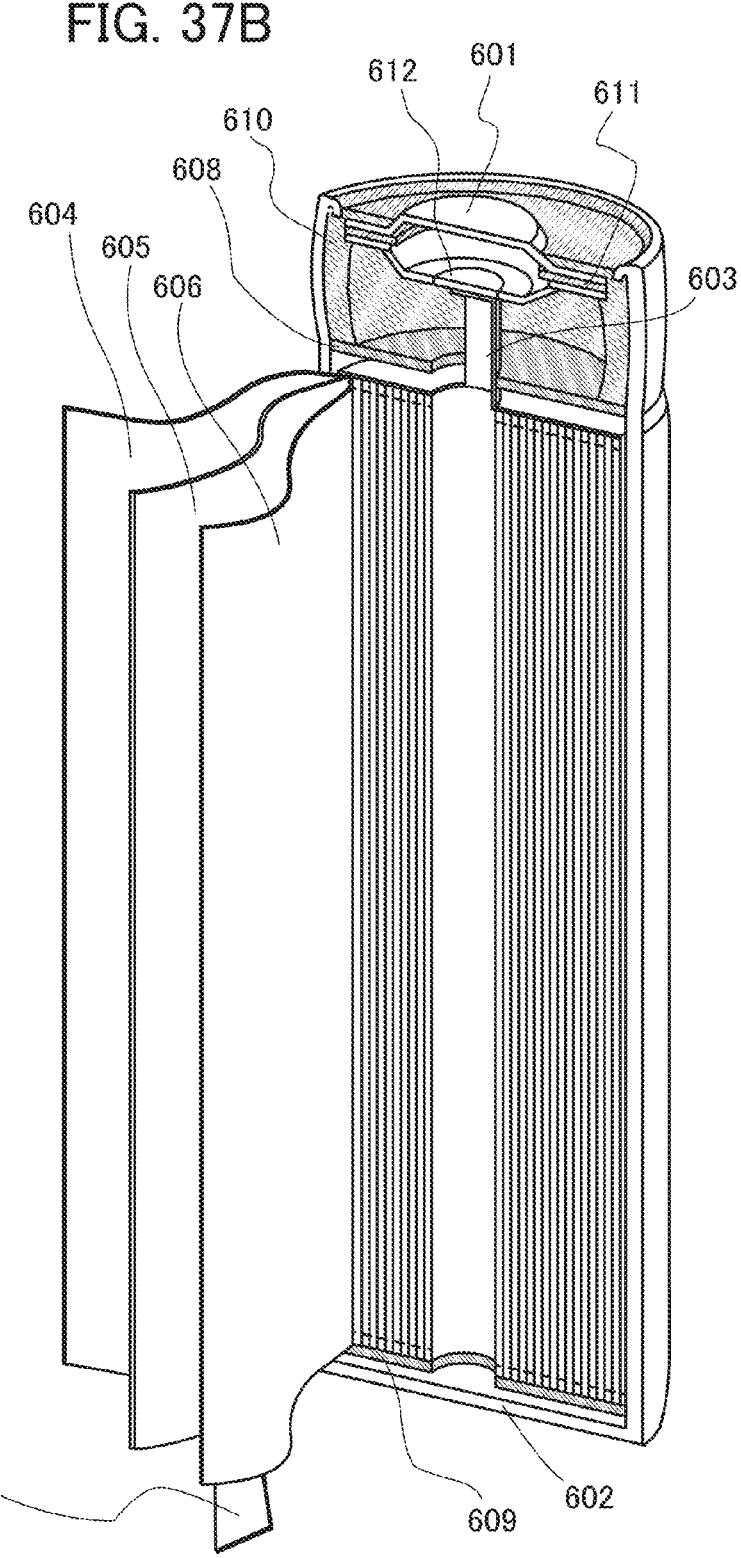

FIG. 37B is a diagram schematically illustrating a cross section of the cylindrical storage battery. Inside the battery can 602 having a hollow cylindrical shape, a battery element in which a strip-like positive electrode 604 and a strip-like negative electrode 606 are wound with a stripe-like separator 605 interposed therebetween is provided. Although not illustrated, the battery element is wound around a center pin. One end of the battery can 602 is close and the other end thereof is open. For the battery can 602, a metal having corrosion resistance to an electrolytic solution, such as nickel, aluminum, or titanium, an alloy of such a metal, or an alloy of such a metal and another metal (e.g., stainless steel) can be used. Alternatively, the battery can 602 is preferably covered with a corrosive metal such as nickel, aluminum, or the like in order to prevent corrosion caused by an electrolytic solution. For example, plating is used. Inside the battery can 602, the battery element in which the positive electrode, the negative electrode, and the separator are wound is provided between a pair of insulating plates 608 and 609 which face each other. Inside the battery can 602, the battery element in which the positive electrode, the negative electrode, and the separator are wound is interposed between a pair of insulating plates 608 and 609 which face each other. Furthermore, a nonaqueous electrolytic solution (not illustrated) is injected inside the battery can 602 provided with the battery element. As the nonaqueous electrolytic solution, a nonaqueous electrolytic solution which is similar to that of the above coin-type storage battery can be used.

Although the positive electrode 604 and the negative electrode 606 can be formed in a manner similar to that of the positive electrode and the negative electrode of the coin-type storage battery described above, the difference lies in that, since the positive electrode and the negative electrode of the cylindrical storage battery are wound, active materials are formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic can be used for the PTC element.

[Laminated Storage Battery]

Next, an example of a laminated storage battery will be described with reference to FIG. 38A. When a flexible laminated storage battery is used in an electronic device at least part of which is flexible, the storage battery can be bent as the electronic device is bent.

Figure 38A:
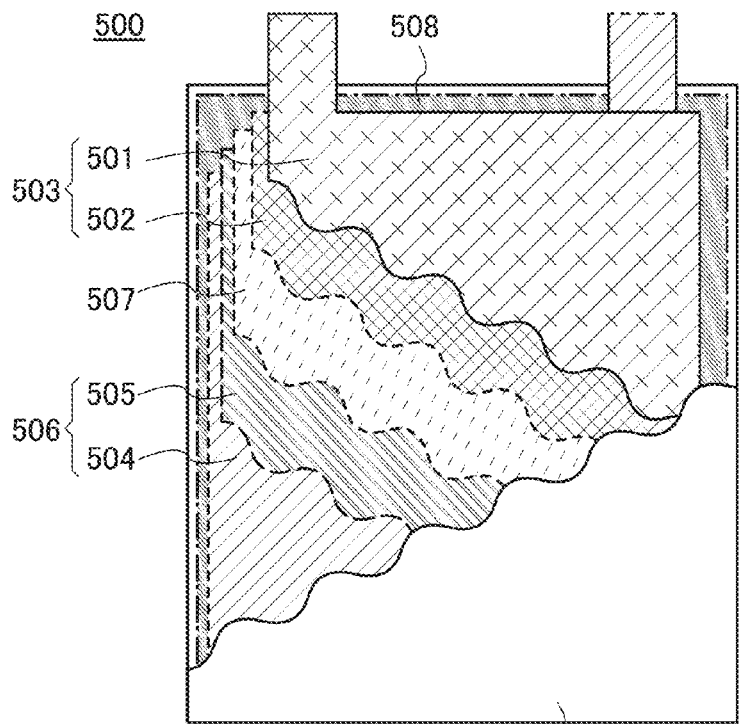
FIGS. 38A and 38B each illustrate a laminated storage battery.

A laminated storage battery 500 illustrated in FIG. 38A includes a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is provided between the positive electrode 503 and the negative electrode 506 in the exterior body 509. The exterior body 509 is filled with the electrolytic solution 508. Any of the positive electrode active materials described in Embodiment 1 can be used for the positive electrode active material layer 502.

In the laminated storage battery 500 illustrated in FIG. 38A, the positive electrode current collector 501 and the negative electrode current collector 504 also serve as terminals for an electrical contact with an external portion. For this reason, each of the positive electrode current collector 501 and the negative electrode current collector 504 is arranged so that part of the positive electrode current collector 501 and part of the negative electrode current collector 504 are exposed to the outside the exterior body 509. Alternatively, a lead electrode and the positive electrode current collector 501 or the negative electrode current collector 504 may be bonded to each other by ultrasonic welding, and instead of the positive electrode current collector 501 and the negative electrode current collector 504, the lead electrode may be exposed to the outside the exterior body 509.

As the exterior body 509 in the laminated storage battery 500, for example, a laminate film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used. With such a three-layer structure, permeation of the electrolytic solution and a gas can be blocked and an insulating property can be obtained.

Figure 38B:
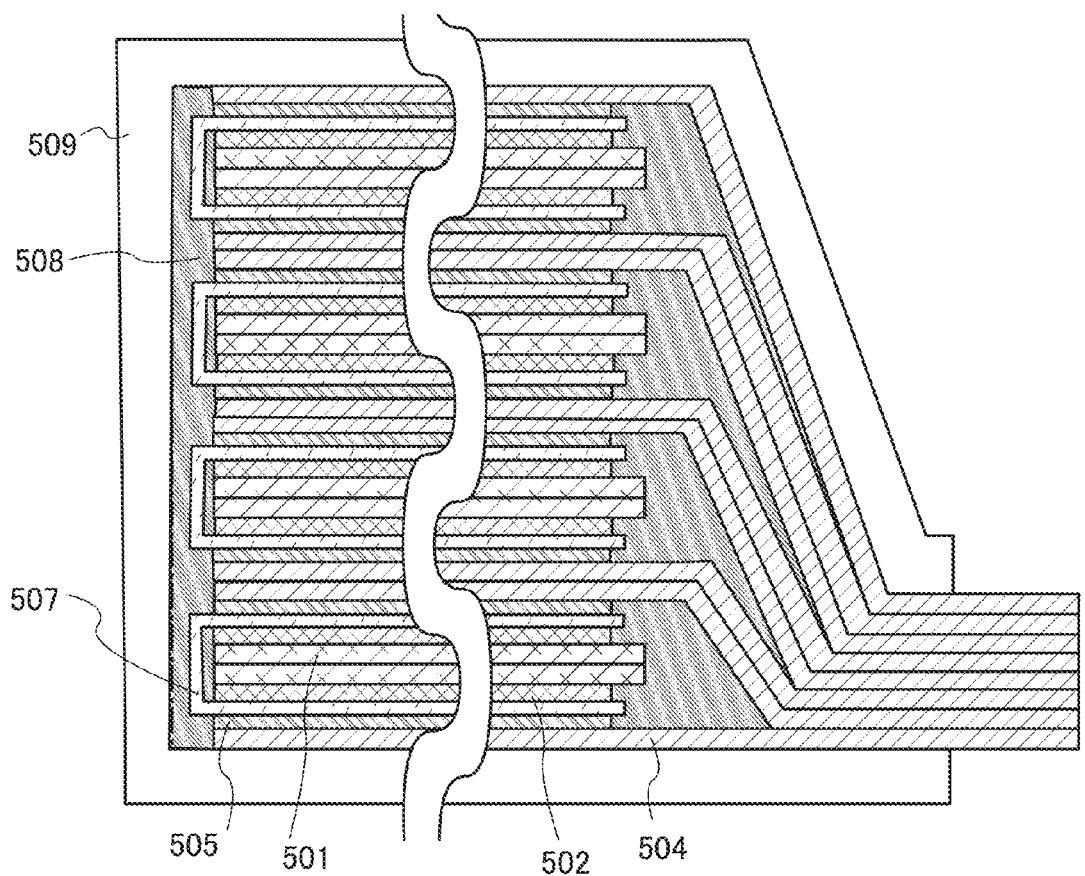

FIG. 38B illustrates an example of the cross-sectional structure of the laminated storage battery 500. Although FIG. 38A illustrates an example of including only two current collectors for simplicity, the actual battery includes more electrode layers.

The example in FIG. 38B includes 16 electrode layers. The laminated storage battery 500 has flexibility even though including 16 electrode layers. In FIG. 38B, 8 negative electrode current collectors 504 and 8 positive electrode current collectors 501 are included. Note that FIG. 38B illustrates a cross section of the lead portion of the negative electrode, and 8 negative electrode current collectors 504 are bonded to each other by ultrasonic welding. It is needless to say that the number of electrode layers is not limited to 16, and may be more than 16 or less than 16. In the case of a large number of electrode layers, the storage battery can have high capacity. In contrast, in the case of a small number of electrode layers, the storage battery can have small thickness and high flexibility.

Figure 46:
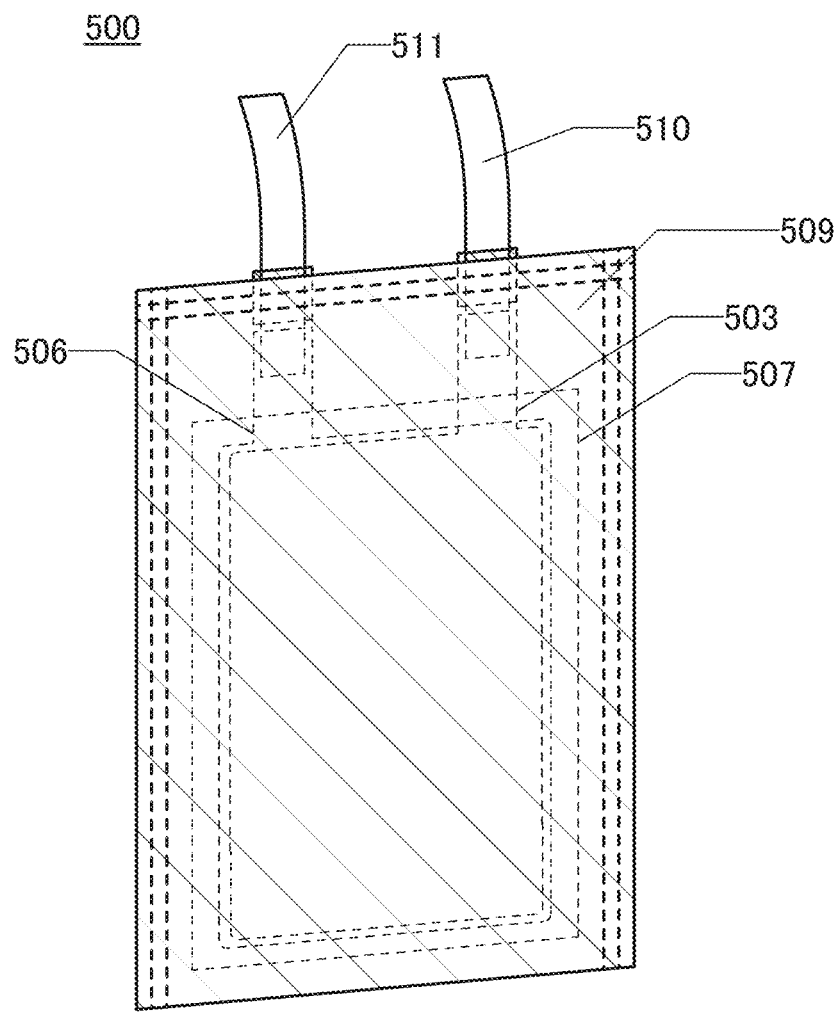
FIG. 46 is an external view of a storage battery.
Figure 47:
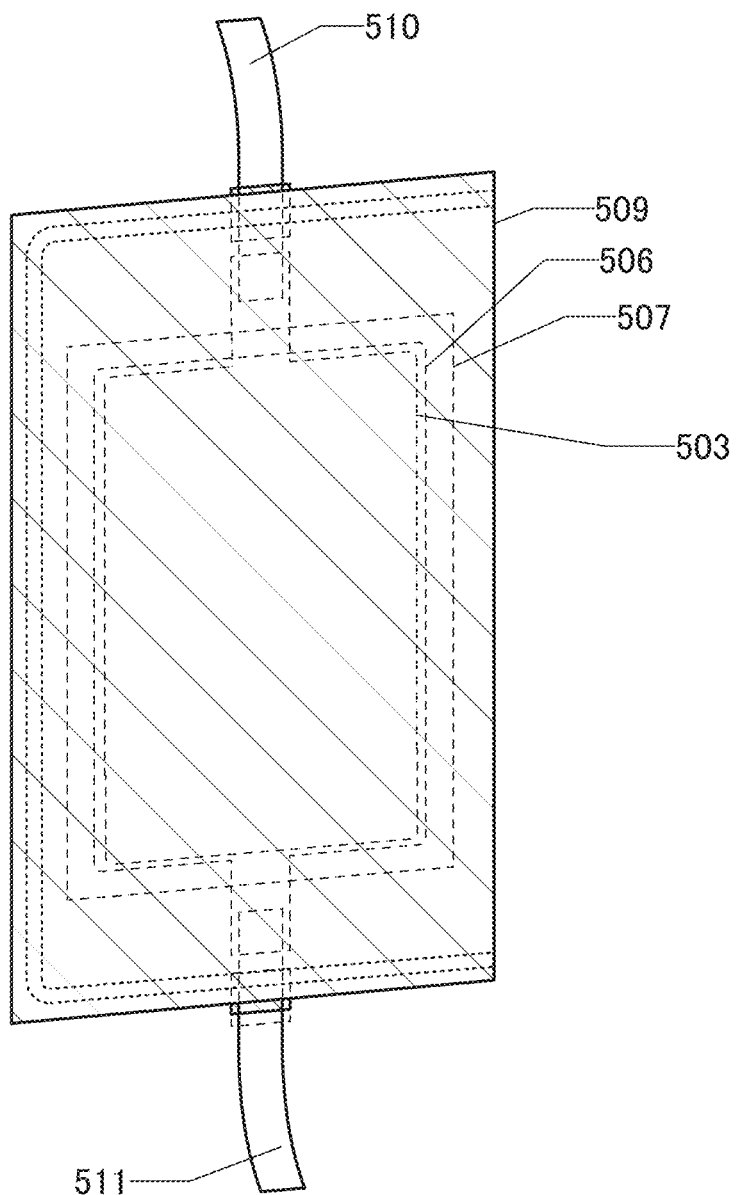
FIG. 47 is an external view of a storage battery.

FIGS. 46 and 47 each illustrate an example of the external view of the laminated storage battery 500. In FIGS. 46 and 47, the positive electrode 503, the negative electrode 506, the separator 507, the exterior body 509, a positive electrode lead 510, and a negative electrode lead 511 are included.

Figure 48A:
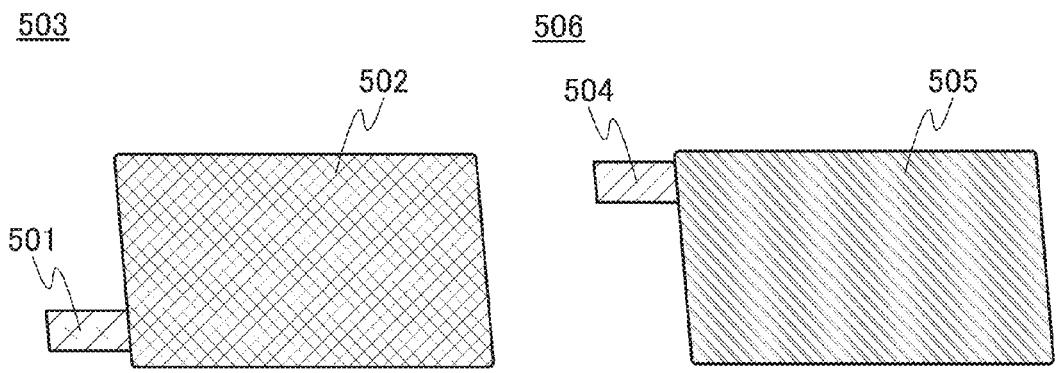
FIG. 48A illustrates electrodes of a storage battery and FIGS. 48B and 48C illustrate a method for forming the storage battery.

FIG. 48A illustrates the external views of the positive electrode 503 and the negative electrode 506. The positive electrode 503 includes the positive electrode current collector 501, and the positive electrode active material layer 502 is formed on a surface of the positive electrode current collector 501. The positive electrode 503 also includes an exposed region of the positive electrode current collector 501 (hereinafter, also referred to as a tab region). The negative electrode 506 includes the negative electrode current collector 504, and the negative electrode active material layer 505 is formed on a surface of the negative electrode current collector 504. The negative electrode 506 also includes an exposed region of the negative electrode current collector 504, that is, a tab region. The areas and the shapes of the tab regions included in the positive electrode and the negative electrode are not limited to those illustrated in FIG. 48A.

[Method for Forming Laminated Storage Battery]

Figure 48B:
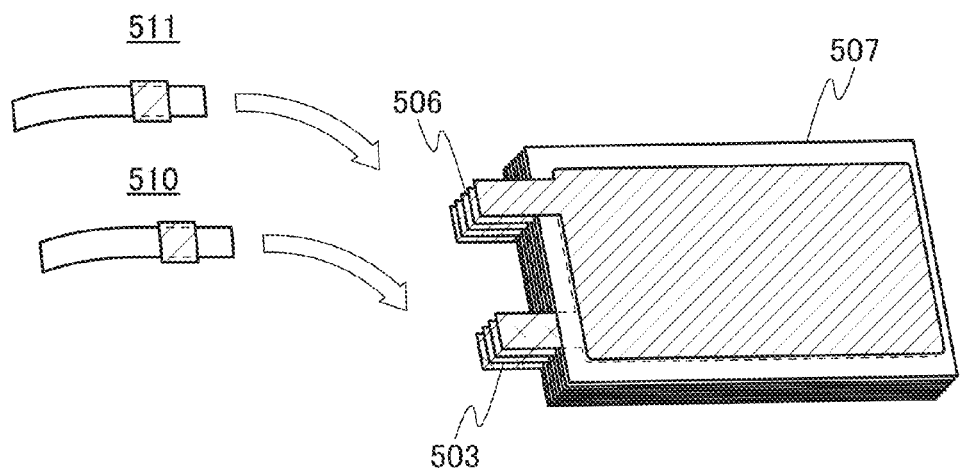

An example of a method for forming the laminated storage battery whose external view is illustrated in FIG. 46 will be described with reference to FIGS. 48B and 48C.

First, the negative electrode 506, the separator 507, and the positive electrode 503 are stacked. FIG. 48B illustrates a stack including the negative electrode 506, the separator 507, and the positive electrode 503. The battery described here as an example includes 5 negative electrodes and 4 positive electrodes. Next, the tab regions of the positive electrodes 503 are bonded to each other, and the tab region of the positive electrode on the outermost surface and the positive electrode lead 510 are bonded to each other. The bonding can be performed by ultrasonic welding, for example. In addition, the tab regions of the negative electrodes 506 are bonded to each other, and the tab region of the negative electrode on the outermost surface and the negative electrode lead 511 are bonded to each other.

After that, the negative electrode 506, the separator 507, and the positive electrode 503 are placed over the exterior body 509.

Figure 48C:
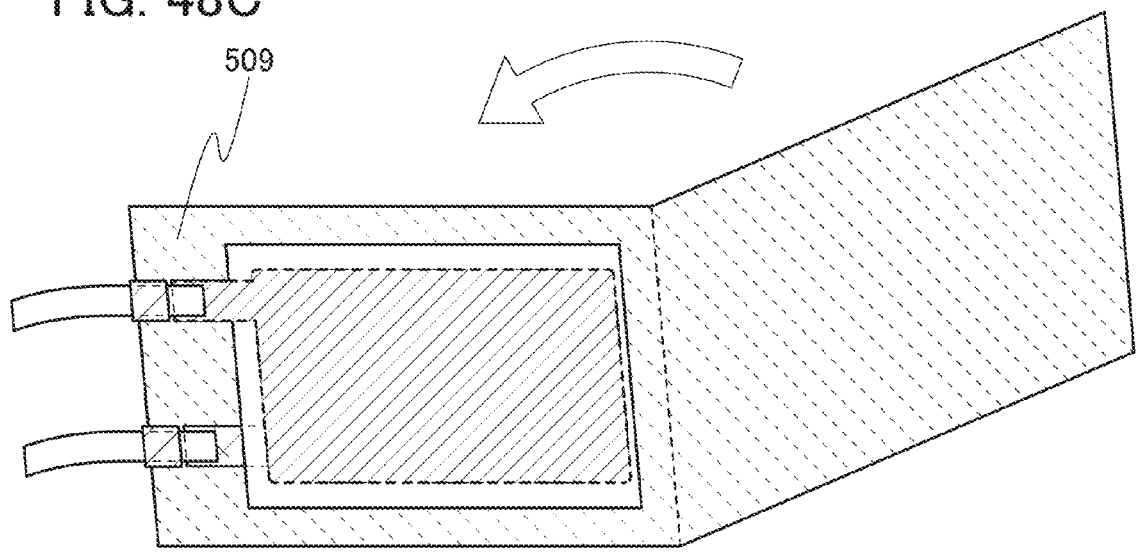

Subsequently, the exterior body 509 is folded along a dashed line as illustrated in FIG. 48C. Then, the outer edge of the exterior body 509 is bonded. The bonding can be performed by thermocompression, for example. At this time, a part (or one side) of the exterior body 509 is left unbonded (to provide an inlet) so that the electrolytic solution 508 can be introduced later.

Next, the electrolytic solution 508 is introduced into the exterior body 509 from the inlet of the exterior body 509. The electrolytic solution 508 is preferably introduced in a reduced pressure atmosphere or in an inert gas atmosphere. Lastly, the inlet is bonded. In the above manner, the laminated storage battery 500 can be formed.

Note that in this embodiment, the coin-type storage battery, the laminated storage battery, and the cylindrical storage battery are given as examples of the storage battery; however, any of storage batteries with a variety of shapes, such as a sealed storage battery and a square-type storage battery, can be used. Furthermore, a structure in which a plurality of positive electrodes, a plurality of negative electrodes, and a plurality of separators are stacked or wound may be employed.

For each of the positive electrodes of the storage batteries 300, 500, and 600, which are described in this embodiment, the positive electrode active layer of one embodiment of the present invention is used. Thus, the discharge capacity of the storage batteries 300, 500, and 600 can be increased.

[Examples of Electronic Devices]

FIGS. 39A to 39E illustrate examples of electronic devices including flexible laminated storage batteries. Examples of an electronic device including a flexible power storage device include television devices (also referred to as televisions or television receivers), monitors of computers or the like, cameras such as digital cameras or digital video cameras, digital photo frames, mobile phones (also referred to as mobile phones or mobile phone devices), portable game machines, portable information terminals, audio reproducing devices, large game machines such as pachinko machines, and the like.

In addition, a flexible power storage device can be incorporated along a curved inside/outside wall surface of a house or a building or a curved interior/exterior surface of a car.

FIG. 39A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

The mobile phone 7400 illustrated in FIG. 39B is bent. When the whole mobile phone 7400 is bent by the external force, the power storage device 7407 included in the mobile phone 7400 is also bent. FIG. 39C illustrates the bent power storage device 7407. The power storage device 7407 is a laminated storage battery.

FIG. 39D illustrates an example of a bangle display device. A portable display device 7100 includes a housing 7101, a display portion 7102, an operation button 7103, and a power storage device 7104. FIG. 39E illustrates the bent power storage device 7104.

[Structural Example of Power Storage Device]

Structural examples of power storage devices (storage batteries) will be described with reference to FIGS. 40A and 40B, FIGS. 41A1, 41A2, 41B1, and 41B2, FIGS. 42A and 42B, FIGS. 43A and 43B, and FIG. 44.

Figure 40A:
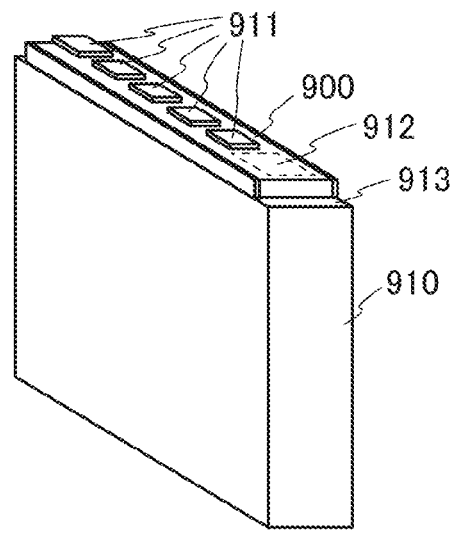
FIGS. 40A and 40B illustrate an example of a power storage device.
Figure 40B:
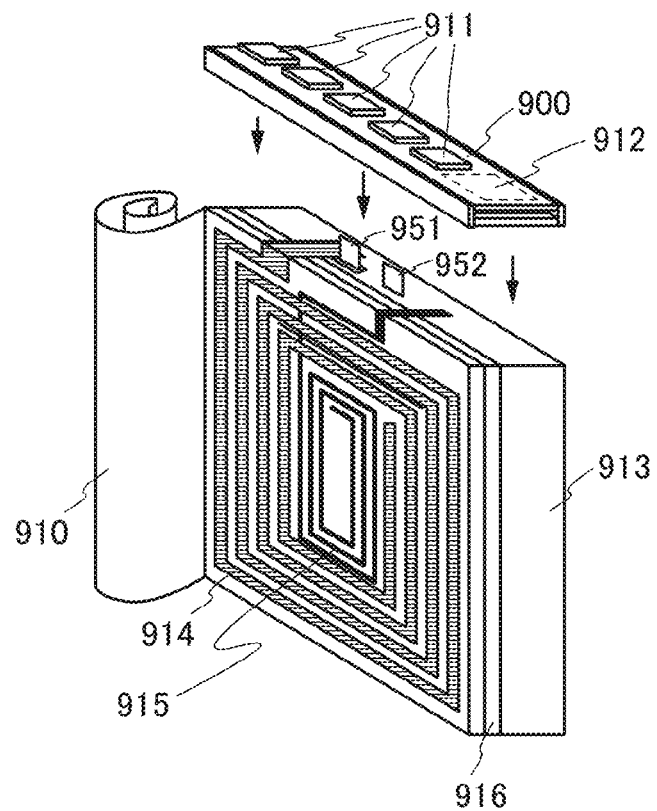

FIGS. 40A and 40B are external views of the power storage device. The power storage device includes a circuit board 900 and a power storage unit 913. A label 910 is attached to the power storage unit 913. Further, as shown in FIG. 40B, the power storage device includes a terminal 951 and a terminal 952, and includes an antenna 914 and an antenna 915 between the power storage unit 913 and the label 910.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear side of the circuit board 900. Note that each of the antennas 914 and 915 is not limited to having a coil shape and may have a linear shape or a plate shape. Further, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage device includes a layer 916 between the power storage unit 913 and the antennas 914 and 915. The layer 916 has a function of preventing the power storage unit 913 from shielding an electromagnetic field. As the layer 916, for example, a magnetic body can be used. The layer 916 may serve as a shielding layer.

Note that the structure of the power storage device is not limited to that shown in FIGS. 40A and 40B.

For example, as shown in FIGS. 41A1 and 41A2, two opposing surfaces of the power storage unit 913 in FIGS. 40A and 40B may be provided with respective antennas. FIG. 41A1 is an external view showing one side of the opposing surfaces, and FIG. 41A2 is an external view showing the other side of the opposing surfaces. Note that for portions similar to those in FIGS. 40A and 40B, description on the power storage device shown in FIGS. 40A and 40B can be referred to as appropriate.

As shown in FIG. 41A1, the antenna 914 is provided on one of the opposing surfaces of the power storage unit 913 with the layer 916 provided therebetween, and as shown in FIG. 41A2, the antenna 915 is provided on the other of the opposing surfaces of the power storage unit 913 with a layer 917 provided therebetween. The layer 917 has a function of preventing the power storage unit 913 from shielding an electromagnetic field. As the layer 917, for example, a magnetic body can be used. The layer 917 may serve as a shielding layer.

With the above structure, both of the antennas 914 and 915 can be increased in size.

Alternatively, as shown in FIGS. 41B1 and 41B2, two opposing surfaces of the power storage unit 913 in FIGS. 40A and 40B may be provided with different types of antennas. FIG. 41B1 is an external view showing one side of the opposing surfaces, and FIG. 41B2 is an external view showing the other side of the opposing surfaces. Note that for portions similar to those in FIGS. 40A and 40B, description on the power storage device shown in FIGS. 40A and 40B can be referred to as appropriate.

As shown in FIG. 41B1, the antennas 914 and 915 are provided on one of the opposing surfaces of the power storage unit 913 with the layer 916 provided therebetween, and as shown in FIG. 41B2, an antenna 918 is provided on the other of the opposing surfaces of the power storage unit 913 with the layer 917 provided therebetween. The antenna 918 has a function of performing data communication with an external device, for example. An antenna with a shape that can be applied to the antennas 914 and 915, for example, can be used as the antenna 918. As a system for communication using the antenna 918 between the power storage device and another device, a response method which can be used between the power storage device and another device, such as NFC, can be employed.

Figure 42A:
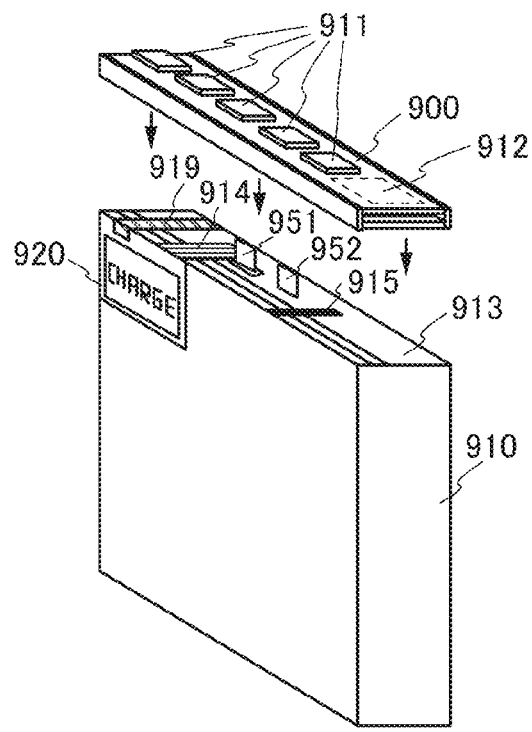
FIGS. 42A and 42B each illustrate an example of a power storage device.

Alternatively, as shown in FIG. 42A, the power storage unit 913 in FIGS. 40A and 40B may be provided with a display device 920. The display device 920 is electrically connected to the terminal 911 via a terminal 919. It is possible that the label 910 is not provided in a portion where the display device 920 is provided. Note that for portions similar to those in FIGS. 40A and 40B, description on the power storage device shown in FIGS. 40A and 40B can be referred to as appropriate.

The display device 920 can display, for example, an image showing whether or not charging is being carried out, an image showing the amount of stored power, or the like. As the display device 920, electronic paper, a liquid crystal display device, an electroluminescent (EL) display device, or the like can be used. For example, power consumption of the display device 920 can be reduced when electronic paper is used.

Figure 42B:
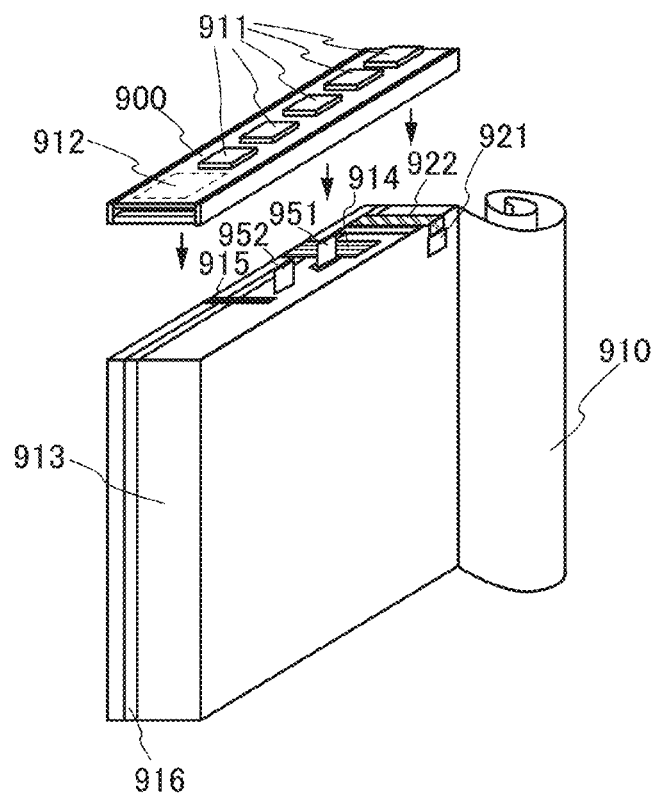

Alternatively, as shown in FIG. 42B, the power storage unit 913 in FIGS. 40A and 40B may be provided with a sensor 921. The sensor 921 is electrically connected to the terminal 911 via a terminal 922. Note that the sensor 921 may be provided between the power storage unit 913 and the label 910. Note that for portions similar to those in FIGS. 40A and 40B, description on the power storage device shown in FIGS. 40A and 40B can be referred to as appropriate.

The sensor 921 has a function of measuring displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays. With the sensor 921, for example, data on an environment (e.g., temperature) where the power storage device is placed can be detected and stored in a memory inside the circuit 912.

Further, structural examples of the power storage unit 913 are described with reference to FIGS. 43A and 43B and FIG. 44.

Figure 43A:
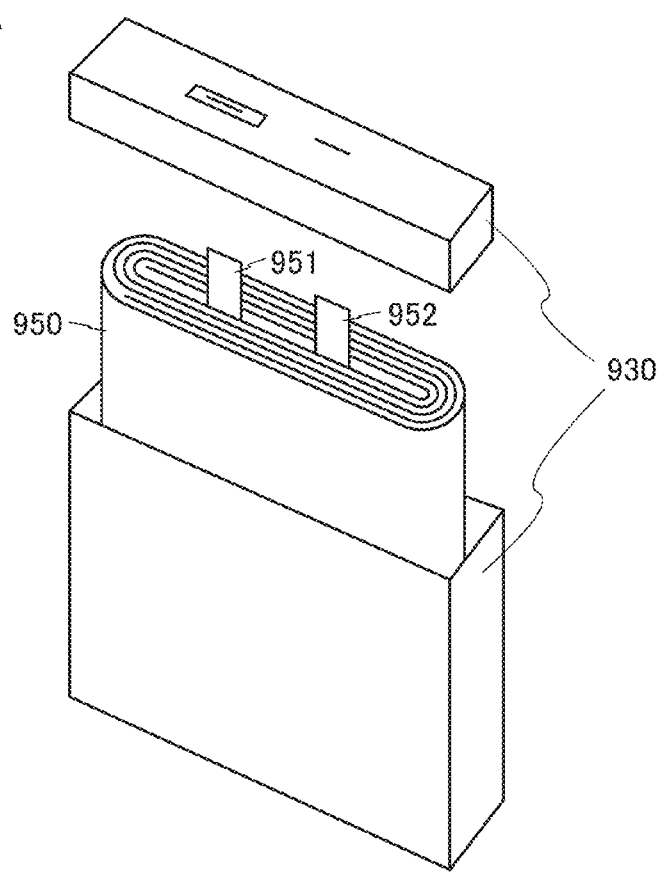
FIGS. 43A and 43B each illustrate an example of a power storage device.

The power storage unit 913 shown in FIG. 43A includes a wound body 950 provided with the terminals 951 and 952 inside a housing 930. The wound body 950 is soaked in an electrolytic solution inside the housing 930. The terminal 952 is in contact with the housing 930. An insulator or the like prevents contact between the terminal 951 and the housing 930. Note that in FIG. 43A, the housing 930 divided into two pieces is illustrated for convenience; however, in the actual structure, the wound body 950 is covered with the housing 930 and the terminals 951 and 952 extend to the outside of the housing 930. For the housing 930, a metal material (e.g., aluminum) or a resin material can be used.

Figure 43B:
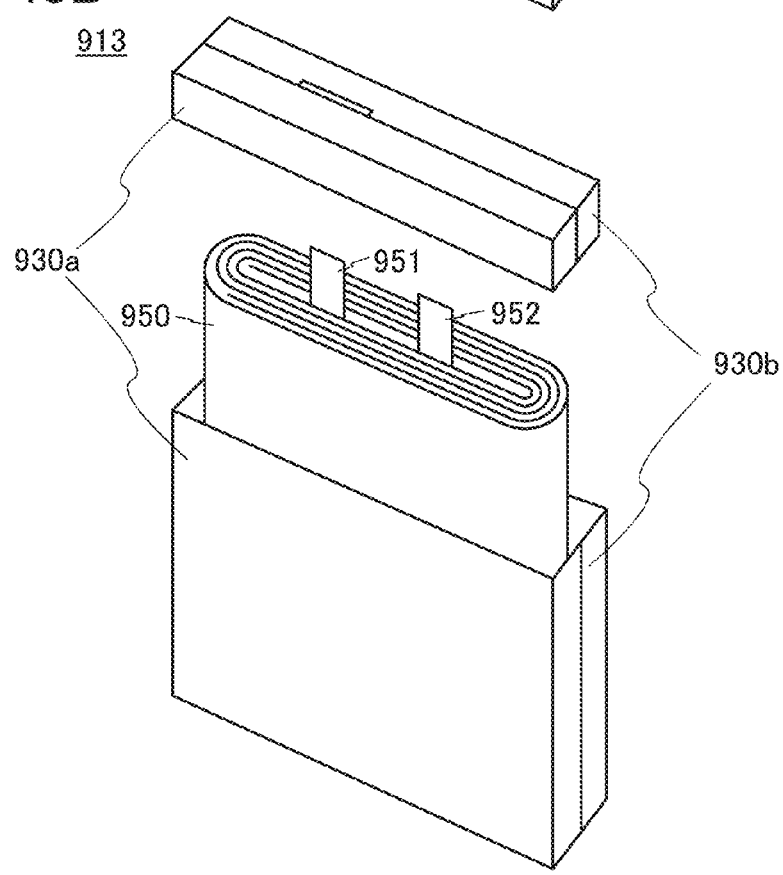

Note that as shown in FIG. 43B, the housing 930 in FIG. 43A may be formed using a plurality of materials. For example, in the power storage unit 913 in FIG. 43B, a housing 930a and a housing 930b are attached to each other and the wound body 950 is provided in a region surrounded by the housing 930a and the housing 930b.

For the housing 930a, an insulating material such as an organic resin can be used. In particular, when a material such as an organic resin is used for the side on which an antenna is formed, shielding of an electric field by the power storage unit 913 can be prevented. Note that when the effect of electric field shielding by the housing 930a is low, an antenna such as the antennas 914 and 915 may be provided inside the housing 930. For the housing 930b, a metal material can be used, for example.

Figure 44:
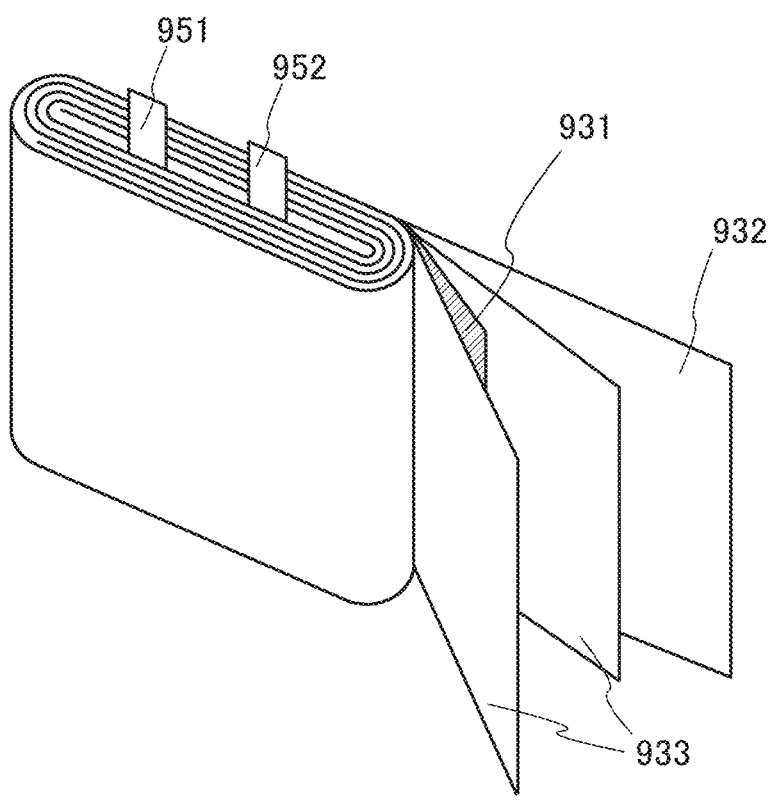
FIG. 44 illustrates an example of a power storage device.

FIG. 44 shows a structure of the wound body 950. The wound body 950 includes a negative electrode 931, a positive electrode 932, and a separator 933. The wound body 950 is obtained by winding a sheet of a stack in which the negative electrode 931 overlaps with the positive electrode 932 with the separator 933 provided therebetween. Note that a plurality of layers each including the negative electrode 931, the positive electrode 932, and the separator 933 may be stacked.

The negative electrode 931 is connected to the terminal 911 in FIGS. 40A and 40B via one of the terminals 951 and 952. The positive electrode 932 is connected to the terminal 911 in FIGS. 40A and 40B via the other of the terminals 951 and 952.

[Examples of Electric Devices: Vehicles]

Next, examples where a storage battery is used in a vehicle are described. The use of storage batteries in vehicles can lead to next-generation clean energy vehicles such as hybrid electric vehicles (HEVs), electric vehicles (EVs), and plug-in hybrid electric vehicles (PHEVs).

Figure 45A:
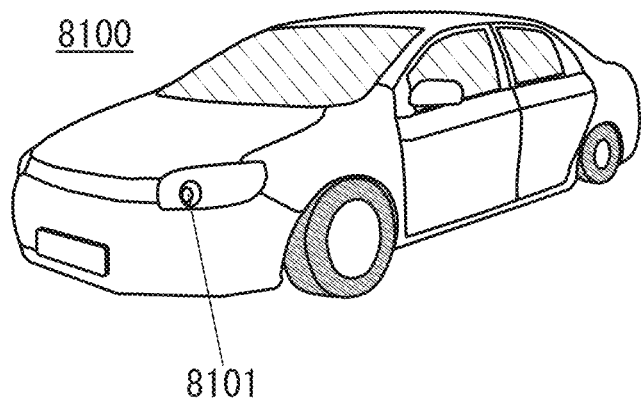
FIGS. 45A and 45B each illustrate an application example of a power storage device.
Figure 45B:
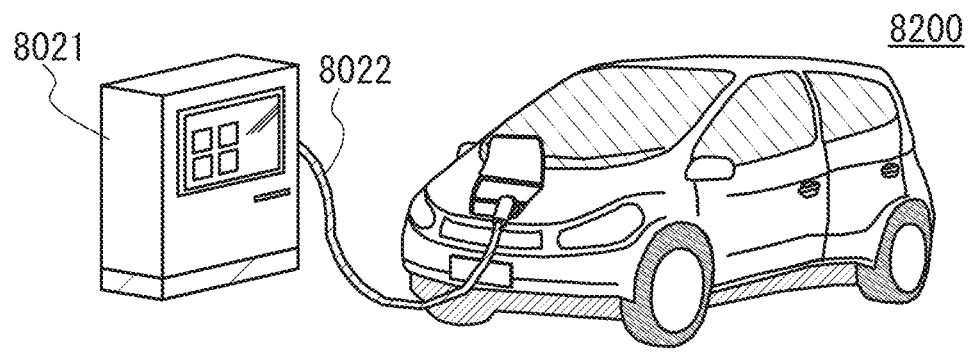

FIGS. 45A and 45B each illustrate an example of a vehicle using one embodiment of the present invention. An automobile 8100 illustrated in FIG. 45A is an electric vehicle which runs on the power of the electric motor. Alternatively, the automobile 8100 is a hybrid electric vehicle capable of driving using either the electric motor or the engine as appropriate. One embodiment of the present invention achieves a high-mileage vehicle. The automobile 8100 includes the power storage device. The power storage device is used not only for driving the electric motor, but also for supplying electric power to a light-emitting device such as a headlight 8101 or a room light (not illustrated).

The power storage device can also supply electric power to a display device included in the automobile 8100, such as a speedometer or a tachometer. Furthermore, the power storage device can supply electric power to a semiconductor device included in the automobile 8100, such as a navigation system.

FIG. 45B illustrates an automobile 8200 including the power storage device. The automobile 8200 can be charged when the power storage device is supplied with electric power through external charging equipment by a plug-in system, a contactless power supply system, or the like. In FIG. 45B, the power storage device included in the automobile 8200 is charged with the use of a ground-based charging apparatus 8021 through a cable 8022. In charging, a given method such as CHAdeMO (registered trademark) or Combined Charging System may be referred to for a charging method, the standard of a connector, or the like as appropriate. The charging apparatus 8021 may be a charging station provided in a commerce facility or a power source in a house. For example, with the use of a plug-in technique, the power storage device included in the automobile 8200 can be charged by being supplied with electric power from outside. The charging can be performed by converting AC electric power into DC electric power through a converter such as an AC-DC converter.

Further, although not illustrated, the vehicle may include a power receiving device so as to be charged by being supplied with electric power from an above-ground power transmitting device in a contactless manner. In the case of the contactless power supply system, by fitting the power transmitting device in a road or an exterior wall, charging can be performed not only when the automobile stops but also when moves. In addition, the contactless power supply system may be utilized to perform transmission/reception between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Further, the power storage device included in the vehicle can be used as a power source for supplying electric power to products other than the vehicle. In that case, the use of a commercial power supply can be avoided at peak time of electric power demand.

This embodiment can be implemented in combination with any of the other embodiments as appropriate.

Example 1

In this example, a lithium-manganese composite oxide was synthesized in accordance with Embodiment 1, and the composition of the obtained lithium-manganese composite oxide was measured by inductively coupled plasma-mass spectrometry (ICP-MS) and transmission electron microscopy-energy dispersive X-ray spectroscopy (TEM-EDX).

A procedure for synthesizing a lithium-manganese composite oxide will be described in detail below.

The weighed materials, a zirconia ball with a diameter of 3 mm, and acetone were put into a pot made of zirconia, and wet ball milling using a planetary ball mill was performed at 400 rpm for 2 hours (Step 1).

Then, acetone in slurry subjected to the ball milling was volatilized at 50° C. in the air to obtain a mixed material (Step 2).

Next, the mixed material was dried and an alumina crucible was filled with the dried material, and firing was performed at 1100° C. in the air for 10 hours to obtain an objective (Step 3).

Subsequently, grinding was performed to separate the sintered particles. The fired material, zirconia balls with diameters of 3 mm and 10 mm, and acetone were put into a pot made of zirconia, and wet ball milling using a planetary ball mill was performed at 400 rpm for 2 hours (Step 4).

The ground slurry was heated at 50° C. in the air to volatilize acetone (Step 5). Then, vacuum drying was performed (Step 6). Through the above steps, a lithium-manganese composite oxide, which is a positive electrode active material of an electrode, was synthesized. The obtained lithium-manganese composite oxide is called Sample A. The measurement results of the composition of the synthesized lithium-manganese composite oxide (i.e., Sample A) by ICP-MS and TEM-EDX are shown in the row (a) in Table 5. Table 5 shows elemental compositions. Values in the column "Mn/Ni" in Table 5 are obtained by dividing the composition of Mn by the composition of Ni, and values in the column "(Mn+Ni)/O" are obtained by dividing the sum of the composition of Mn and the composition of Ni by the composition of O. Note that values in parentheses are obtained by normalizing by the amount of raw material Mn, 0.8062.

TABLE 5

| | Analysis method | Li | Mn | Ni | O | Mn/Ni | (Mn + Ni)/O |
|---|---|---|---|---|---|---|---|
| (a) After synthesis | ICP-MS | 59.8 (1.710) | 28.2 (0.8062) | 12.1 (0.346) | — | 2.331 | — |
| | TEM-EDX Average value of measurements at 6 points. | — | 19.70 (0.8062) | 8.97 (0.367) | 71.35 (2.920) | 2.196 | 0.402 |
| (b) After charge and discharge | ICP-MS | — | — | — | — | — | — |
| | TEM-EDX Average value of measurements at 5 points. | — | 20.04 (0.8062) | 8.50 (0.342) | 71.48 (2.876) | 2.358 | 0.399 |

The row (a) in Table 5 shows that the atomic ratio of Ni to Mn is high as compared with a feed ratio of raw materials of $Li_2CO_3$:$MnCO_3$:NiO, 0.84:0.8062:0.318.

Example 2

In this example, Sample A obtained in Example 1 was used as a positive electrode active material, and the composition ratio of Mn to Ni and O in the lithium-manganese composite oxide was analyzed by TEM-EDX after charging and discharging.

First, with the use of a positive electrode active material, a conductive additive, a binder, and a disperse medium, a positive electrode paste was formed. The positive electrode paste was applied on a positive electrode current collector and dried. Thus, a positive electrode including a positive electrode active material layer was formed.

In this example, the lithium-manganese composite oxide was used as the positive electrode active material, acetylene black was used as the conductive additive, and polyvinylidene fluoride (PVdF) was used as the binder. Lithium iron phosphate, acetylene black, and polyvinylidene fluoride were mixed in a ratio of 80:15:5. As the disperse medium for viscosity adjustment, NMP was added to and mixed with the mixture. Thus, the positive electrode paste was formed.

The positive electrode paste formed by the above method was applied to the positive electrode current collector (20-μm-thick aluminum) and dried at 80° C. for 40 minutes, and then dried at 170° C. in a reduced pressure environment for 10 hours, whereby the positive electrode active material layer was formed.

Next, a half cell including the positive electrode was formed and was charged and discharged. The evaluation was performed using a coin cell. In the coin cell, a lithium metal was used for a negative electrode, polypropylene (PP) was used for a separator, and an electrolytic solution was formed in such a manner that lithium hexafluorophosphate ($LiPF_6$) was dissolved at a concentration of 1 mol/L in a solution in which ethylene carbonate (EC) and diethyl carbonate (DEC) were mixed at a volume ratio of 1:1 was used. Charging was performed at a constant current and a rate of 0.2 C (it takes five hours for charging) until the voltage reached a termination voltage of 4.8 V. Discharging was performed at a constant current and a rate of 0.2 C (it takes five hours for discharging) until the voltage reached a termination voltage of 2 V. The environmental temperature was set at 25° C.

The coin cell was decomposed after the first charge and discharge, and the composition ratio of Mn to Ni and O in the lithium-manganese composite oxide in the positive electrode was analyzed by TEM-EDX. The results are shown in the row (b) in Table 5.

The row (b) in Table 5 shows that, after the charge and discharge, as well as after the synthesis, the atomic ratio of Ni to Mn is high as compared with the compounding ratio of materials of $Li_2CO_3:MnCO_3:NiO$, 0.84:0.8062:0.318. The comparison between the rows (a) and (b) in Table 5 suggests that the charge and discharge might slightly decrease the ratio of O to Mn.

The compositions before the charge and discharge (i.e., after the synthesis) and after the charge and discharge can be obtained as shown in the rows (a) and (b) in Table 5. The composition might be changed by charge and discharge.

Figure 34:
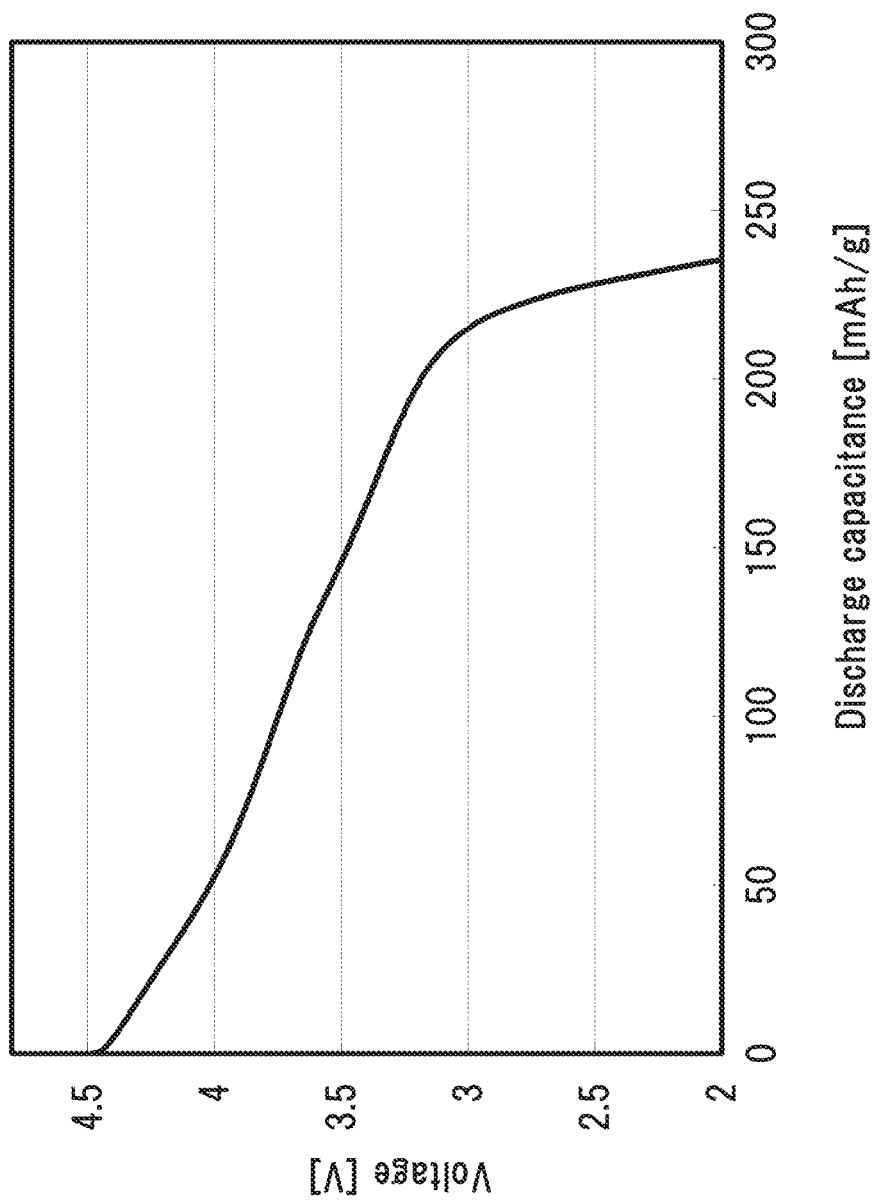
FIG. 34 is a graph showing the relationship between discharge capacity and voltage of a lithium-manganese composite oxide obtained in Example.

Next, a half cell was formed using Sample A obtained in Example 1 as a positive electrode active material, and was subjected to charge and discharge twice. The discharge characteristics obtained after the second charge and discharge are shown in FIG. 34. FIG. 34 indicates that favorable discharge capacity can be obtained even after the second charge and discharge. Accordingly, a lithium-manganese composite oxide can have high capacity even with the composition after charge and discharge, which is shown in the row (b) in Table 5.

Example 3

A laminated storage battery was formed using the lithium-manganese composite oxide described in Embodiment 1 as a positive electrode active material.

A procedure for synthesizing a lithium-manganese composite oxide will be described in detail below.

The weighed materials, a zirconia ball with a diameter of 3 mm, and acetone were put into a pot made of zirconia, and wet ball milling using a planetary ball mill was performed at 400 rpm for 2 hours.

Then, acetone in slurry subjected to the ball milling was volatilized at 50° C. in the air to obtain a mixed material.

Next, the mixed material was dried and an alumina crucible was filled with the dried material, and firing was performed at 1100° C. in the air for 10 hours to obtain an objective.

Subsequently, grinding was performed to separate the sintered particles. The fired material, zirconia balls with diameters of 3 mm and 10 mm, and acetone were put into a pot made of zirconia, and wet ball milling using a planetary ball mill was performed at 400 rpm for 2 hours.

After the grinding, heating was performed on the mixture subjected to wet ball milling at 50° C. in the air to volatilize acetone. Then, heating was performed at 600° C. in the air atmosphere for 3 hours, so that powdery lithium-manganese composite oxide was obtained. The positive electrode 503 was formed using the obtained lithium-manganese composite oxide as a positive electrode active material. The thickness of the formed positive electrode was 85 μm.

Next, with the use of a negative electrode active material, a conductive auxiliary agent, a binder, and a disperse medium, a negative electrode paste was formed. The negative electrode paste was applied on the negative electrode current collector 504 (18-μm-thick copper) and dried. Thus, the negative electrode 506 including the negative electrode active material layer 505 was formed. In this example, the negative electrode 506 was formed using Ga as a negative electrode active material. The thickness of the formed negative electrode was 45 μm.

A single-layer laminated storage battery was formed using the obtained positive electrode 503 and negative electrode 506. FIG. 38A illustrates the laminated storage battery 500. The laminated storage battery 500 includes the positive electrode 503 including the positive electrode current collector 501 and the positive electrode active material layer 502, the negative electrode 506 including the negative electrode current collector 504 and the negative electrode active material layer 505, the separator 507 (25-μm-thick), the electrolytic solution 508, and the exterior body 509. The separator 507 is provided between the positive electrode 503 and the negative electrode 506 in the exterior body 509. The exterior body 509 is filled with the electrolytic solution 508. Note that lead electrodes that are connected to the positive electrode current collector 501 and the negative electrode current collector 504 are not illustrated in FIG. 38A.

Figure 35:
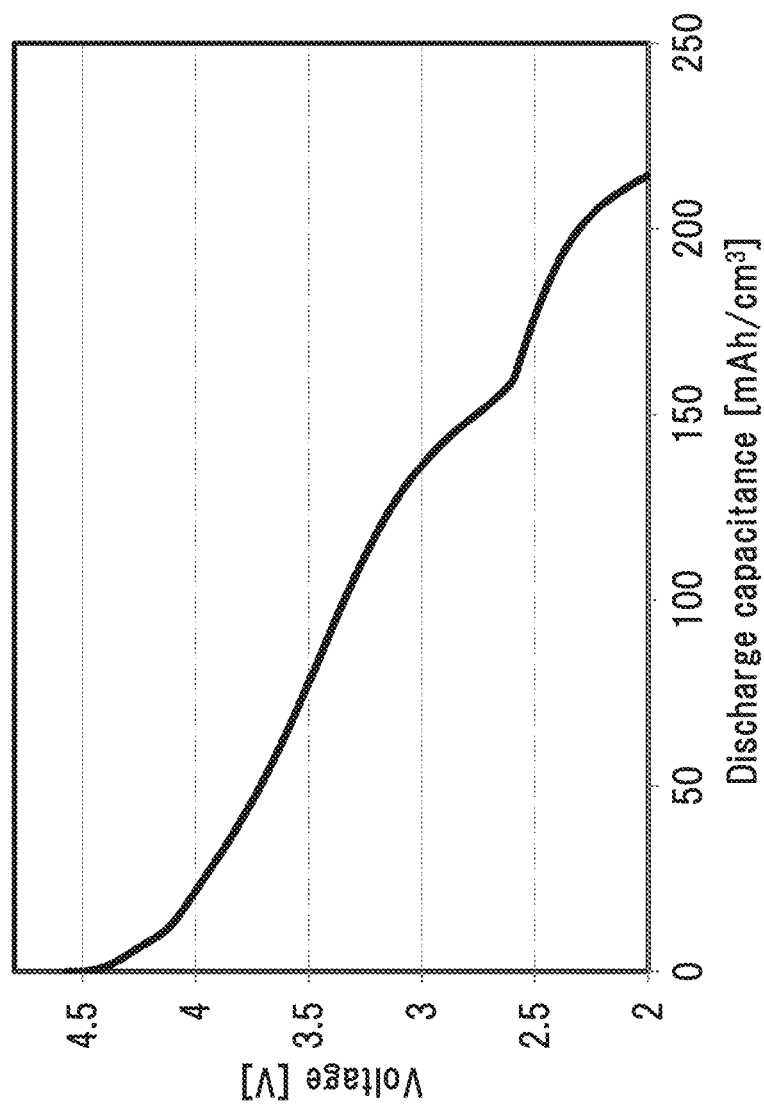
FIG. 35 is a graph showing the relationship between discharge capacity and voltage of a secondary battery obtained in Example.

FIG. 35 shows the discharge characteristics of the formed laminated storage battery. The horizontal axis represents the discharge capacity which is normalized by the sum of the capacities of the positive electrode, the negative electrode, and the separator. The lithium-manganese composite oxide obtained in one embodiment of the present invention was used as a positive electrode active material, whereby a favorable laminated storage battery was able to be formed.

Example 4

In this example, in accordance with the feed ratios of raw materials shown in Table 6, plural kinds of lithium-manganese composite oxides were synthesized by the synthesis method described in Embodiment 1. The synthesized lithium-manganese composite oxides were subjected to X-ray diffraction measurement and composition analysis.

[1. Synthesis of Lithium-Manganese Composite Oxides]

Lithium-manganese composite oxides represented by $Li_xMn_yM_zO_w$ were synthesized. Table 6 shows raw materials of a comparative sample 100 and samples 101 to 109 and the feed ratios of the raw materials. In this example, the comparative sample 100 and the samples 101 to 109 were formed by the combination of the raw materials shown in Table 6. Note that the synthesis of the sample 105 was repeated four times, and the obtained samples are referred to as a sample 105a, a sample 105b, a sample 105c, and a sample 105d.

TABLE 6

|  | Feed ratio of raw materials | Ni/Mn |
| --- | --- | --- |
| <Comparison Example> Sample 100 | $Li_2CO_3:MnCO_3$ = 1:1 | 0 |
| Sample 101 | $Li_2CO_3:MnCO_3$ = 0.84:1.12 | 0 |
| Sample 102 | $Li_2CO_3:MnCO_3:NiO$ = 0.84:1.03:0.0937 | 0.091 |
| Sample 103 | $Li_2CO_3:MnCO_3:NiO$ = 0.84:0.956:0.168 | 0.176 |
| Sample 104 | $Li_2CO_3:MnCO_3:NiO$ = 0.84:0.8812:0.243 | 0.276 |
| Sample 105 | $Li_2CO_3:MnCO_3:NiO$ = 0.84:0.8062:0.318 | 0.394 |
| Sample 106 | $Li_2CO_3:MnCO_3:NiO$ = 0.84:0.7312:0.393 | 0.537 |
| Sample 107 | $Li_2CO_3:MnCO_3:NiO$ = 0.84:0.65:0.468 | 0.72 |

TABLE 6-continued

|  | Feed ratio of raw materials | Ni/Mn |
|---|---|---|
| Sample 108 | $Li_2CO_3:MnCO_3:NiO$ = 0.84:0.581:0.543 | 0.935 |
| Sample 109 | $Li_2CO_3:MnCO_3:NiO$ = 0.84:0.506:0.618 | 1.221 |

First, $Li_2CO_3$, $MnCO_3$, and NiO were weighed as starting materials in accordance with Table 6. Table 6 shows molar ratios. Note that the sample 101 and the comparative sample 100 were formed without containing NiO as a raw material. The comparative sample 100 has the mixture ratio of raw materials for the purpose of obtaining $Li_2MnO_3$ with a layered rock-salt structure. Note that in the case where $Li_2MnO_3$ with a layered rock-salt structure is formed, the ratio of lithium to manganese is 2:1. In the sample 101, the ratio of lithium to manganese was 1.68:1.12. In other words, the ratio of lithium to manganese was decreased. In each of the samples 102 to 109, part of manganese in the sample 101 was replaced with the element M (here, Ni).

Next, acetone was added to the powder of these materials, and then, they were mixed in a ball mill to prepare mixed powder.

After that, heating was performed to volatilize acetone, so that a mixed material was obtained.

Then, the mixed materials were put into a crucible and were fired at 1000° C. for 10 hours in the air at a flow rate of 10 L/min., so that a novel material was synthesized.

Subsequently, grinding was performed to separate the sintered particles. For the grinding, acetone was added and then mixing was performed in a ball mill.

After the grinding, heating was performed to volatilize acetone, and then, vacuum drying was performed.

Next, firing was performed at 600° C. for 3 hours in the air at a flow rate of 10 L/min. Through the above steps, powdery novel material was obtained.

The comparative sample 100 and the samples 101 to 109 were formed in the same manner except for the feed ratios of raw materials.

[2. X-Ray Diffraction]

Figure 15:
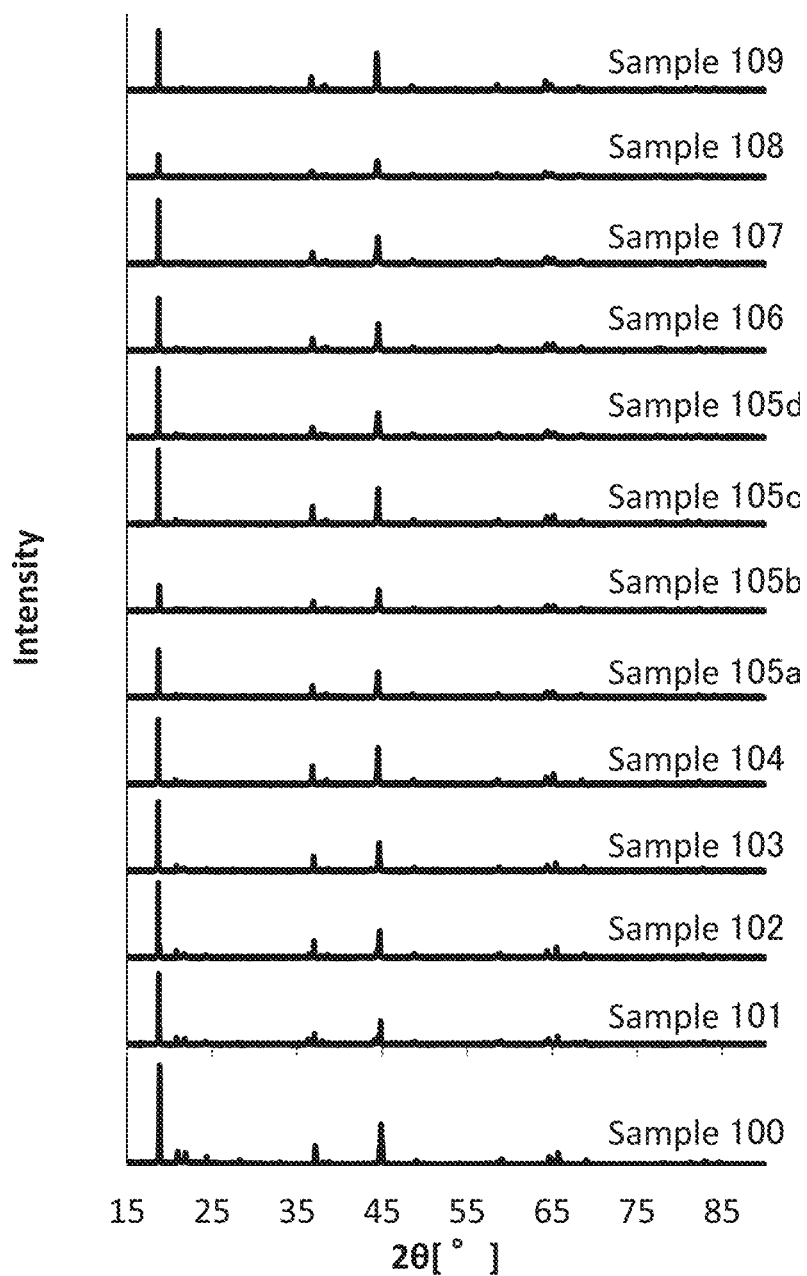
FIG. 15 is a graph showing measurement results of X-ray diffraction in one embodiment of the present invention.
Figure 21:
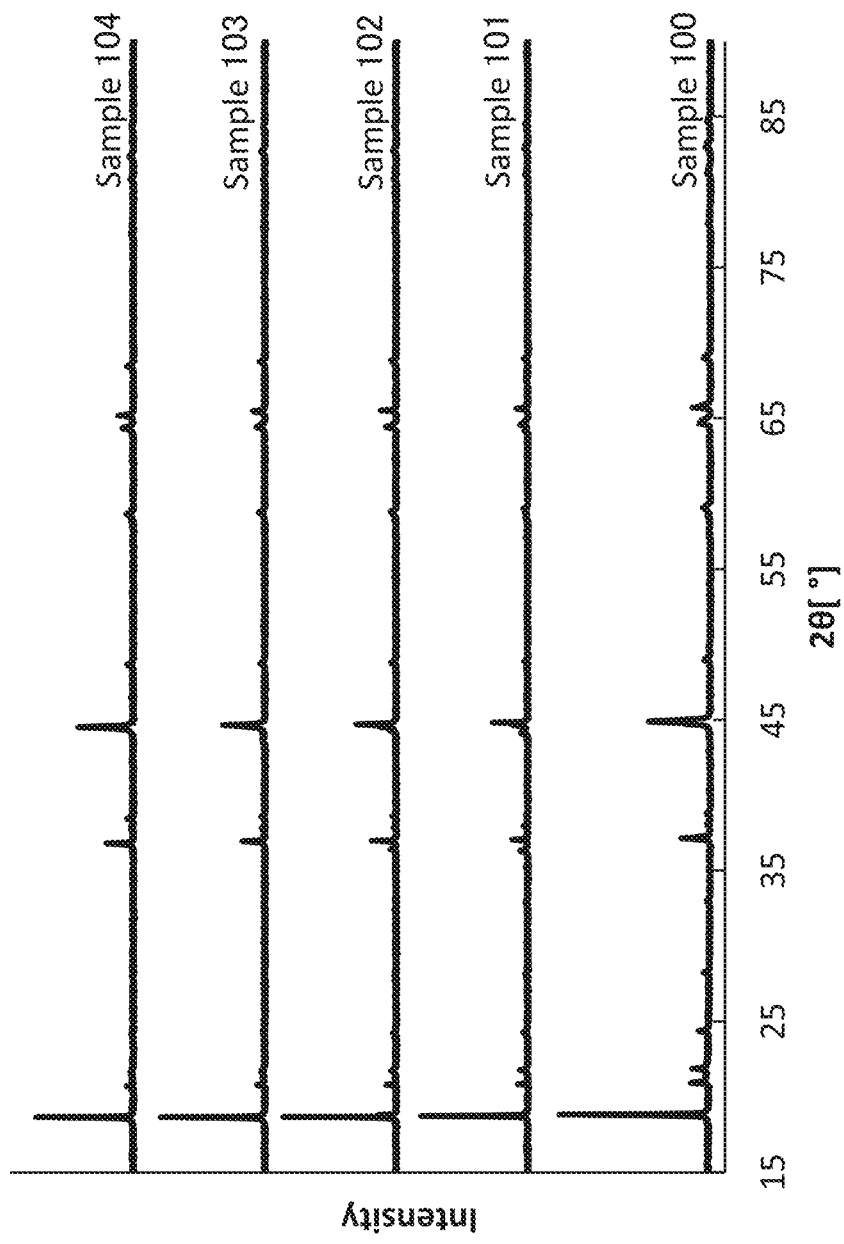
FIG. 21 is a graph showing measurement results of X-ray diffraction in one embodiment of the present invention.
Figure 22:
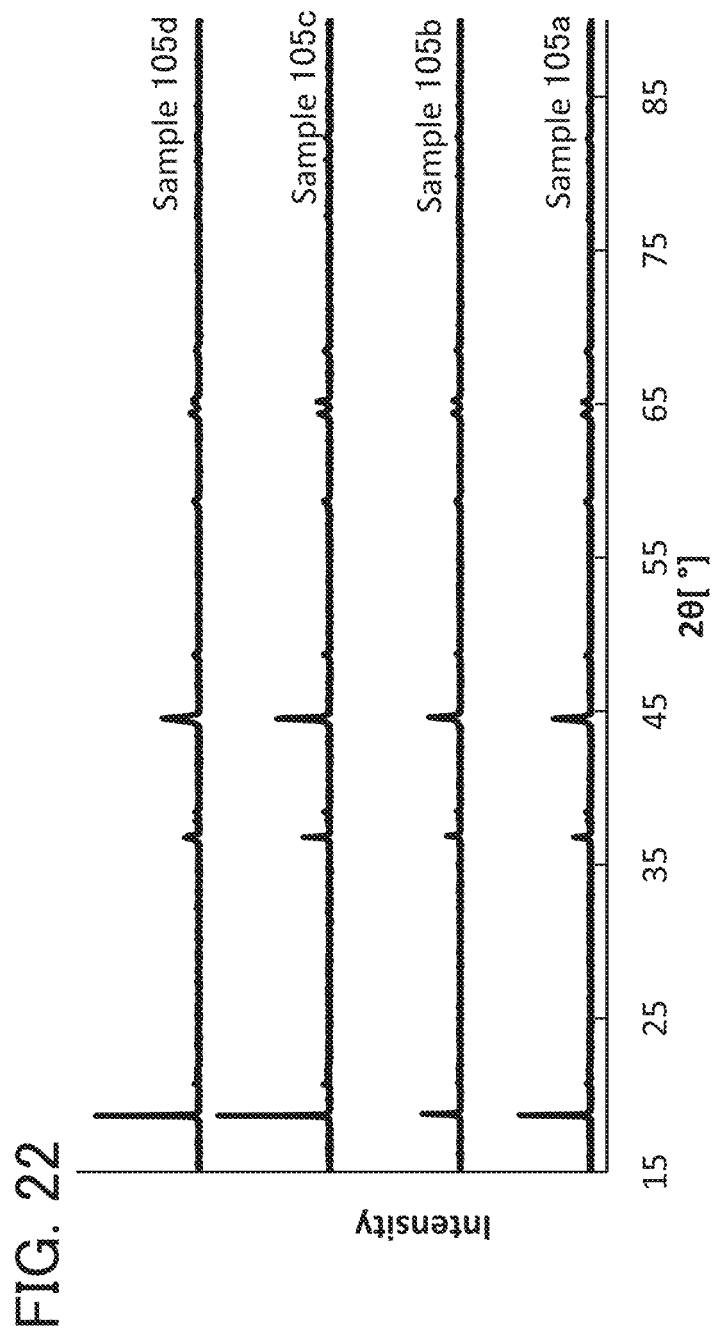
FIG. 22 is a graph showing measurement results of X-ray diffraction in one embodiment of the present invention.
Figure 24A:
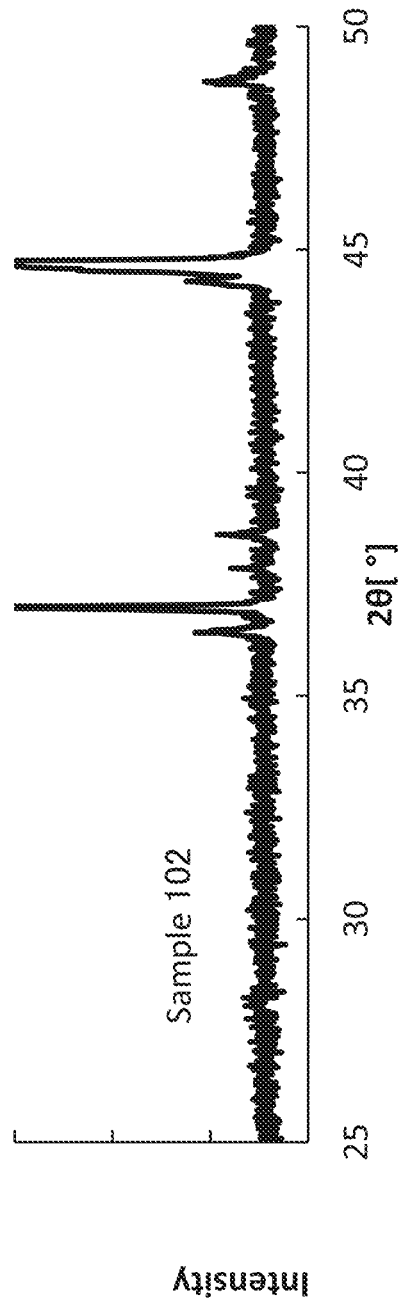
FIGS. 24A and 24B are each a graph showing a measurement result of X-ray diffraction in one embodiment of the present invention.
Figure 24B:
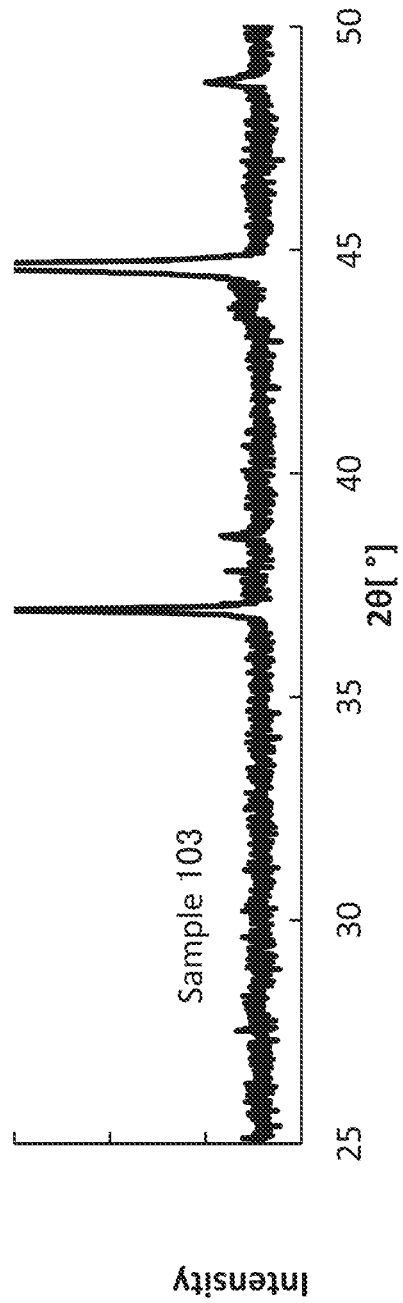
Figure 25A:
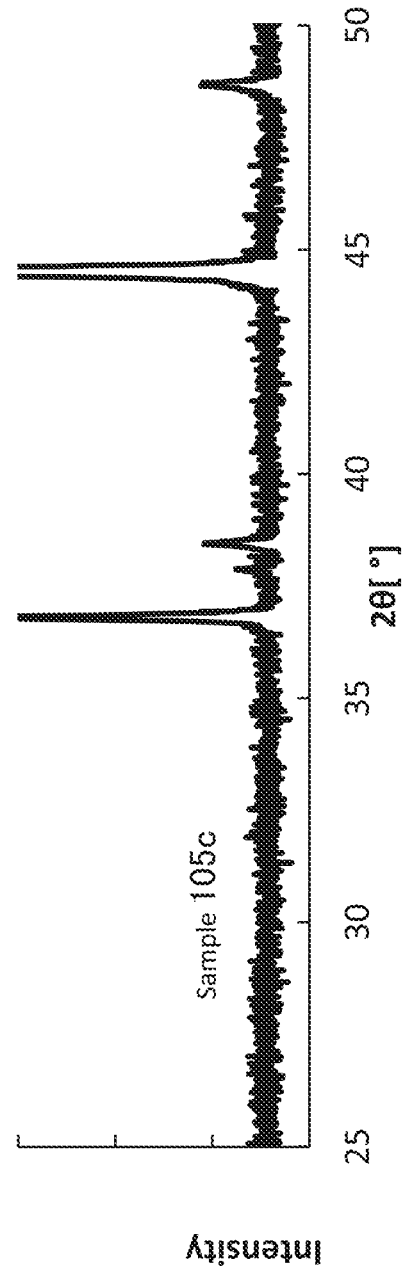
FIGS. 25A and 25B are each a graph showing a measurement result of X-ray diffraction in one embodiment of the present invention.
Figure 25B:
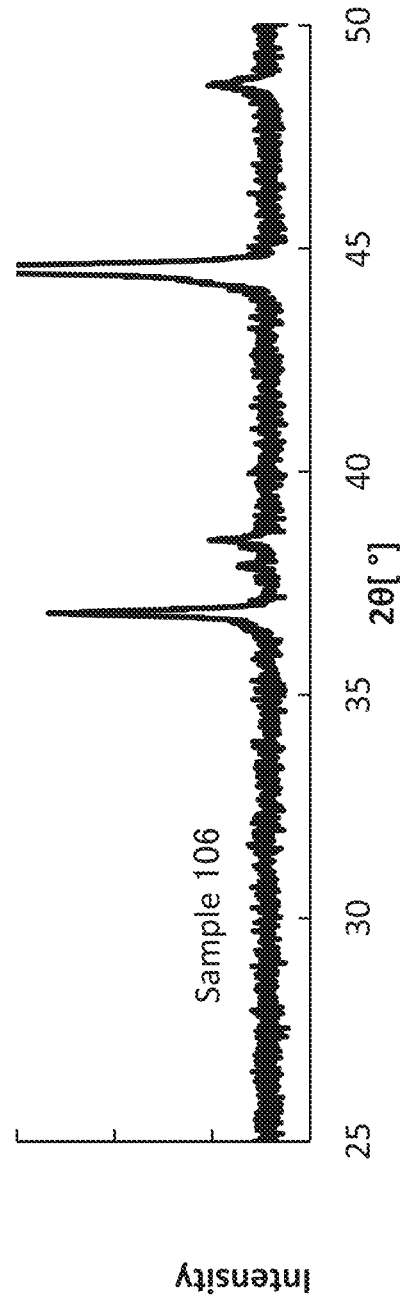
Figure 26:
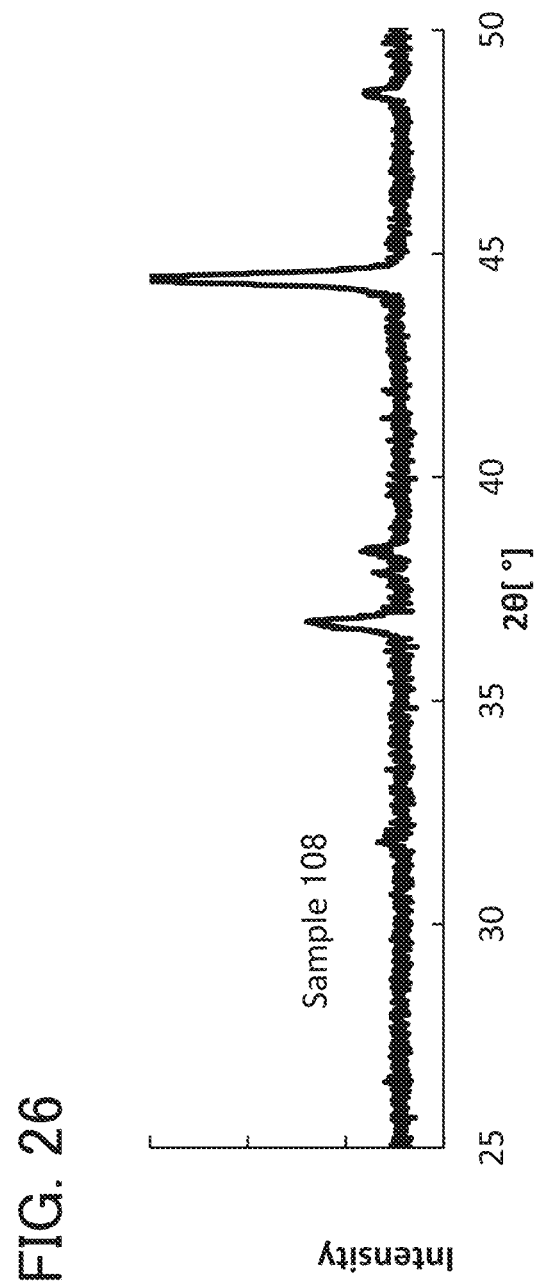
FIG. 26 is a graph showing a measurement result of X-ray diffraction in one embodiment of the present invention.

Next, the lithium-manganese composite oxides synthesized using the raw materials shown in Table 6 were subjected to X-ray diffraction (XRD) measurement. FIG. 15 shows the measurement results. FIGS. 21 to 23 are enlarged views of FIG. 15.

FIG. 15 and FIGS. 21 to 23 show that two peaks at around 21° and around 22° are found in the comparative sample 100, the sample 101, and the sample 102, whereas those peaks tend to be weak in the samples 103 to 109. The two peaks are unique to $Li_2MnO_3$ with a layered rock-salt structure that belongs to the space group C12/m1. As suggested by the results of the Rietveld analysis described later, the higher the ratio of Ni to Mn (Ni/Mn) in a layered rock-salt structure is, the greater the sum of the occupancy of Mn and the occupancy of Ni is at three sites: the 2b site, the 2c site, and the 4h site. In $Li_2MnO_3$ with a layered rock-salt structure that belongs to the space group C12/m1, the two peaks might be weakened because the periodicity of the crystal is disturbed when a Ni atom or a Mn atom is substituted at any of the 2b site, the 2c site, and the 4h site, which are Li sites.

In the samples 101 and 102, a peak at around 36° can be observed in addition to a peak at around 37°. This might be due to $LiMn_2O_4$ with a spinel structure that belongs to the space group Fd-3m. The peak is weakened in other samples probably because the proportion of the spinel structure is small as suggested by the results of the Rietveld analysis described later.

FIGS. 24A and 24B, FIGS. 25A and 25B, and FIG. 26 show enlarged views of the measurement results of X-ray diffraction (2θ is in the range from 25° to 50°) performed on the samples 102, 103, 105c, 106, and 108.)

Table 7 and Table 8 show the values of 2θ and the intensities of some obvious peaks obtained by X-ray diffraction. Table 7 shows the results of Peaks 1 to 5, and Table 8 shows the results of Peaks 6 to 9. Note that I1 shown in Table 7 and Table 8 is the peak intensity, and I2 is the ratio of the intensity of each peak to the intensity of Peak 1. The peaks without data do not always mean that no peak was observed; the some data are not shown because the intensity is low (200 counts or lower). Peak 1 has the maximum value where 2θ is in the range from 18.6° to 18.8°, and is probably assigned to a (001) plane. Peak 2 has the maximum value where 2θ is in the range from 20.65° to 20.90°, and is probably assigned to a (020) plane. Peak 3 has the maximum value where 2θ is in the range from 21.5° to 21.85°, and is probably assigned to a (110) plane. Peak 4 is probably due to the spinel structure as described above. Peak 5 has the maximum value where 2θ is in the range from 36° to 37.5°, and is probably assigned to a (130) plane. Peak 6 has the maximum value where 2θ is in the range from 37.8° to 39.3°. Peak 7 has the maximum value where 2θ is in the range from 43.7° to 44.7°. Peak 8 has the maximum value where 2θ is in the range from 43.8° to 45.3°. Peak 9 has the maximum value where 2θ is in the range from 48° to 49.5°.

When the ratio of Ni to Mn (Ni/Mn, which is the feed ratio of raw materials) is greater than or equal to 0.276 (in the case of the samples 104 to 109), the ratio of the intensity of Peak 6 to the intensity of Peak 1 (I2) becomes greater than or equal to 0.05. To obtain high capacity, I2 of Peak 6 is preferably greater than or equal to 0.04. Furthermore, I2 of Peak 9 also becomes greater than or equal to 0.052 in the samples 104 to 109. To obtain high capacity, I2 of Peak 9 is preferably greater than or equal to 0.04. In other words, the maximum value where 2θ is in the range from 18.6° to 18.8° to the maximum value where 2θ is in the range from 48° to 49.5° is preferably greater than or equal to 0.04.

TABLE 7

|  |  | Peak 1 | Peak 2 | Peak 3 | Peak 4 | Peak 5 |
|---|---|---|---|---|---|---|
| Sample 101 | 2θ [°] | 18.74 | 20.85 | 21.80 | 36.34 | 37.06 |
|  | I1 | 6509 | 616 | 513 | 469 | 974 |
|  | I2 | — | 0.095 | 0.079 | 0.072 | 0.150 |
| Sample 102 | 2θ [°] | 18.68 | 20.81 | 21.73 | 36.42 | 36.98 |
|  | I1 | 6890 | 629 | 340 | 378 | 1511 |
|  | I2 | — | 0.091 | 0.049 | 0.055 | 0.219 |
| Sample 103 | 2θ [°] | 18.66 | 20.81 | 21.73 | — | 36.94 |
|  | I1 | 6350 | 493 | 244 | — | 1387 |
|  | I2 | — | 0.078 | 0.038 | — | 0.218 |
| Sample 104 | 2θ [°] | 18.66 | 20.71 | 21.6 | — | 36.81 |
|  | I1 | 5931 | 412.8 | 211.6 | — | 1664 |
|  | I2 | — | 0.070 | 0.036 | — | 0.281 |
| Sample 105c | 2θ [°] | 18.69 | 20.7 | — | — | 36.82 |
|  | I1 | 6832 | 408 | — | — | 1624 |
|  | I2 | — | 0.060 | — | — | 0.238 |
| Sample 106 | 2θ [°] | 18.73 | 20.77 | — | — | 36.83 |
|  | I1 | 4776 | 224 | — | — | 1138 |
|  | I2 | — | 0.046965 | — | — | 0.238 |
| Sample 108 | 2θ [°] | 18.71 | — | — | — | 36.77 |
|  | I1 | 2040 | — | — | — | 499 |
|  | I2 | — | — | — | — | 0.245 |
| Sample 109 | 2θ [°] | 18.72 | — | — | — | 36.68 |
|  | I1 | 5480 | — | — | — | 1236 |
|  | I2 | — | — | — | — | 0.226 |

TABLE 8

| | | Peak 6 | Peak 7 | Peak 8 | Peak 9 |
|---|---|---|---|---|---|
| Sample 101 | 2θ [°] | — | 44.13 | 44.83 | — |
| | I1 | — | 437 | 2166 | — |
| | I2 | — | 0.067 | 0.333 | — |
| Sample 102 | 2θ [°] | 38.62 | — | 44.70 | — |
| | I1 | 265 | — | 2459 | — |
| | I2 | 0.038 | — | 0.357 | — |
| Sample 103 | 2θ [°] | 38.61 | — | 44.65 | 48.75 |
| | I1 | 222 | — | 2576 | 300 |
| | I2 | 0.035 | — | 0.406 | 0.047 |
| Sample 104 | 2θ [°] | 38.42 | — | 44.53 | 48.66 |
| | I1 | 387 | — | 3379 | 383 |
| | I2 | 0.065 | — | 0.570 | 0.065 |
| Sample 105c | 2θ [°] | 38.43 | — | 44.53 | 48.65 |
| | I1 | 342 | — | 3229 | 358 |
| | I2 | 0.050 | — | 0.473 | 0.052 |
| Sample 106 | 2θ [°] | 38.46 | — | 44.55 | 48.65 |
| | I1 | 316 | — | 2430 | 321 |
| | I2 | 0.066 | — | 0.509 | 0.067 |
| Sample 108 | 2θ [°] | 38.34 | — | 44.43 | 48.59 |
| | I1 | 222 | — | 1465 | 208 |
| | I2 | 0.109 | — | 0.718 | 0.102 |
| Sample 109 | 2θ [°] | 38.30 | — | 44.37 | 48.55 |
| | I1 | 499 | — | 3408 | 395 |
| | I2 | 0.091 | — | 0.622 | 0.072 |

[3. Rietveld Analysis 1]

Next, the crystal structure data acquired by the Rietveld analysis is described below. Fitting was performed under the conditions where the initial first phase was $Li_2MnO_3$ with a layered rock-salt structure that belongs to the space group C12/m1 and the initial second phase was $LiMn_2O_4$ with a spinel structure that belongs to the space group Fd-3m. Since the analysis conditions were the same as those described in Embodiment 1, the detailed description is omitted here.

The weight proportion of a layered rock-salt structure to a spinel structure was calculated by the Rietveld analysis. Note that the initial states for the calculation were basically the same as those in Table 1 and Table 2. The lattice constants of the sample 105c were calculated using the values in Table 1 and Table 2 as the initial values, and the lattice constants of other samples were calculated using the lattice constants of the sample 105c as the initial values. The lattice constants of the sample 105c were as follows: a=0.4959 nm, b=0.8583 nm, and c=0.5033 nm. Each site was analyzed on the assumption that the 2b sites in a layered rock-salt structure are occupied by Li and Mn. Note that as described later, Mn and Ni are hard to distinguish in X-ray diffraction. The calculation was started with an occupancy of Li at the 2b sites of 70% and an occupancy of Mn at the 2b sites of 30% as the initial values. It was assumed that other sites in the layered rock-salt structure were occupied by the atoms shown in Table 1 at 100%, and the sites in the spinel structure were occupied by the atoms shown in Table 2 at 100%.

Table 9 shows weight proportions in the first phase and the second phase obtained by the Rietveld analysis.

TABLE 9

| Sample | Ni/Mn | Weight proportion of spinel structure [%] |
|---|---|---|
| Sample 101 | 0.000 | 16.00 |
| Sample 102 | 0.091 | 9.52 |
| Sample 103 | 0.176 | 6.39 |
| Sample 104 | 0.276 | 0.03 |
| Sample 105a | 0.394 | Not calculated |
| Sample 105b | 0.394 | 1.07 |
| Sample 105c | 0.394 | 0.84 |
| Sample 105d | 0.394 | Not calculated |
| Sample 106 | 0.537 | 0.63 |
| Sample 107 | 0.720 | Not calculated |
| Sample 108 | 0.935 | 0.04 |
| Sample 109 | 1.221 | 0.02 |

As shown in Table 9, in the samples having Ni/Mn (the feed ratio of raw materials) of greater than or equal to 0.276, the weight proportions of the spinel structures were lower than or equal to approximately 1.1%.

[4. Rietveld Analysis 2]

Next, for more detailed examination of the occupancies of atoms at each site in a layered rock-salt crystal structure, calculation is performed for the occupancies of Li, Mn, and Ni at four sites: the 2b site, the 2c site, the 4h site, and the 4g site. Here, to calculate the occupancies of the atoms and the lattice constants, the Rietveld analysis is performed on the assumption of a single layer of a layered rock-salt structure.

The initial states for the calculation were basically the same as those in Table 1 and Table 2. The lattice constants of the sample 105c were calculated using the values in Table 1 and Table 2 as the initial values, and the lattice constants of other samples were calculated using the lattice constants of the sample 105c as the initial values. The lattice constants of the samples 105 are shown in Table 10 below.

The calculation results of the samples 105a to 105d obtained by the Rietveld analysis are shown in Table 10, for example. Because of the small difference of the X-ray scattering power between Ni and Mn, Ni and Mn are hard to distinguish. For this reason, the sum of the occupancy of Ni and the occupancy of Mn is discussed here.

TABLE 10

| | | Sample 105a | Sample 105b | Sample 105c | Sample 105d |
|---|---|---|---|---|---|
| a(Å) | | 4.959 | 4.959 | 4.956 | 4.948 |
| b(Å) | | 8.601 | 8.595 | 8.591 | 8.599 |
| c(Å) | | 5.031 | 5.031 | 5.028 | 5.025 |
| β(°) | | 109.1 | 109.1 | 109.1 | 109.0 |
| Sum of filling factor of Mn and filling factor of Ni [%] | 4g site | 92.1% | 89.4% | 89.6% | 85.7% |
| | 2b site | 63.0% | 62.6% | 63.7% | 62.8% |
| | 2c site | 1.9% | 6.1% | 0.4% | 0.0% |
| | 4h site | 6.4% | 11.0% | 4.3% | 2.0% |
| Rexp | | 3.33 | 3.70 | 3.14 | 3.13 |
| Rwp | | 4.35 | 4.45 | 4.45 | 5.03 |
| Rp | | 3.29 | 3.42 | 3.20 | 3.43 |
| GOF | | 1.30 | 1.20 | 1.42 | 1.61 |

Here, Rwp is obtained by dividing the residual sum of squares by the sum total of the observed intensities, and Rp is a difference between the observed intensities and the theoretical diffraction intensities. Furthermore, Rexp is the expected value of Rwp, which is the statistically estimated minimum Rwp. In addition, GOF, which stands for "good of fitness", is obtained by dividing Rwp by Rexp and is preferably close to 1.

Focusing on the sum of the occupancy of Ni and the occupancy of Mn in $Li_2MnO_3$, the 2b site (the initial coordinates: (0, 0.5, 0)), the 2c site (the initial coordinates: (0, 0, 0.5)), and the 4h site (the initial coordinates: (0, 0.6560, 0)), which are Li sites, are examined. Table 10 shows that 63.0% of the 2b sites in the sample 105a are occupied by Ni and Mn. In addition, Table 10 shows that 1.9% of the 2c sites and 6.4% of the 4h sites were are occupied by Ni and Mn.

Figure 16:
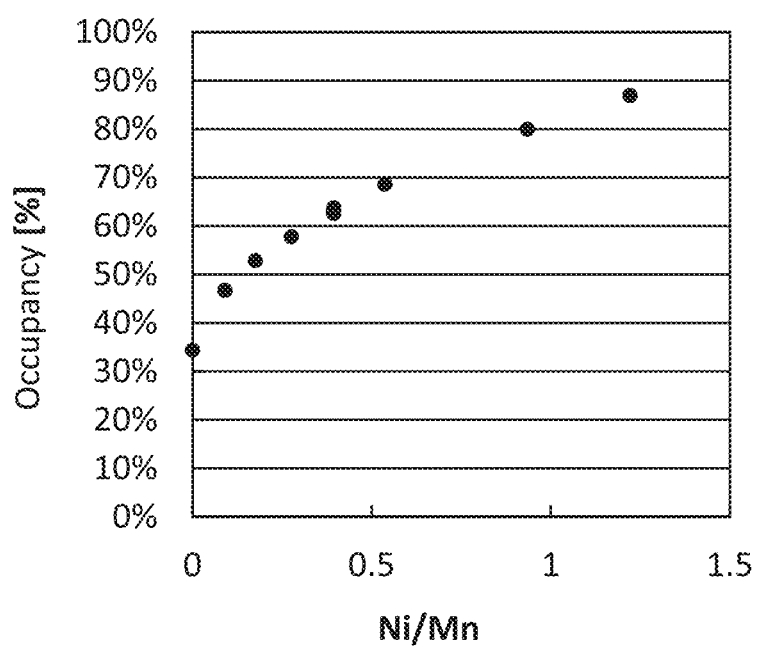
FIG. 16 is a graph showing the relationship between the occupancy of atoms and a ratio of compositions in one embodiment of the present invention.
Figure 17:
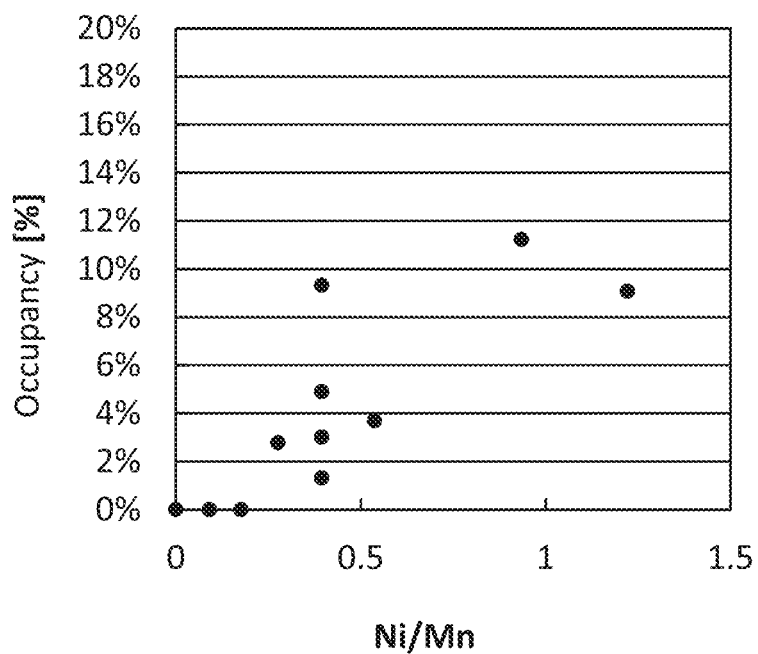
FIG. 17 is a graph showing the relationship between the occupancy of atoms in one embodiment of the present invention and a ratio of compositions in one embodiment of the present invention.

FIG. 16 shows the sum of $A(Ni)_{2b}$ and $A(Mn)_{2b}$, $[A(Ni)_{2b}+A(Mn)_{2b}]$, and FIG. 17 shows the sum of $A(Ni)_{2c+4h}$ and $A(Mn)_{2c+4h}$, $[A(Ni)_{2c+4h}+A(Mn)_{2c+4h}]$, of a layered rock-salt structure, which belongs to the space group C12/m1 and which is the first phase, of the samples 101 to 109. The horizontal axis represents Ni/Mn (the feed ratio of raw materials) of each sample. Note that the sample 107 was not analyzed.

First, in a region where Ni/Mn (the feed ratio of raw materials) is less than 0.2, the 2b sites are occupied by Ni and Mn. In a region where Ni/Mn is greater than 0.2, the occupancies at the 2c site and the 4h sites are increased. Thus, it can be considered that the 2b sites, the 2c sites, and the 4h sites are occupied by Ni and Mn when the capacity is increased, that is, when Ni/Mn (the feed ratio of raw materials) is 0.2758 (equivalent to the conditions of the sample 104) or greater. Here, $A(Ni)_{2b}+A(Mn)_{2b}$ is preferably greater than or equal to 40%, further preferably greater than or equal to 40% and less than or equal to 85%, still further preferably greater than or equal to 40% and less than or equal to 75%. In addition, $A(Ni)_{2c+4h}+A(Mn)_{2c+4h}$ is preferably greater than or equal to 0.2%, further preferably greater than or equal to 0.5%.

Consideration is given to the reason why the capacity is increased in the case where Ni/Mn (the feed ratio of raw materials) is 0.2758 (equivalent to the conditions of the sample 104) or greater. In the region where Ni/Mn is less than 0.2, the sum of the occupancies of Ni and Mn is increased not only at the 2b sites but also at the 2c site and the 4h site. Since at least one of the 2b site, the 2c site, and the 4h site is occupied by Ni or Mn, crystal distortion or a change in electron state occurs, for example; thus, Li might be easily diffused.

Figure 18:
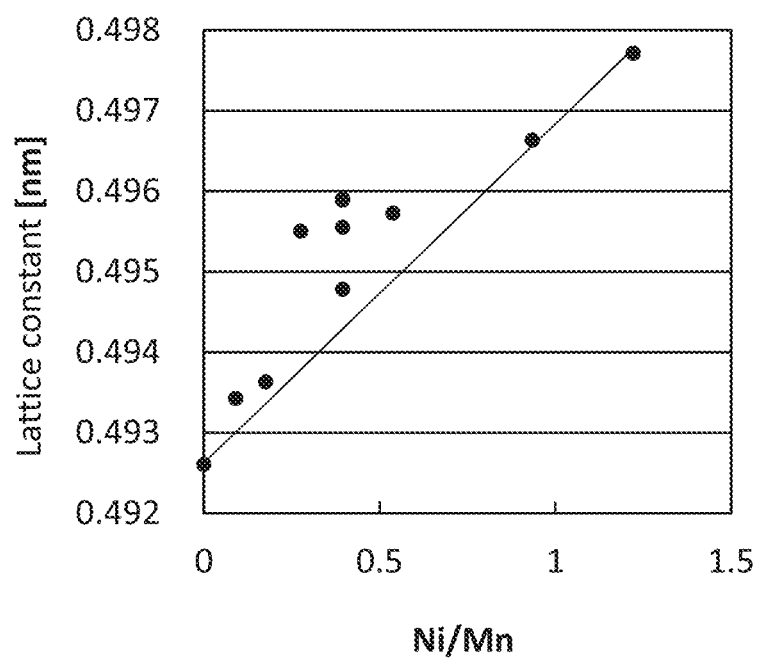
FIG. 18 is a graph showing the relationship between a lattice constant and a ratio of compositions in one embodiment of the present invention.
Figure 19:
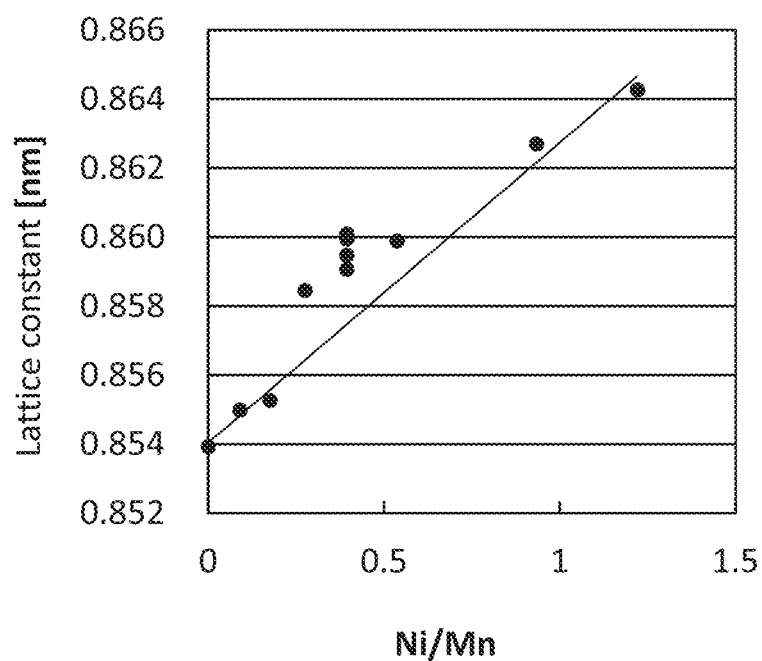
FIG. 19 is a graph showing the relationship between a lattice constant and a ratio of compositions in one embodiment of the present invention.
Figure 20:
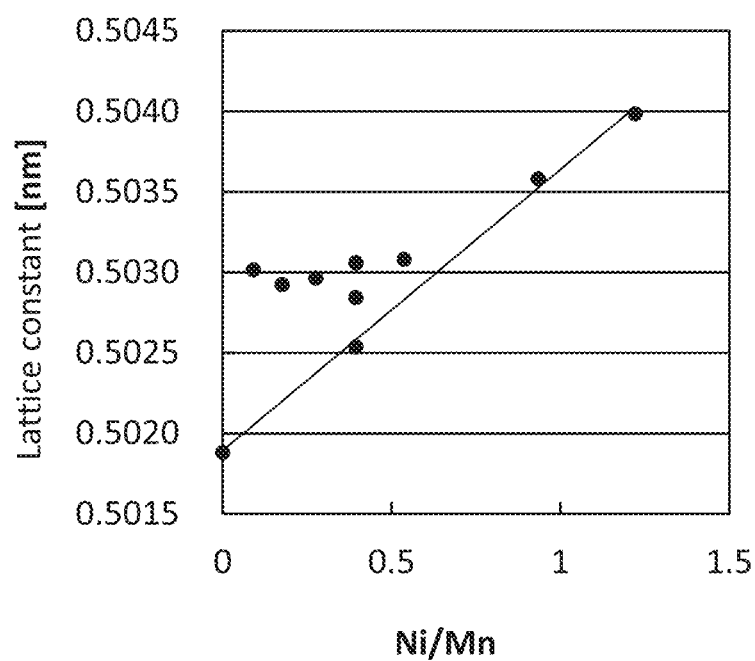
FIG. 20 is a graph showing the relationship between a lattice constant and a ratio of compositions in one embodiment of the present invention.

FIG. 18, FIG. 19, and FIG. 20 respectively show lattice constants a, b, and c of the samples 101 to 109. The horizontal axis represents Ni/Mn (the feed ratio of raw materials) of each sample. A straight line obtained by linear approximation is shown in each of FIGS. 18 to 20. The approximate line was obtained by using three points where Ni/Mn are 0, 0.935, and 1.221. As an example where the lattice constant is linearly changed, the case where Vegard's law is obeyed can be given. In general, Vegard's law is obeyed in solid solutions, and the lattice constant is linearly changed depending on the concentration of the solution.

FIGS. 18 and 19 show that when the capacity starts to increase, that is, when Ni/Mn (the feed ratio of raw materials) is around 0.2758 (equivalent to the conditions of the sample 104), the lattice constants a and b are likely to be outside the approximate line. It is assumed that Ni is not dissolved in a region outside the approximate line, for example. The lattice constant a is preferably larger than or equal to 0.494 nm, further preferably larger than or equal to 0.494 nm and smaller than or equal to 0.4975 nm, still further preferably larger than or equal to 0.494 nm and smaller than or equal to 0.4965 nm. The lattice constant b is preferably larger than or equal to 0.856 nm, further preferably larger than or equal to 0.856 nm and smaller than or equal to 0.864 nm, still further preferably larger than or equal to 0.856 nm and smaller than or equal to 0.862 nm.

FIG. 20 shows that the lattice constant c is significantly increased when Ni/Mn (the feed ratio of raw materials) is larger than or equal to 0.0915. The lattice constant c is preferably larger than or equal to 0.5021 nm, further preferably larger than or equal to 0.5021 nm and smaller than or equal to 0.5038 nm, still further preferably larger than or equal to 0.5021 nm and smaller than or equal to 0.5035 nm.

Example 5

In this example, a half cell was formed using the lithium-manganese composite oxide synthesized in Example 4, and the discharge characteristics were examined.

[1. Fabrication of Cell]

A half cell was fabricated using an electrode containing the lithium-manganese composite oxide synthesized in Example 4, and charge and discharge characteristics were measured. Note that in the half cell, a lithium-manganese composite oxide was used for a positive electrode and lithium metal was used for a negative electrode.

Figure 11:
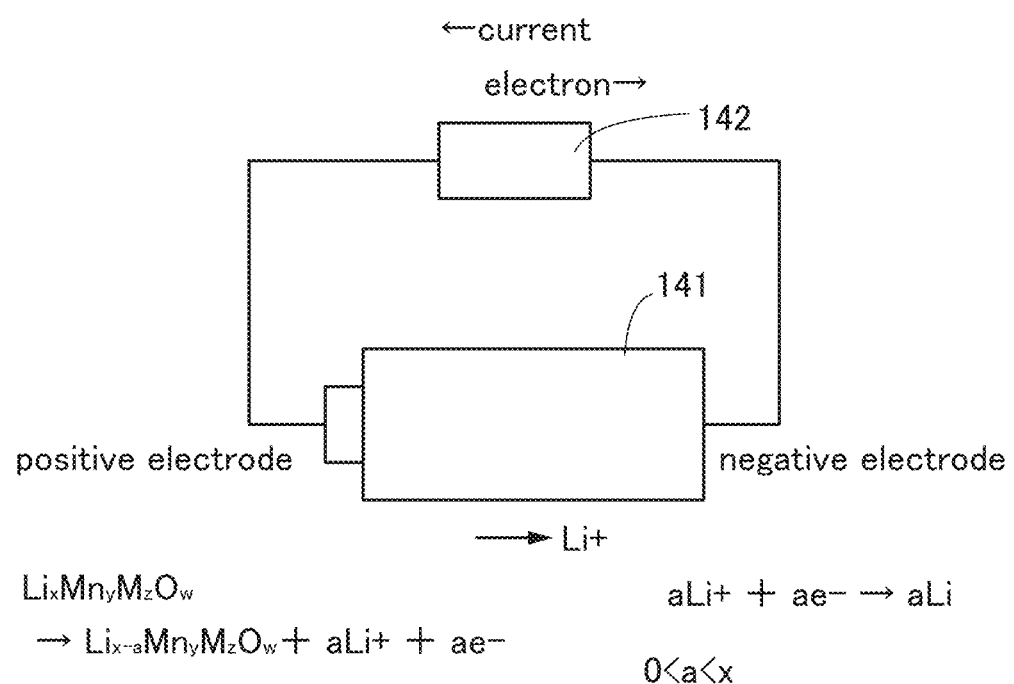
FIG. 11 is a conceptual diagram illustrating a lithium-ion secondary battery of one embodiment of the present invention at the time of charging.
Figure 12:
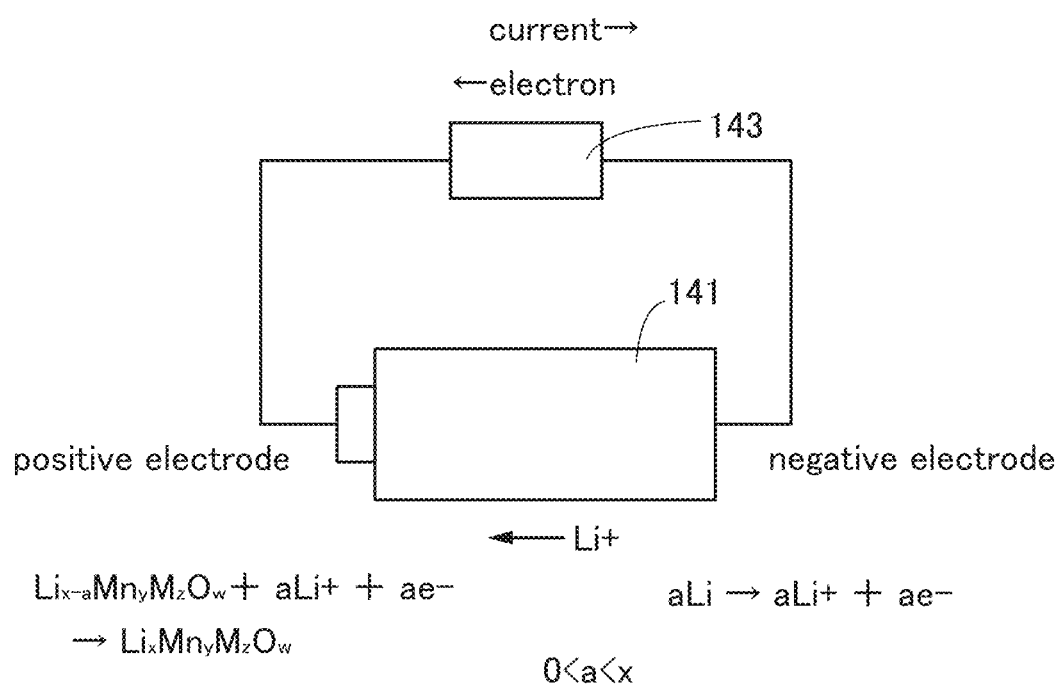
FIG. 12 is a conceptual diagram illustrating a lithium-ion secondary battery of one embodiment of the present invention at the time of discharging.

Here, the operation of the half cell is described. FIG. 11 shows the case of charging the half cell, and FIG. 12 shows the case of discharging the half cell.

FIG. 11 illustrates the connection between a lithium-ion secondary battery 141 that is charged and a charger 142. In the case of charging the lithium-ion secondary battery, a reaction of Formula (9) occurs at a positive electrode.

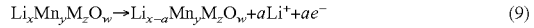

$$Li_xMn_yM_zO_w \rightarrow Li_{x-a}Mn_yM_zO_w + aLi^+ + ae^- \quad (9)$$

In addition, a reaction of Formula (10) occurs in the negative electrode.

$$aLi^+ + ae^- \rightarrow aLi \quad (10)$$

In Formula (9) and Formula (10), 0<a<x is satisfied.

FIG. 12 illustrates the connection between a lithium-ion secondary battery 141 that is discharged and a load 143. In the case of discharging the lithium-ion secondary battery, a reaction of Formula (11) occurs at a positive electrode.

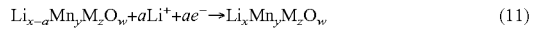

$$Li_{x-a}Mn_yM_zO_w + aLi^+ + ae^- \rightarrow Li_xMn_yM_zO_w \quad (11)$$

In addition, a reaction of Formula (12) occurs in the negative electrode.

$$aLi \rightarrow aLi^+ + ae^- \quad (12)$$

In Formula (11) and Formula (12), 0<a<x is satisfied.

First, a lithium-manganese composite oxide synthesized using the raw materials shown in Table 1, a PVdF resin, and AB as a conductive additive were dissolved in N-methyl-2-pyrrolidon (NMP), a polar solvent, and were mixed to form slurry. The compounding ratio of the lithium-manganese composite oxide to AB and PVdF was adjusted to be 80:15:5 in weight ratio. Then, the slurry was applied on a current collector and dried. Note that a surface of the current collector was covered with an undercoat in advance. Here, the "undercoat" refers to a film formed over a current collector before applying a positive electrode paste onto the current collector for the purpose of reducing the interface resistance between an active material layer and the current collector or increasing the adhesion between the active material layer and the current collector. Note that the undercoat is not necessarily formed in a film shape, and may be formed in an island shape. For the undercoat, a carbon material can be used, for example. Examples of the carbon material are graphite, carbon black such as acetylene black or ketjen black, and carbon nanotubes.

Forming the undercoat over the current collector can reduce the resistance at the interface between the current collector and the active material layer formed later, and/or can increase adhesion between the active material layer and the current collector. The undercoat is preferably not dissolved by a reducing solution in the process of reducing graphene oxide. Note that if there is no problem with the adhesion between the current collector and the active material layer, the electrode strength, and the interface resistance between the current collector and the electrode, it is not necessary to apply the undercoat to the current collector.

A lithium metal was used for a negative electrode and a space between a positive electrode and the negative electrode was filled with an electrolytic solution, so that the half cell was fabricated. Note that the electrolytic solution was formed by dissolving $LiPF_6$ as a salt in a mixed solution containing ethylene carbonate (EC) and diethyl carbonate (DEC), which were aprotic organic solvents, at a volume ratio of 1:1. As the separator, polypropylene (PP) was used.

[2. Discharge Characteristics Examination]

Figure 13:
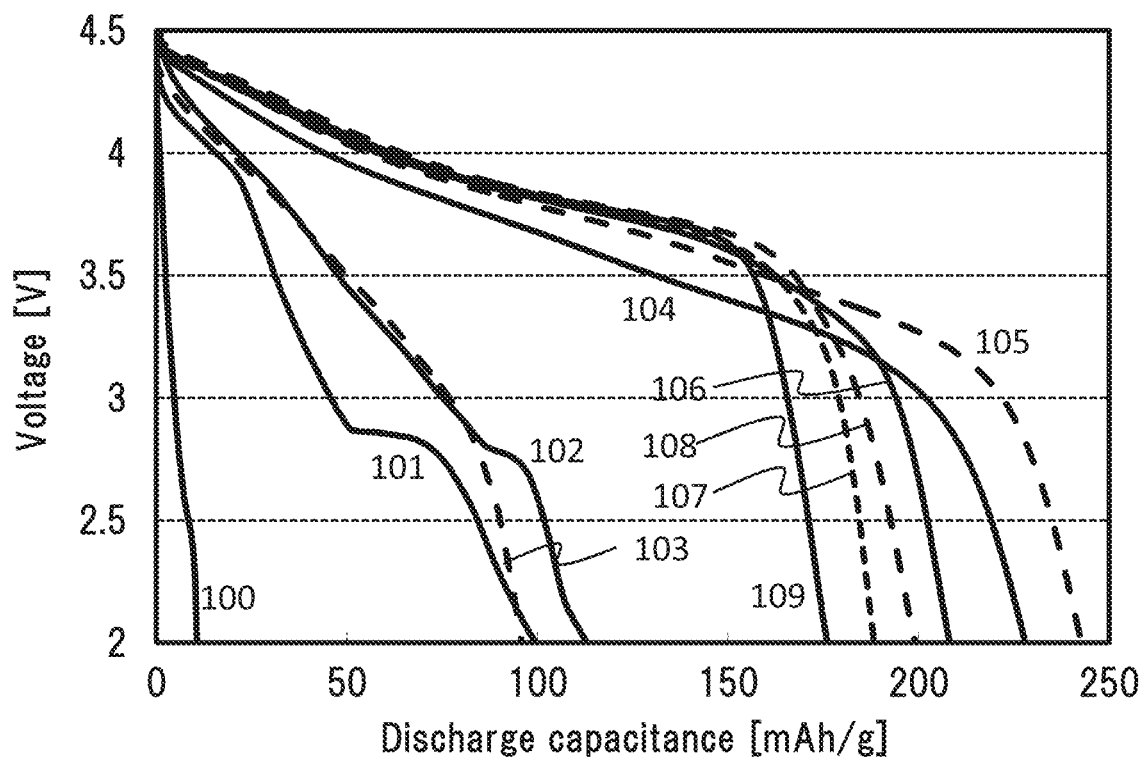
FIG. 13 is a graph showing the relationship between discharge capacity and voltage of one embodiment of the present invention and a comparative example.

FIG. 13 shows the discharge capacities of half cells including the formed samples 100 to 109. The vertical axis represents voltage (V), and the horizontal axis represents discharge capacity (mAh/g). Charging was performed at a constant current with a current density of 30 mA/g until the voltage reached a termination voltage of 4.8 V. Discharging was performed at a constant current with a current density of 30 mA/g until the voltage reached a termination voltage of 2.0 V. The temperature during the charge and discharge measurement was 25° C.

Figure 14:
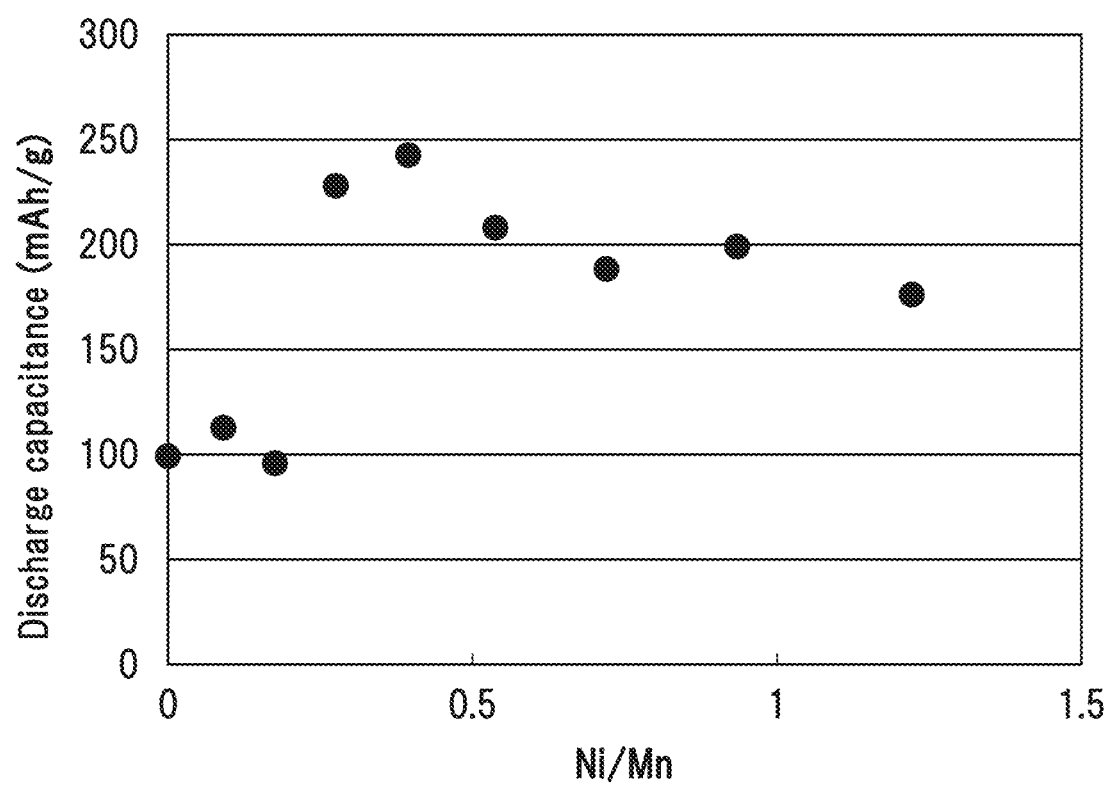
FIG. 14 is a graph showing the relationship between discharge capacity and a ratio of compositions in one embodiment of the present invention.

FIG. 14 shows a graph in which the raw material feed ratios of Ni to Mn are plotted on the horizontal axis and the discharge capacities are plotted on the vertical axis, in accordance with FIG. 13. Note that the discharge capacity of the comparative sample 100 is not plotted here. In the samples whose Ni/Mn (the feed ratio of raw materials) is 0.2758 (equivalent to the conditions of the sample 104) or greater, the capacity is high.

The ratio of the Li composition to the sum of the Ni composition and the Mn composition in $Li_xMn_yM_zO_w$ is represented by x/(y+z), and is preferably less than 2, further preferably less than 1.6. In addition, the ratio of the Ni composition to the Mn composition is represented by z/y, and the ratio of the Li composition to the Mn composition is represented by x/y.

Example 6

In this example, in accordance with the feed ratios of raw materials shown in Table 11, plural kinds of lithium-manganese composite oxides were synthesized by the synthesis method described in Embodiment 1.

[1. Synthesis of Lithium-Manganese Composite Oxides]

Lithium-manganese composite oxides represented by $Li_xMn_yM_zO_w$ were synthesized. Table 11 shows raw materials of samples 121 to 131 and the molar ratios of the raw materials. Table 11 shows values Li/(Mn+Ni) obtained by dividing the molar quantity of lithium (raw material) by the sum of the molar quantity of manganese (raw material) and the molar quantity of nickel (raw material). Table 11 also shows values Ni/Mn obtained by dividing the molar quantity of nickel (raw material) by the molar quantity of manganese (raw material).

TABLE 11

| | $Li_2CO_3$:$MnCO_3$:NiO (Molar ratio) | Li/(Mn + Ni) | Ni/Mn |
|---|---|---|---|
| Sample 121 | 0.64:0.857:0.428 | 1.00 | 0.50 |
| Sample 122 | 0.7838:1.125:0.12 | 1.26 | 0.11 |
| Sample 123 | 0.7838:1.0313:0.2138 | 1.26 | 0.21 |
| Sample 124 | 0.77:0.8545:0.327 | 1.30 | 0.38 |
| Sample 125 | 0.8:0.8062:0.318 | 1.42 | 0.39 |
| Sample 126 | 0.92:0.8:0.36 | 1.59 | 0.45 |

TABLE 11-continued

| | $Li_2CO_3$:$MnCO_3$:NiO (Molar ratio) | Li/(Mn + Ni) | Ni/Mn |
|---|---|---|---|
| Sample 127 | 0.92:1:0.16 | 1.59 | 0.16 |
| Sample 128 | 0.924:0.8062:0.318 | 1.64 | 0.39 |
| Sample 129 | 0.915:0.8:0.26 | 1.73 | 0.33 |
| Sample 130 | 0.915:0.58:0.48 | 1.73 | 0.83 |
| Sample 131 | 0.915:0.89:0.17 | 1.73 | 0.19 |

First, $Li_2CO_3$, $MnCO_3$, and NiO were weighed as starting materials in accordance with Table 11.

Next, acetone was added to the powder of these materials, and then, they were mixed in a ball mill to prepare mixed powder.

After that, heating was performed to volatilize acetone, so that a mixed material was obtained.

Then, the mixed materials were put into a crucible and were fired at 1000° C. for 10 hours in the air at a flow rate of 10 L/min., so that a novel material was synthesized.

Subsequently, grinding was performed to separate the sintered particles. For the grinding, acetone was added and then mixing was performed in a ball mill.

After the grinding, heating was performed to volatilize acetone, and then, vacuum drying was performed.

Through the above steps, powdery novel material was obtained.

Next, half cells were formed using the samples 121 to 131, and the discharge characteristics were examined.

[2. Fabrication of Cell]

Half cells were fabricated using an electrode including the samples 121 to 131, and charge and discharge characteristics were measured. Note that in the half cell, a lithium-manganese composite oxide was used for a positive electrode and lithium metal was used for a negative electrode.

A method for forming the electrodes is described. First, a PVdF resin, AB for a conductive additive, and each of lithium-manganese composite oxides synthesized using the raw materials shown in Table 11 were dissolved in N-methyl-2-pyrrolidon (NMP), a polar solvent, and were mixed to form slurry. Table 12 shows the compounding ratios of the lithium-manganese composite oxides ("active material" in Table 12) to AB and PVdF in weight ratios. Then, the slurry was applied on a current collector, and then is dried at 80° C. to form the electrodes. After that, the electrodes were heated at respective temperatures shown in Table 12.

TABLE 12

| | Composition [weight %] Active material:AB:PVDF | Heating temperature of electrode |
|---|---|---|
| Sample 121 | 80:15:5 | 170° C. |
| Sample 122 | 90:5:5 | 250° C. |
| Sample 123 | 90:5:5 | 250° C. |
| Sample 124 | 80:15:5 | 170° C. |
| Sample 125 | 90:5:5 | 250° C. |
| Sample 126 | 80:15:5 | 170° C. |
| Sample 127 | 90:5:5 | 250° C. |
| Sample 128 | 90:5:5 | 250° C. |
| Sample 129 | 80:15:5 | 170° C. |
| Sample 130 | 80:15:5 | 170° C. |
| Sample 131 | 80:15:5 | 170° C. |

A surface of the current collector was covered with an undercoat in advance. Here, the "undercoat" refers to a film formed over a current collector before applying a positive electrode paste onto the current collector for the purpose of reducing the interface resistance between an active material layer and the current collector or increasing the adhesion between the active material layer and the current collector. Note that the undercoat is not necessarily formed in a film shape, and may be formed in an island shape. For the undercoat, a carbon material can be used, for example. Examples of the carbon material are graphite, carbon black such as acetylene black or ketjen black, and carbon nanotubes.

Forming the undercoat over the current collector can reduce the resistance at the interface between the current collector and the active material layer formed later, and/or can increase adhesion between the active material layer and the current collector. The undercoat is preferably not dissolved by a reducing solution in the process of reducing graphene oxide. Note that if there is no problem with the adhesion between the current collector and the active material layer, the electrode strength, and the interface resistance between the current collector and the electrode, it is not necessary to apply the undercoat to the current collector.

A lithium metal was used for a negative electrode and a space between a positive electrode and the negative electrode was filled with an electrolytic solution, so that the half cell was fabricated. Note that the electrolytic solution was formed by dissolving $LiPF_6$ as a salt in a mixed solution containing ethylene carbonate (EC) and diethyl carbonate (DEC), which were aprotic organic solvents, at a volume ratio of 1:1. As the separator, polypropylene (PP) was used.

[3. Discharge Characteristics Examination]

Figure 49A:
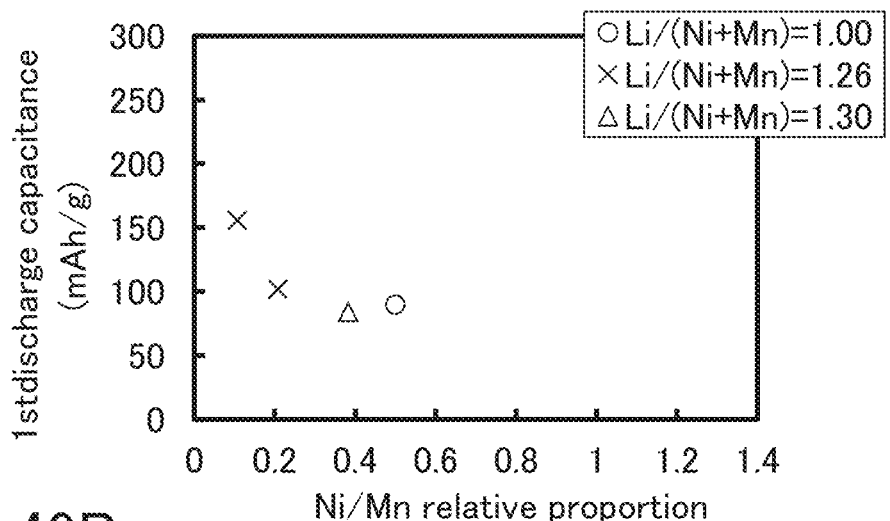
FIGS. 49A to 49C are each a graph showing the relationship between discharge capacity and a ratio of compositions in one embodiment of the present invention.
Figure 49B:
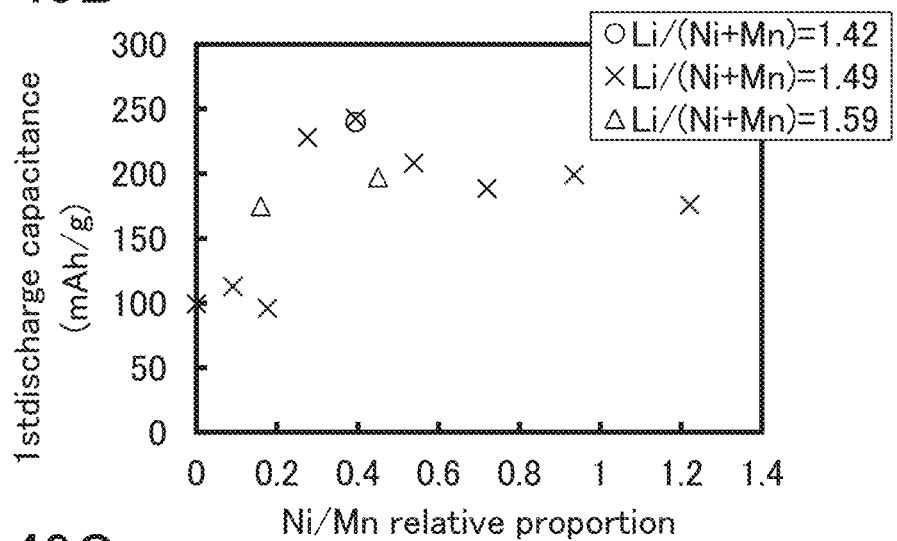
Figure 49C:
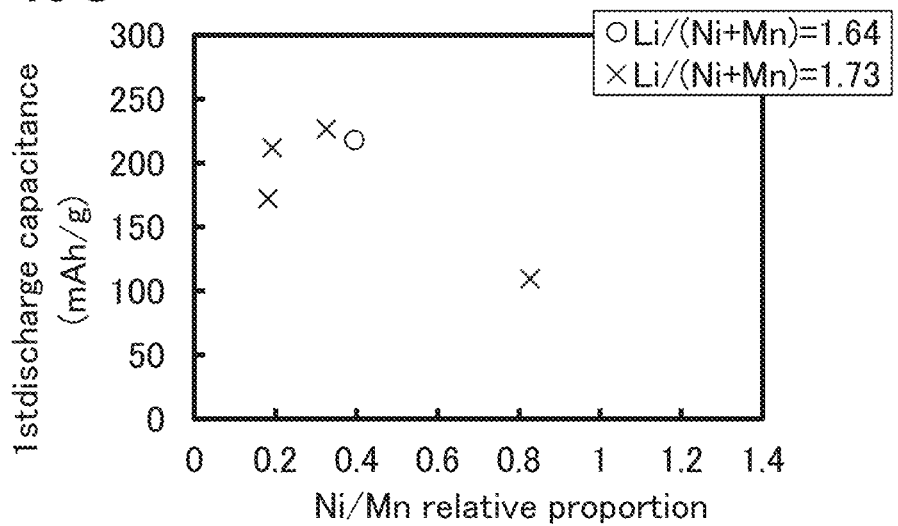

FIGS. 49A to 49C are graphs in which the discharge capacities of half cells including the samples 121 to 131 are plotted on the vertical axis and the raw material feed ratios of Ni to Mn are plotted on the horizontal axis. FIG. 49A shows the discharge capacities that can be obtained in the case of using the samples with which Li/(Mn+Ni) are 1.00, 1.26, and 1.30 in Table 11. FIG. 49B shows the discharge capacities that can be obtained in the case of using the samples with which Li/(Mn+Ni) are 1.42 and 1.59 in Table 11. Note that the results of the case where Li/(Mn+Ni) is 1.49 in FIG. 49B were plotted using the data shown in FIG. 13 in Example 5. FIG. 49C shows the discharge capacities that can be obtained in the case of using the samples with which Li/(Mn+Ni) are 1.64 and 1.73 in Table 11.

From FIGS. 49A and 49B, the case where Li/(Ni+Mn) is greater than or equal to 1.46 is preferred to the case where Li/(Ni+Mn) is less than or equal to 1.30 to achieve high capacity. In addition, the results in FIG. 49C indicate that high discharge capacity can be obtained when Li/(Ni+Mn) is 1.64 or 1.73.

Next, examination is performed focusing on Ni/Mn. The comparison between FIGS. 49B and 49C indicates that the range of Ni/Mn with which high capacitance can be obtained is larger in the case where Li/(Ni+Mn) is 1.49 than in the case where Li/(Ni+Mn) is 1.73.

Accordingly, in a lithium-manganese composite oxide represented by $Li_D Mn_y Ni_z O_w$, D/(y+z) is preferably greater than or equal to 1.35 and less than 2, further preferably greater than or equal to 1.4 and less than 1.8, still further preferably greater than or equal to 1.4 and less than 1.6. In addition, $0.2 < z/y < 1.2$ is preferably satisfied. Note that in storage batteries, lithium is released from a lithium-manganese composite oxide by charge or the like, for example. Here, D denotes, for example, the amount of lithium contained in a lithium-manganese composite oxide before the lithium is released by charge or the like, or the amount of lithium contained in a lithium-manganese composite oxide after lithium is released by charge and inserted by discharge or the like.

EXPLANATION OF REFERENCE

100: comparative sample, 101: sample, 102: sample, 103: sample, 104: sample, 105: sample, 105a: sample, 105b: sample, 105c: sample, 105d: sample, 106: sample, 107: sample, 108: sample, 109: sample, 121: sample, 122: sample, 123: sample, 124: sample, 125: sample, 126: sample, 127: sample, 128: sample, 129: sample, 130: sample, 131: sample, 141: lithium-ion secondary battery, 142: charger, 143: load, 150: comparative sample, 151: sample, 152: sample, 153: sample, 154: sample, 155: sample, 156: sample, 157: sample, 158: sample, 159: sample, 160: sample, 161: sample, 162: sample, 163: sample, 164: sample, 165: sample, 166: sample, 170: part, 201: spinel crystallite, 202: layered rock-salt crystallite, 203: $Li_2MnO_3$ particle, 204: Spi-$LiMn_2O_4$ particle, 205: sintered material, 300: storage battery, 301: positive electrode can, 302: negative electrode can, 303: gasket, 304: positive electrode, 305: positive electrode current collector, 306: positive electrode active material layer, 307: negative electrode, 308: negative electrode current collector, 309: negative electrode active material layer, 310: separator, 400: storage battery, 402: positive electrode, 404: negative electrode, 500: storage battery, 501: positive electrode current collector, 502: positive electrode active material layer, 503: positive electrode, 504: negative electrode current collector, 505: negative electrode active material layer, 506: negative electrode, 507: separator, 508: electrolytic solution, 509: exterior body, 600: storage battery, 601: positive electrode cap, 602: battery can, 603: positive electrode terminal, 604: positive electrode, 605: separator, 606: negative electrode, 607: negative electrode terminal, 608: insulating plate, 609: insulating plate, 610: gasket, 611: PTC element, 612: safety valve mechanism, 900: circuit board, 910: label, 911: terminal, 912: circuit, 913: power storage unit, 914: antenna, 915: antenna, 916: layer, 917: layer, 918: antenna, 919: terminal, 920: display device, 921: sensor, 922: terminal, 930: housing, 930a: housing, 930b: housing, 931: negative electrode, 932: positive electrode, 933: separator, 951: terminal, 952: terminal, 7100: portable display device, 7101: housing, 7102: display portion, 7103: operation button, 7104: power storage device, 7400: mobile phone, 7401: housing, 7402: display portion, 7403: operation button, 7404: external connection port, 7405: speaker, 7406: microphone, 7407: power storage device, 8021: charging device, 8022: cable, 8024: power storage device, 8100: automobile, 8101: headlight, and 8200: automobile.

This application is based on Japanese Patent Application serial no. 2013-147170 filed with Japan Patent Office on Jul. 15, 2013 and Japanese Patent Application serial no. 2013-198871 filed with Japan Patent Office on Sep. 25, 2013, the entire contents of which are hereby incorporated by reference.

The invention claimed is:

1. A lithium-manganese composite oxide represented by $Li_x Mn_y Ni_z O_w$, wherein y, z and w are each greater than zero and satisfy $0.26 \leq (y+z)/w < 0.5$, wherein the lithium-manganese composite oxide comprises a layered rock-salt crystal structure and a spinel crystal structure, and wherein x is greater than or equal to zero, and x, y and z satisfy $1.4 \leq x/(y+z) \leq 1.64$ and $0.2 < z/y < 1.2$.

2. A lithium-ion secondary battery comprising the lithium-manganese composite oxide according to claim 1 as a positive electrode active material.

3. An electric device comprising the lithium-ion secondary battery according to claim 2.

4. A lithium-manganese composite oxide represented by $Li_x Mn_y Ni_z O_w$, wherein x is greater than or equal to zero, wherein y, z, and w are each greater than zero, wherein x, y, z, and w satisfy $1.4 \leq x/(y+z) \leq 1.64$, $0.26 \leq (y+z)/w < 0.5$ and $0.2 < z/y < 1.2$, wherein the lithium-manganese composite oxide comprises a layered rock-salt crystal structure and a spinel crystal structure, wherein the layered rock-salt crystal structure belongs to a space group C12/m1, and wherein the layered rock-salt crystal structure, the sum of $A(Mn)_{2b}$ and $A(Ni)_{2b}$ is greater than or equal to 40%, wherein $A(Mn)_{2b}$ is an occupancy of Mn at the 2b site, and wherein $A(Ni)_{2b}$ is an occupancy of Ni at the 2b site, wherein in the layered rock-salt crystal structure, the sum of $A(Mn)_{2c+4h}$ and $A(Ni)_{2c+4h}$ is greater than or equal to 0.2%, wherein $A(Mn)_{2c+4h}$ is an occupancy of Mn at a 2c site and an occupancy of Mn at a 4h site, represented by Formula (1), wherein $A(Ni)_{2c+4h}$ is an occupancy of Ni at the 2c site and an occupancy of Ni at the 4h site, represented by Formula (2), wherein $A(Mn)_{2c}$ is the occupancy of Mn at the 2c site, $A(Ni)_{2c}$ is the occupancy of Ni at the 2c site, $A(Mn)_{4h}$ is the occupancy of Mn at the 4h site, and $A(Ni)_{4h}$ is the occupancy of Ni at the 4h site, $$A(Mn)_{2c+4h} = [A(Mn)_{2c} \times 1 + A(Mn)_{4h} \times 2] \div (1+2) \quad \text{Formula (1)}$$

$$A(Ni)_{2c+4h} = [A(Ni)_{2c} \times 1 + A(Ni)_{4h} \times 2] \div (1+2) \quad \text{Formula (2)}.$$

5. A lithium-ion secondary battery comprising the lithium-manganese composite oxide according to claim 4 as a positive electrode active material.

6. An electric device comprising the lithium-ion secondary battery according to claim 5.

7. A lithium-manganese composite oxide represented by $Li_xMn_yNi_zO_w$, wherein x is greater than or equal to zero, wherein y, z, and w are each greater than zero, wherein x, y, z, and w satisfy $1.4 \leq x/(y+z) \leq 1.64$, $0.26 \leq (y+z)/w < 0.5$ and $0.2 < z/y < 1.2$, wherein the lithium-manganese composite oxide comprises a layered rock-salt crystal structure and a spinel crystal structure, and wherein the layered rock-salt crystal structure belongs to a space group C12/m1, and wherein in the layered rock-salt crystal structure, an a-axis lattice constant is larger than or equal to 0.494 nm and a b-axis lattice constant is larger than or equal to 0.856 nm.

8. The lithium-manganese composite oxide according to claim 7, wherein a c-axis lattice constant of the layered rock-salt crystal structure is larger than or equal to 0.5021 nm.

9. A lithium-ion secondary battery comprising the lithium-manganese composite oxide according to claim 7 as a positive electrode active material.

10. An electric device comprising the lithium-ion secondary battery according to claim 9.

* * * * *